United States Patent [19]
Mizumoto

[11] Patent Number: 6,084,363
[45] Date of Patent: Jul. 4, 2000

[54] DRIVE PULSE GENERATING APPARATUS FOR DRIVE DEVICE USING ELECTROMECHANICAL TRANSDUCER

[75] Inventor: Kenji Mizumoto, Osaka, Japan

[73] Assignee: Minolta Co., Ltd., Osaka, Japan

[21] Appl. No.: 09/009,013

[22] Filed: Jan. 16, 1998

[30] Foreign Application Priority Data

| Jan. 17, 1997 | [JP] | Japan | 9-017703 |
| Mar. 10, 1997 | [JP] | Japan | 9-070893 |
| Sep. 11, 1997 | [JP] | Japan | 9-262912 |
| Sep. 11, 1997 | [JP] | Japan | 9-262913 |

[51] Int. Cl.⁷ .................................................. H01L 41/08
[52] U.S. Cl. ........................ 318/116; 318/118; 310/316; 310/323; 74/128; 359/824
[58] Field of Search .................... 318/560–680, 318/110–118; 74/128; 310/314, 316, 323, 318, 328, 317; 359/683, 685, 824, 814, 823, 698, 694; 396/55; 348/208

[56] References Cited

U.S. PATENT DOCUMENTS

| 4,047,086 | 9/1977 | Cocksedge | 318/608 |
| 4,059,789 | 11/1977 | Cocksedge | 318/608 |
| 4,109,189 | 8/1978 | Jacques et al. | 318/608 |
| 4,195,243 | 3/1980 | Thaxter | 310/317 |
| 4,277,710 | 7/1981 | Harwood et al. | 310/316 |
| 4,689,514 | 8/1987 | Kondoh | 310/316 |
| 4,952,834 | 8/1990 | Okada | 310/316 |
| 5,036,263 | 7/1991 | Yamada et al. | 318/116 |
| 5,225,941 | 7/1993 | Saito et al. | 359/824 |
| 5,563,464 | 10/1996 | Okubu et al. | 310/316 |
| 5,587,846 | 12/1996 | Miyano et al. | 359/824 |
| 5,589,723 | 12/1996 | Yoshida et al. | 310/328 |
| 5,640,065 | 6/1997 | Abe et al. | 310/317 |
| 5,675,444 | 10/1997 | Ueyama et al. | 359/824 |
| 5,705,877 | 1/1998 | Shimada | 310/318 |
| 5,786,941 | 7/1998 | Kuwana et al. | 359/683 |
| 5,842,053 | 11/1998 | Ueyama et al. | 396/55 |
| 5,859,733 | 1/1999 | Miyano et al. | 359/824 |
| 5,890,391 | 4/1999 | Okada | 74/128 |

FOREIGN PATENT DOCUMENTS

| 63-011074 | 1/1988 | Japan . |
| 4-069070 | 3/1992 | Japan . |

*Primary Examiner*—Paul Ip
*Attorney, Agent, or Firm*—Sidley & Austin

[57] ABSTRACT

A drive pulse generating apparatus capable of freely adjusting drive speed of a drive device using an electromechanical transducer for adjusting the width of a rising portion and the width of a falling portion of a sawtooth waveform pulse having a gradual rising portion and a steep falling portion or a steep rising portion and a gradual falling portion by adjusting waveform of a drive pulse or combining drive pulses having different waveforms of a sine waveform, a sawtooth waveform and the like by which the drive speed of the drive device using the electromechanical transducer is freely adjusted.

46 Claims, 43 Drawing Sheets

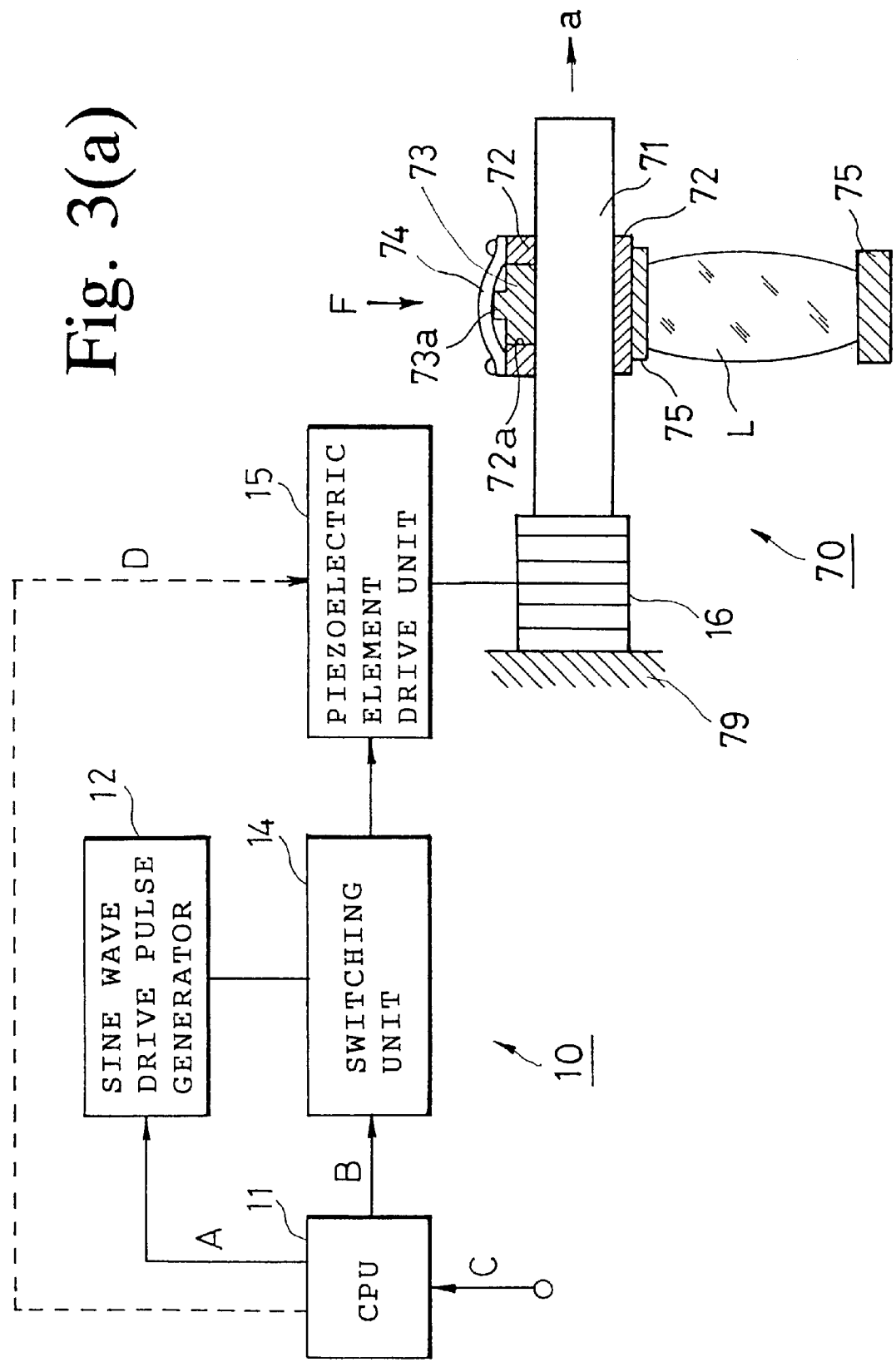

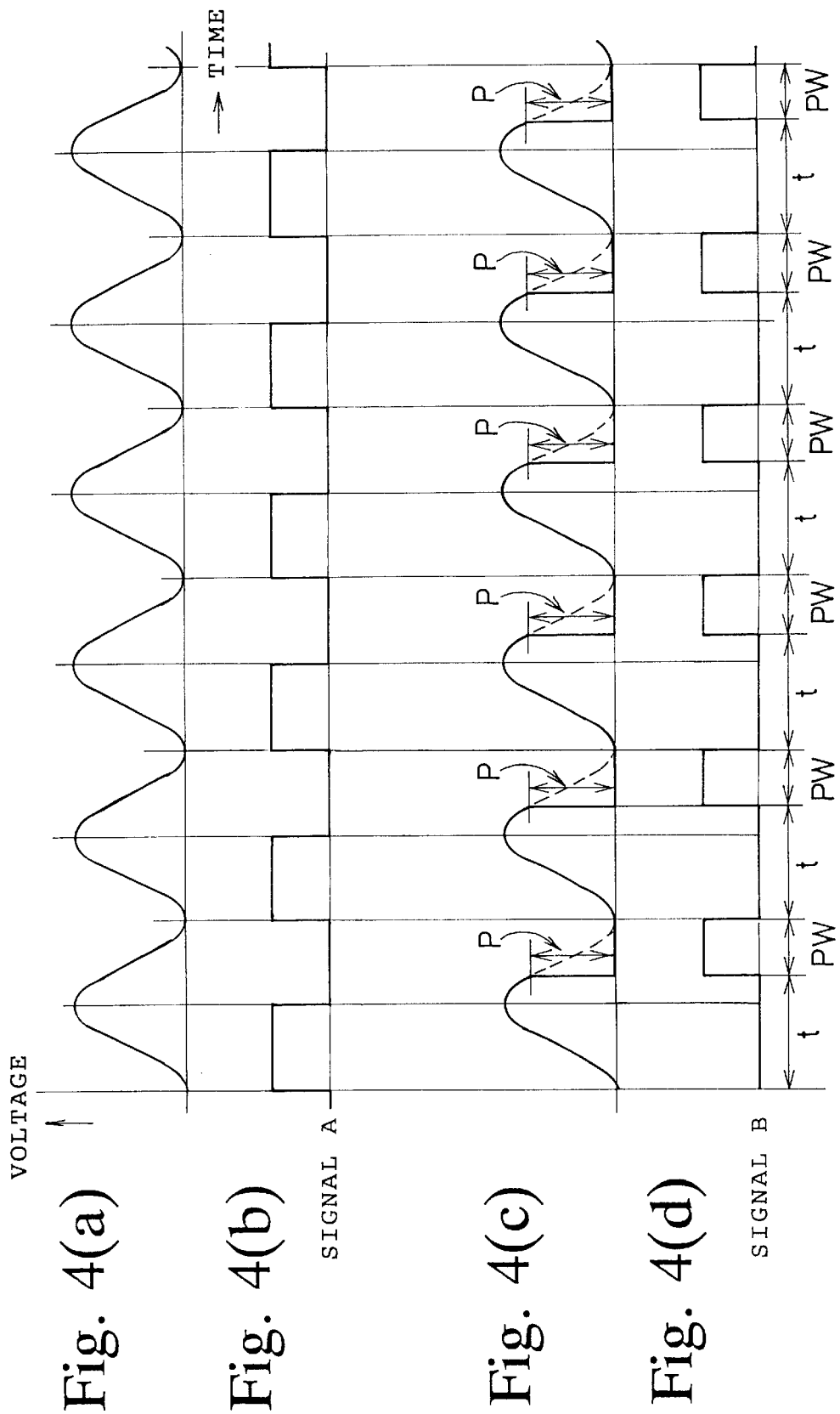

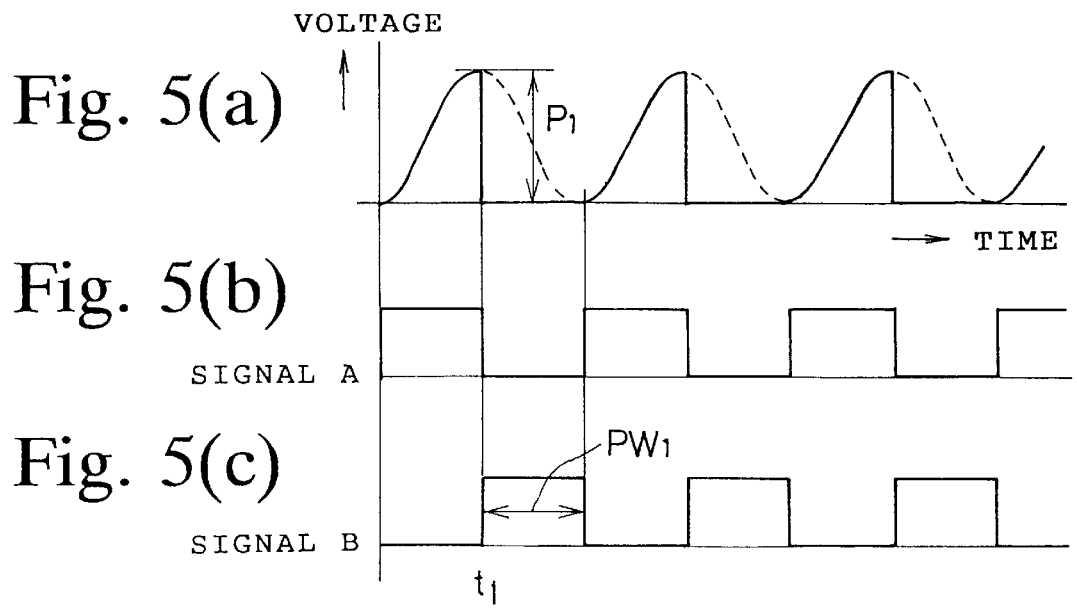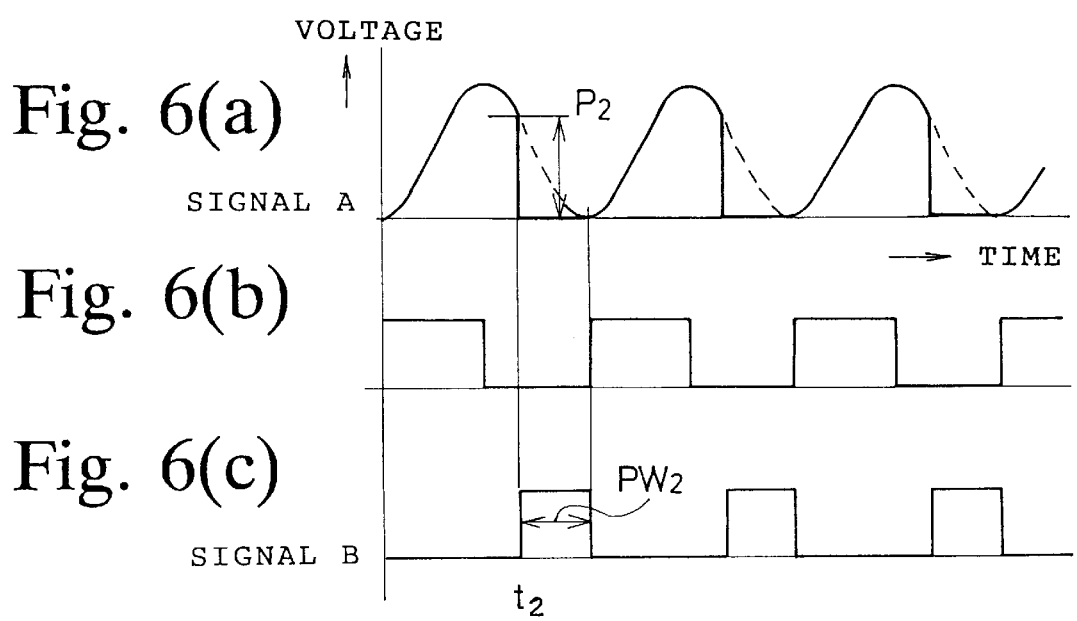

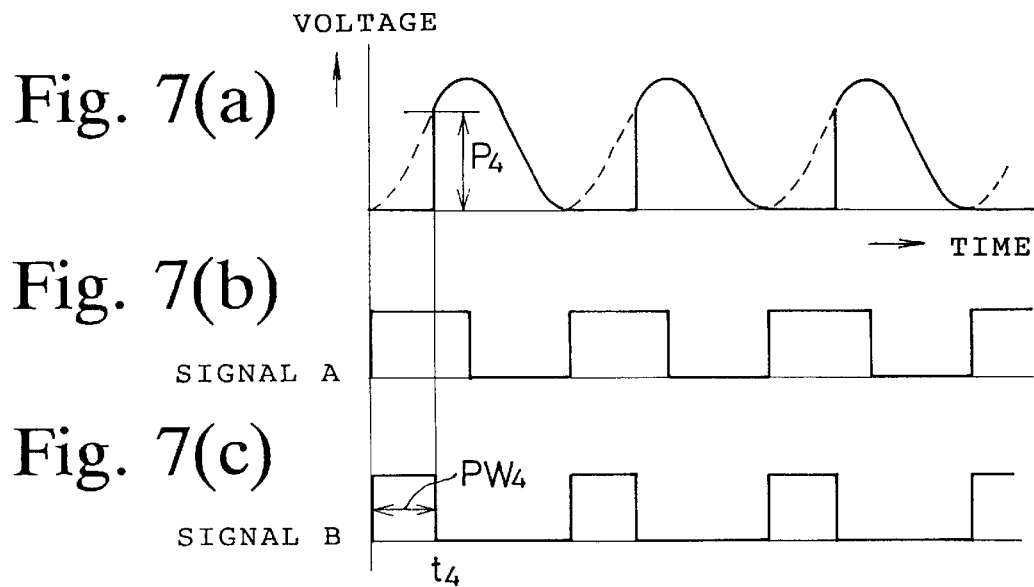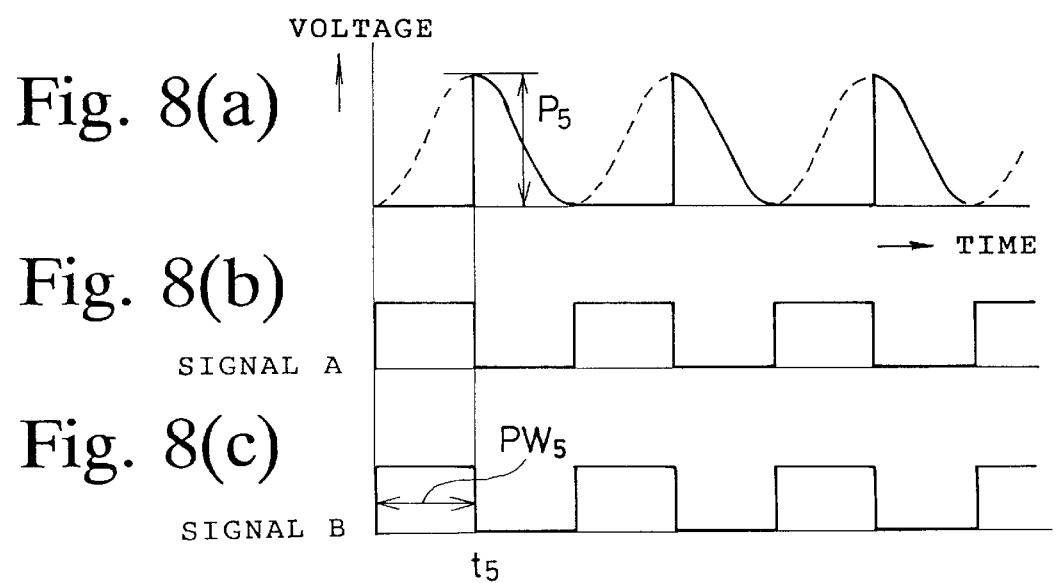

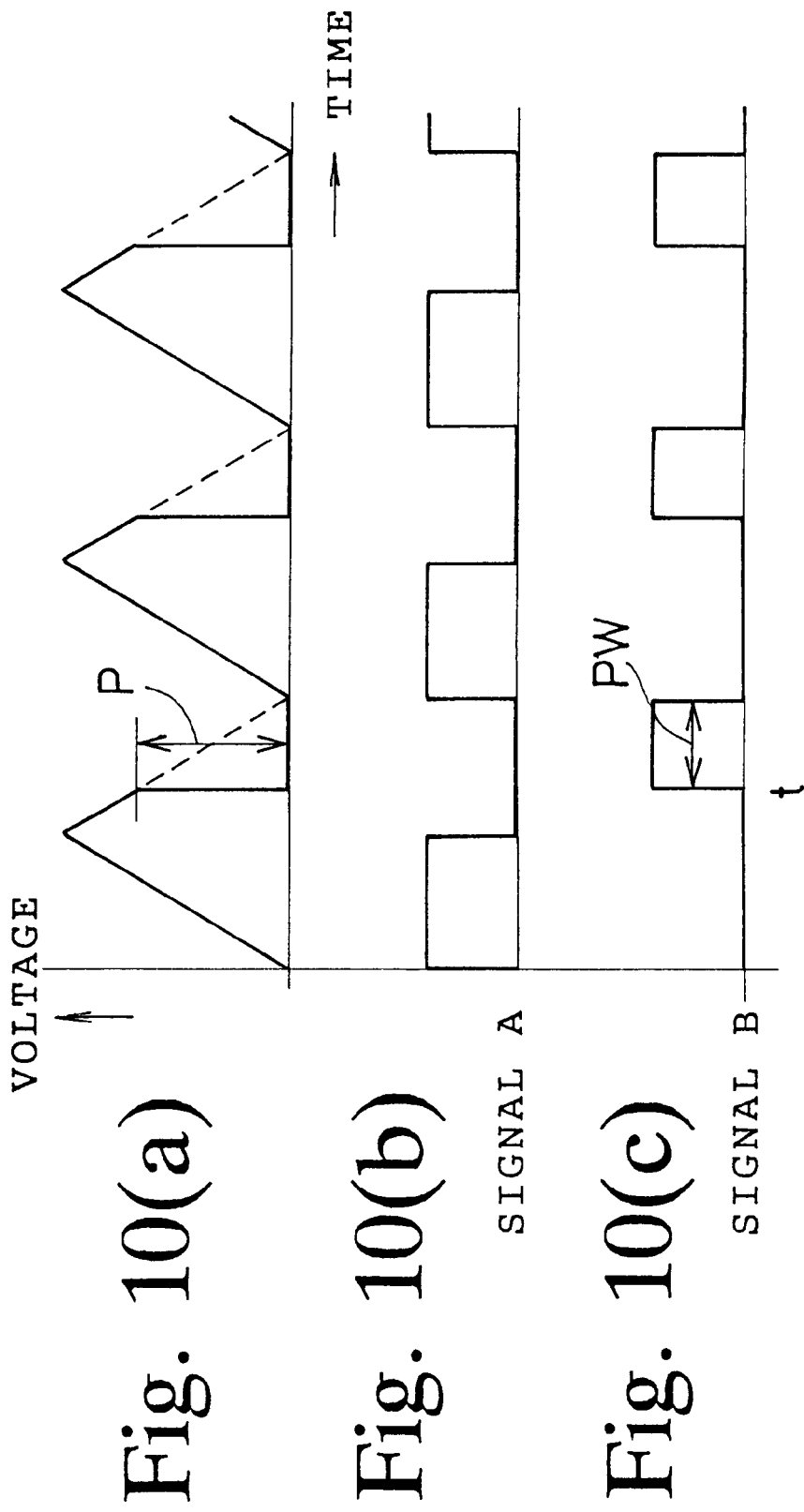

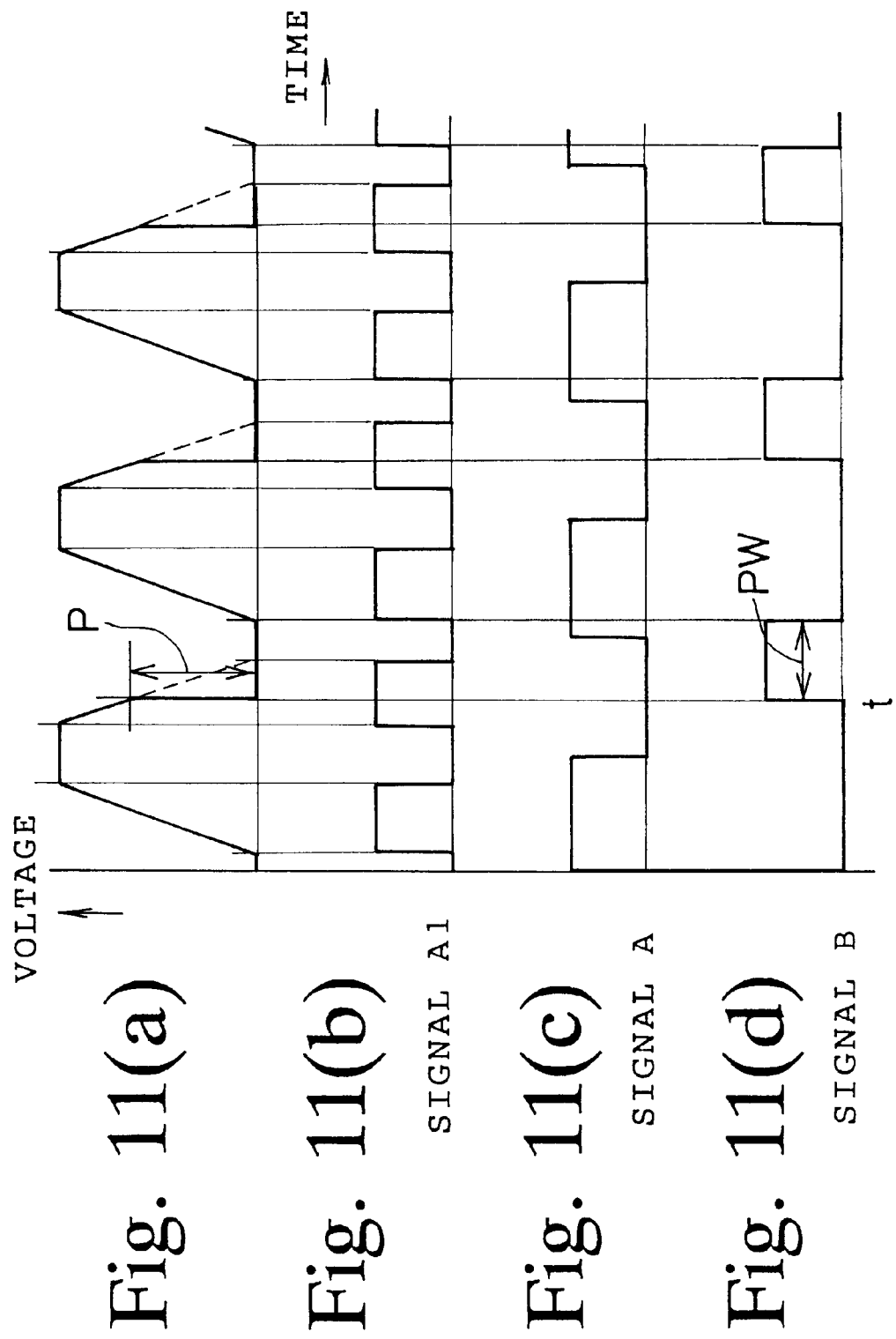

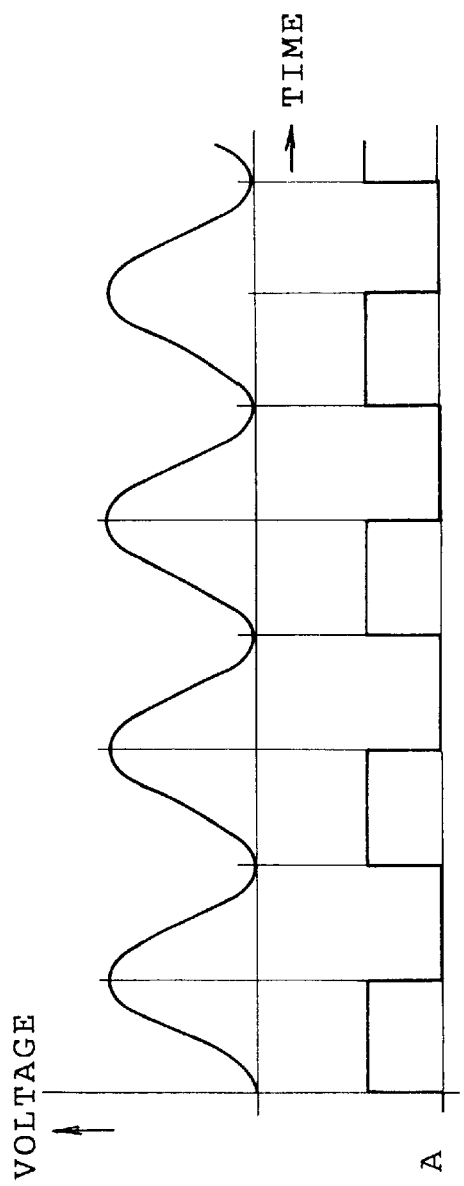
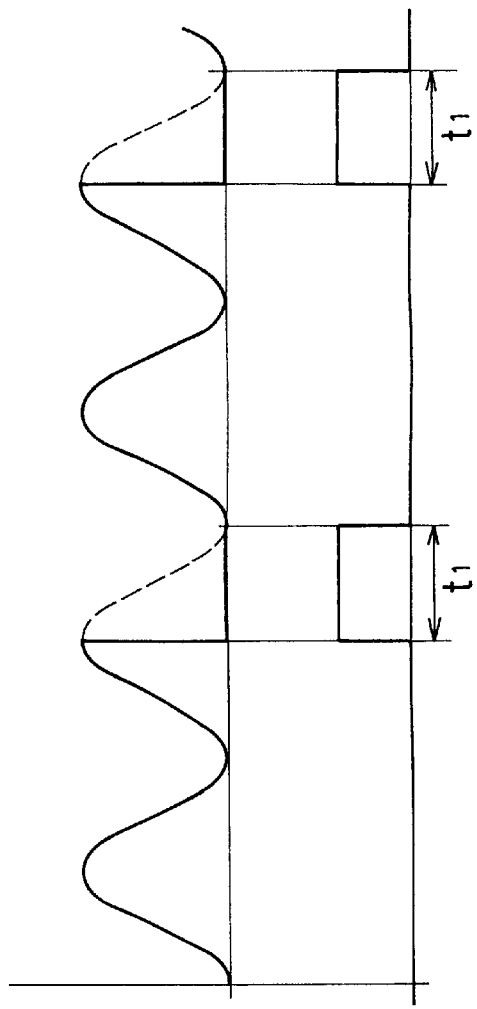

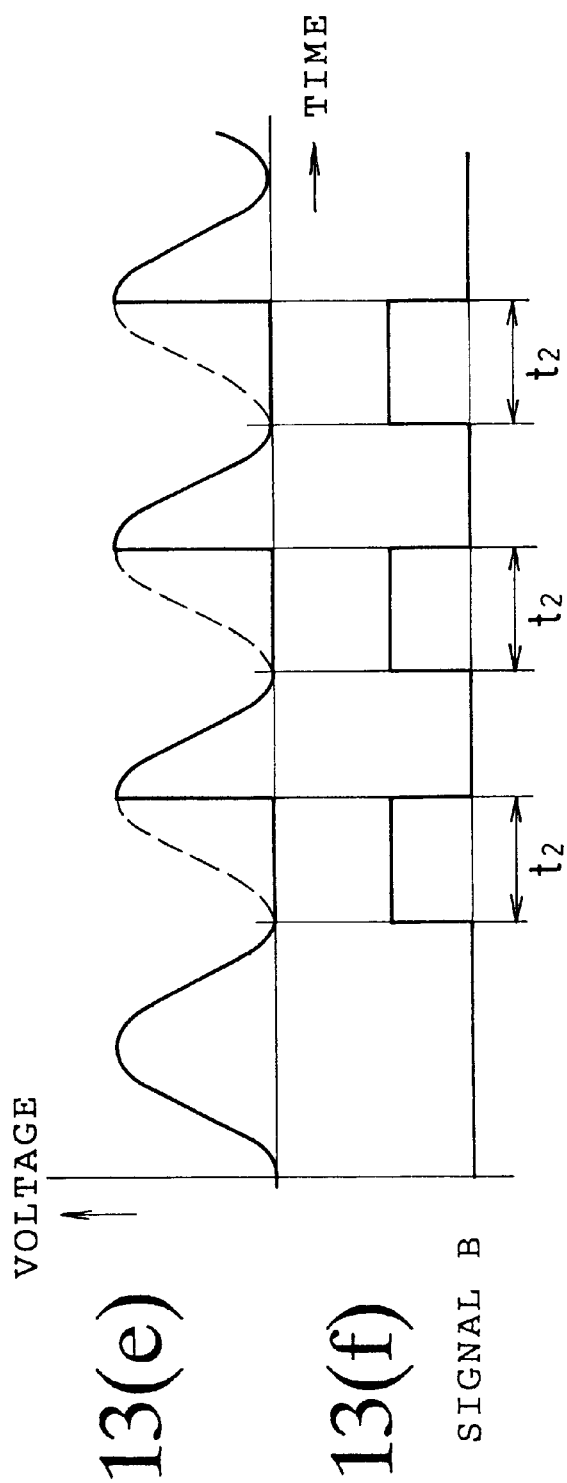

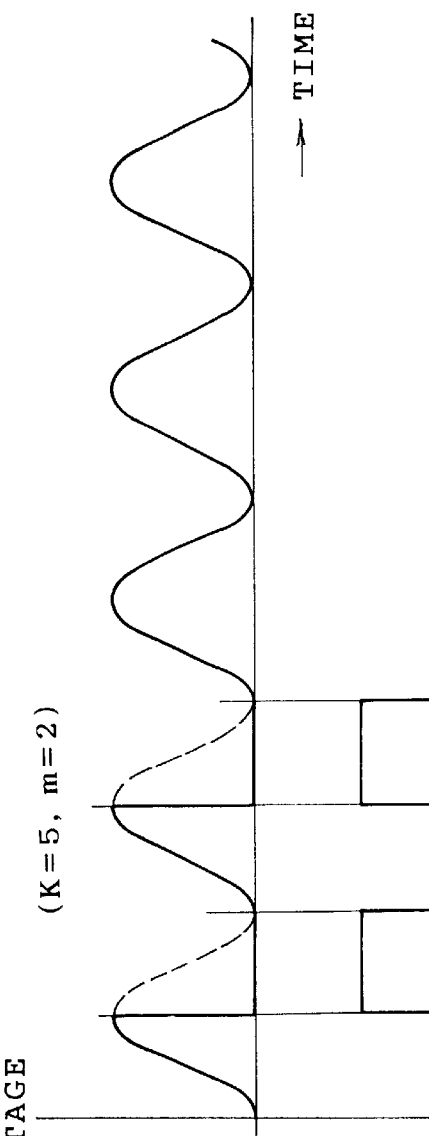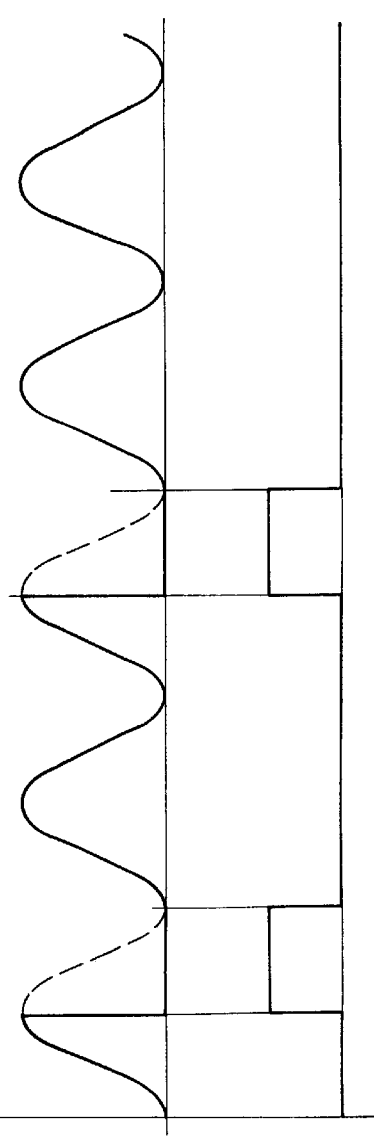

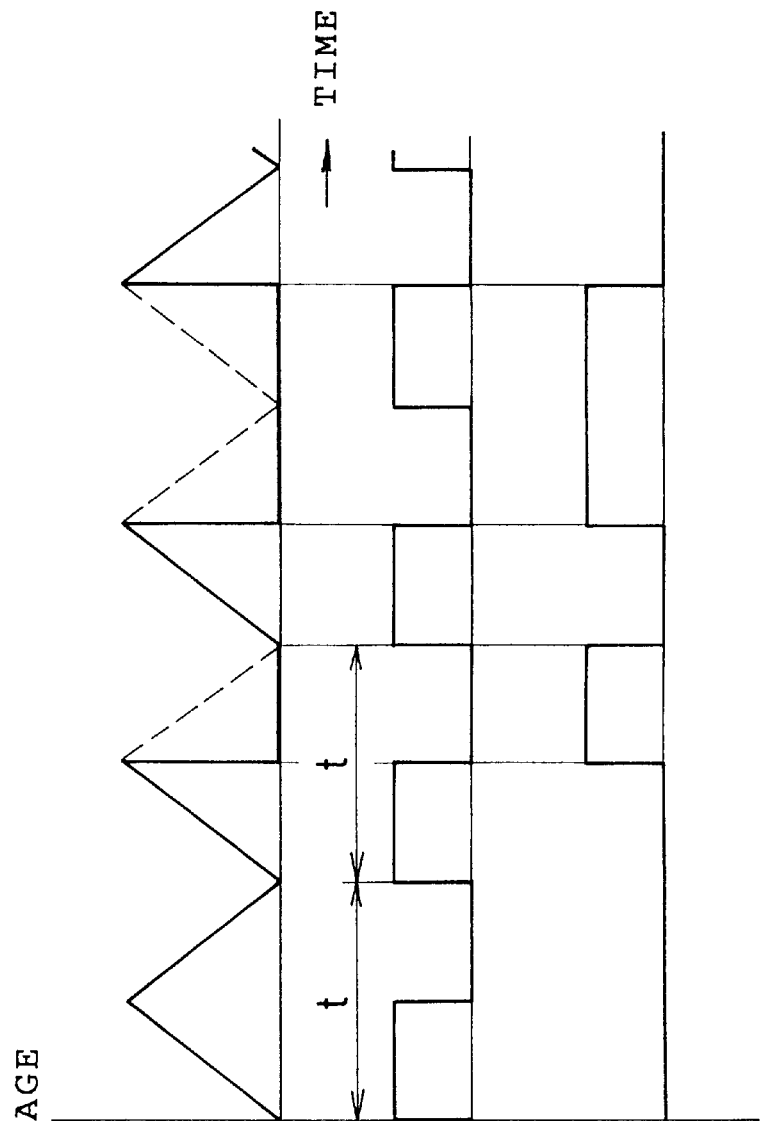

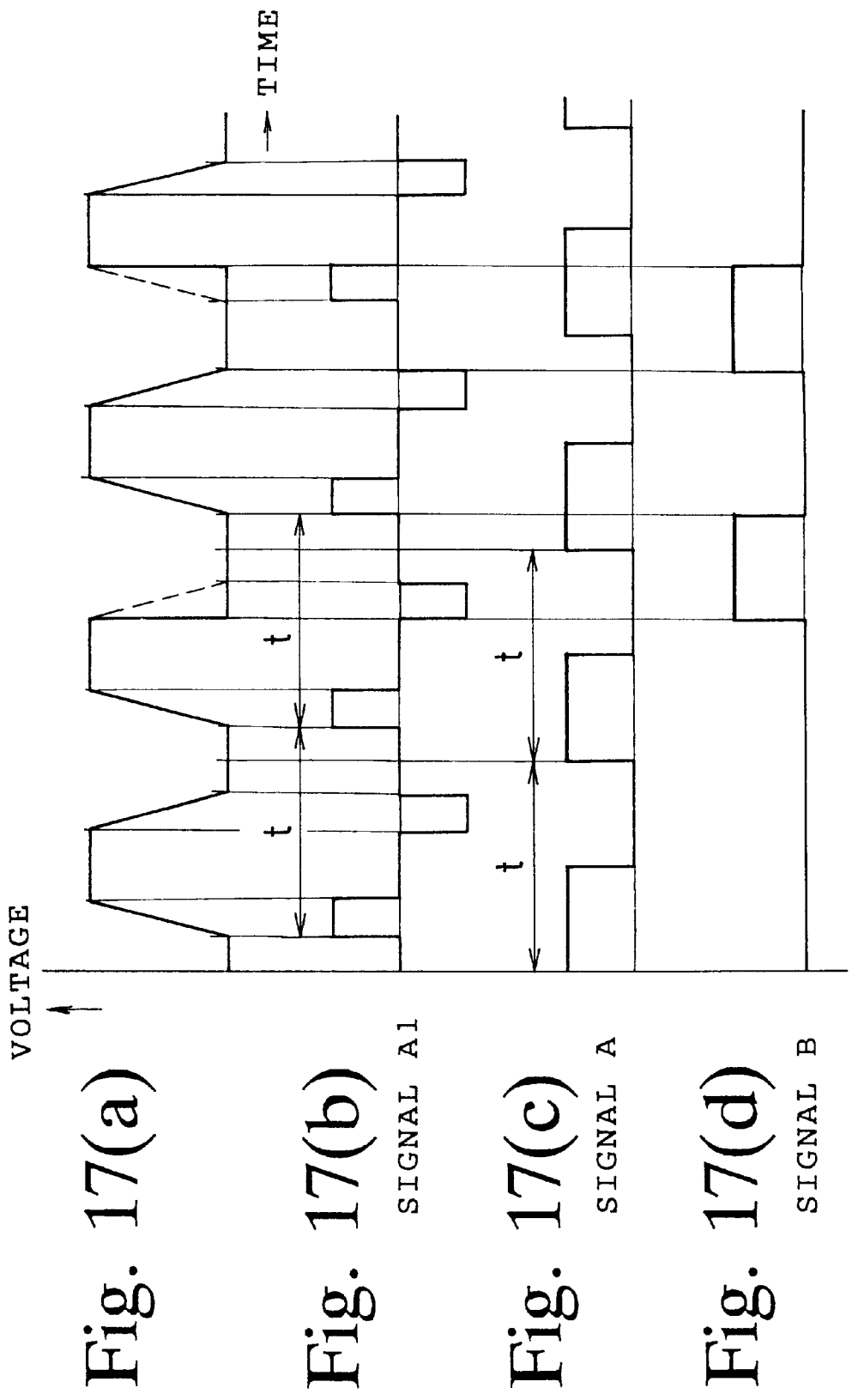

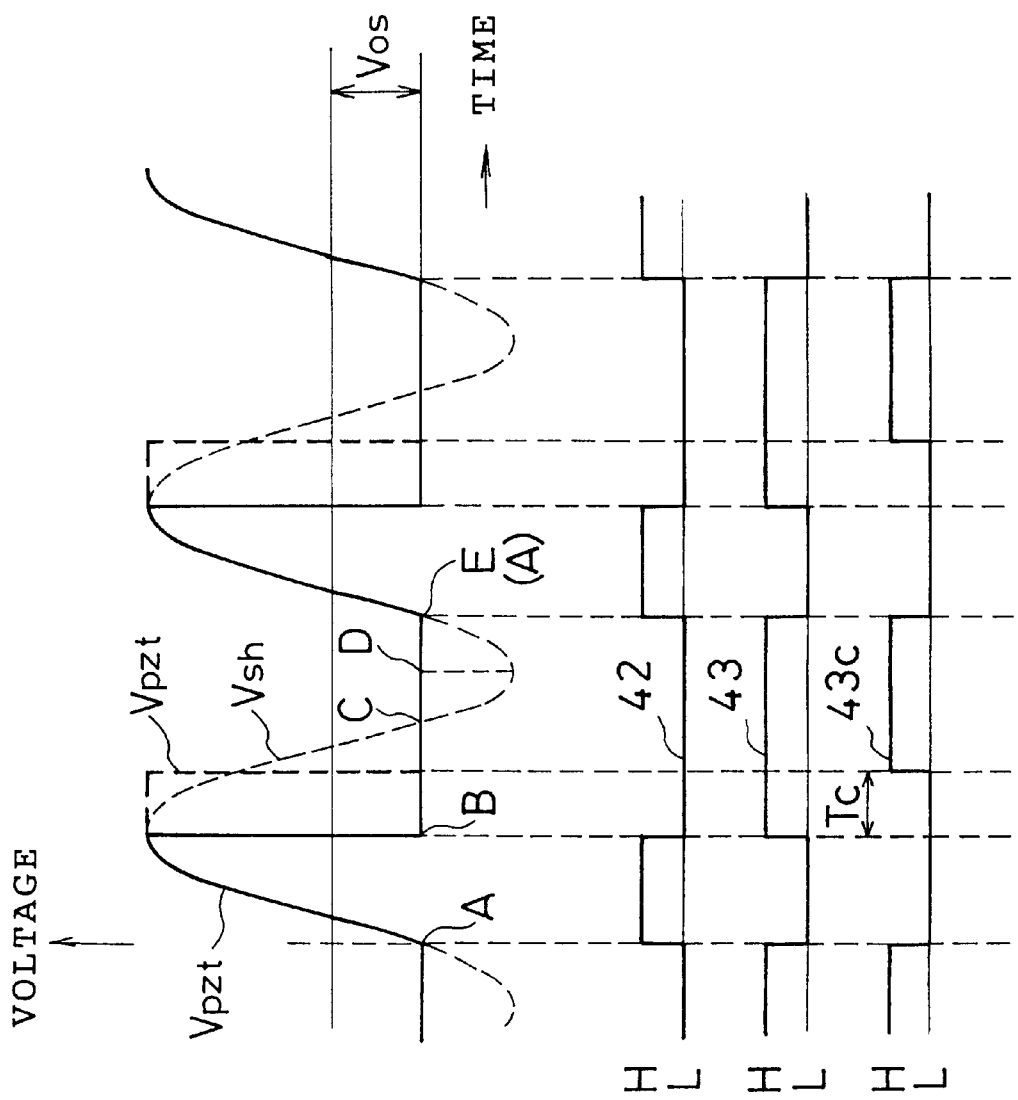

DRIVE PULSE GENERATING APPARATUS FOR DRIVE DEVICE USING ELECTROMECHANICAL TRANSDUCER

This application is based on patent applications 9-17703, 9-70893, 9-262912 and 9-262913 filed in Japan, the contents of which are hereby incorporated by reference.

BACKGROUND OF THE INVENTION

1. Field of the Invention

The present invention relates to a drive pulse generating apparatus, and more particularly to a drive pulse generating apparatus suitable for driving a drive device using an electromechanical transducer and an appliance including the drive pulse generating apparatus and drive device.

2. Description of the Prior Art

There has been known a linear movement type actuator or a rotary type actuator constituted such that elongation and contraction displacement is caused in an electromechanical transducer, for example, a piezoelectric element for driving a member constituting a camera or other precision devices, where the elongation and contraction displacement is transmitted to a driving member and a driven member is moved via a moving member frictionally coupled to the driving member (refer to Japanese Unexamined Patent Publication No. JP-A-4-69070 and Japanese Unexamined Patent Publication No. JP-A-63-11074).

FIG. 43 shows an example of a drive device applied in driving a zoom lens mounted to a camera in which slidable fitting portions 102a and 102b of a supporter 102 for supporting a lens barrel 101 that is a driven member, are brought into frictional contact with and slidably fitted to a drive shaft 103. Further, the drive shaft 103 is supported displaceably in the axial direction by support portions 105 and 106 of a frame 107. One end of a piezoelectric element 108 displacing in the thickness direction is fixed to one end portion of the drive shaft 103 in the axial direction and other end of the piezoelectric element 108 is fixed to the frame 107, and the drive shaft 103 is displaced in the axial direction by displacement of the piezoelectric element 108 in the thickness direction.

Further, numeral 104 designates a leaf spring which is fixed to the slidable fitting portions 102a and 102b of the supporter 102 by small screws, not illustrated, from the lower side in FIG. 43. A bent portion 104a that is bent upwardly is formed at the central portion of the leaf spring 104 by which the bent portion 104a is brought into pressing contact with the drive shaft 103 for causing a suitable frictional force at the contact portion.

When wavy drive pulses each comprising a gradual rising portion and a steep falling portion successive thereto as shown by FIG. 44(a), are applied to the piezoelectric element 108 in the drive mechanism shown by FIG. 43, the piezoelectric element 108 is displaced to elongate gradually in the thickness direction at the rising portions of the drive pulses and the drive shaft 103 is moved gradually in the axial direction in a direction of an arrow marked "a".

In this case, when a frictional force exerted between the drive shaft 103 and the slidable fitting portions 102a and 102b of the supporter 102 plus a frictional force exerted between the drive shaft 103 and the bent portion 104a of the leaf spring 104 are equal to or lower than a force exerted to the drive shaft 103 by the piezoelectric element 108, the supporter 102 is moved in the arrow mark "a" direction along with the drive shaft 23 in a state of being frictionally coupled to the drive shaft 103 and the lens barrel 101 is moved in the direction designated by the arrow mark "a".

In the meantime, at the steep falling portions of the drive pulses, the piezoelectric element 108 is displaced to contract rapidly in the thickness direction and accordingly, the drive shaft 103 is rapidly moved in the axial direction in a direction opposed to the arrow marked "a". The supporter 102, supported by the drive shaft 103 at the slidable fitting portions 102a and 102b, stays at the position by surpassing the frictional force exerted between the drive shaft 103 and the slidable fitting portions 102a and 102b of the supporter 102 and the frictional force exerted between the drive shaft 103 and the bent portion 104a of the leaf spring 104 by inertia thereof and accordingly, the lens barrel 101 remains unmoved.

By continuously applying the drive pulses having the above-described waveform (trapezoidal waveform) to the piezoelectric element 108, the lens barrel 101 can be moved continuously in the direction designated by the arrow mark "a" (forward direction). In moving the lens barrel 101 in a direction opposed to the arrow marked "a" (rearward direction), the rearward movement can be achieved by applying to the piezoelectric element 108 drive pulses having a waveform comprising a steep rising portion and a gradual falling portion successive thereto as shown by FIG. 44(b).

The speed control of a drive device using such a piezoelectric element has been accomplished by a method of adjusting a frictional coupling force exerted between a driving member and a driven member frictionally coupled thereto (supporter, lens barrel and the like in the above-described example), or by a method of adjusting the amplitude of the drive pulse.

However, according to the method of adjusting the frictional coupling force exerted between the driving member and the driven member frictionally coupled thereto, a constitution for adjusting the frictional coupling force is needed, that is, in the above-described example where the bent portion 104a bent upwardly is formed at the central portion of the leaf spring 104, the bent portion 104a is brought into pressing contact with the drive shaft 103 and a pertinent frictional force is caused at the contact portion, means for adjusting the height of the bent portion 104a for adjusting the press contact force or the like is needed and accordingly, the constitution is complicated.

Further, according to the method of adjusting the amplitude of the drive pulse, as shown by FIG. 47, in a range B where the amplitude of the drive pulse is equal to or greater than a predetermined value, the amplitude of the drive pulse applied to the piezoelectric element is substantially proportional to the drive speed of the driven member frictionally coupled to the driving member and the larger the amplitude of the drive pulse, the faster the drive speed. However, in a range A where the amplitude of the drive pulse is small, there causes a dead zone where the drive speed of the driven member frictionally coupled to the driving member remains unchanged even when the drive pulse is applied to the piezoelectric element, ripples are caused in the drive speed, the driven member cannot be driven, or the drive speed cannot be adjusted finely.

Further, the speed control of a drive device for driving the lens barrel 101 or the like can be carried out by thinning drive pulses applied to the piezoelectric element. That is, when the drive speed in driving the piezoelectric element by a series of continuous drive pulses is designated by notation V, if the drive efficiency is lowered by thinning the drive pulses from the series of drive pulses by a predetermined ratio, the drive speed is lowered in accordance with the ratio of thinning by which a target drive speed Vt can be provided.

Specifically, for example, when the drive speed for driving the piezoelectric element by the series of continuous drive pulses is designated by notation V and the target speed Vt can be provided by lowering the drive efficiency to m/k, the series of continuous drive pulses is divided into groups at every number of pulses of k (for example, k=5), m (for example, m=2) of the drive pulses are left in the groups of the series of drive pulses and (k−m) pulses (5−2=3 in the above-described example) are removed, the drive efficiency is lowered to m/k (⅖=0.4 in the above-described example) by which the target speed Vt can be provided.

FIG. 45 indicates a pulse series showing the above-described example in which a series of continuous drive pulses is divided into groups each comprising 5 pulses where 2 (m=2) drive pulses are left and 3 drive pulses are removed. Further, FIG. 46 is a diagram showing an example of a relationship between the drive efficiency and the drive speed.

As mentioned above, the conventional speed control of a drive device using a piezoelectric element is carried out by thinning drive pulses, however, it has been found that according to the method of speed control, there are drawbacks explained below.

According to a drive device using a piezoelectric element, a drive shaft is reciprocated at different speeds by displacements of elongation and contraction of the piezoelectric element having different speeds by which a driven member frictionally coupled to the drive shaft is moved. When the piezoelectric element is displaced gradually, the driven member is moved along with the drive shaft by being frictionally coupled to the drive shaft and when the piezoelectric element is displaced abruptly, the drive shaft stays in a stationary state by inertia by surpassing the frictional coupling force in respect of the drive shaft. That is, the driven member is moved in a predetermined direction by repeating the moving and stationary states and the drive speed in that case indicates an average drive speed provided by the repetition of the moving and stationary states.

Therefore, when the drive pulses applied to the piezoelectric element are not thinned, although the piezoelectric element, the drive shaft and the driven member of the drive device are vibrated at the frequency of the drive pulses, the vibrational noise is prevented from being offensive to the ear by setting the frequency of the drive pulses to audio frequencies or higher and mechanical vibration is not caused so considerably.

However, when the drive pulses are thinned, firstly, large intermittent mechanical vibration having a frequency in correspondence with the frequency of thinning is caused in the piezoelectric element, the drive shaft and the driven member.

Secondary, even when the frequency of the drive pulses is set to audio frequencies or higher, when the frequency of thinning falls in the range of audio frequencies, vibrational noise offensive to the ear is caused.

Thirdly, when the ratio of thinning the drive pulses is increased in order to drive the driven member at a low speed, nonuniformity of speed is enhanced and vibrational noise offensive to the ear becomes louder.

Furthermore, according to a pulse generating apparatus for generating drive pulses, a complicated circuit is used and therefore, the following problems to be resolved are posed.

Firstly, comparatively high voltage (several tens of volts) is needed for a peak voltage of the drive pulse applied to the piezoelectric element and therefore, when a low voltage power source (several volts) such as a battery is used as a power source, a booster circuit having a complicated constitution is needed for generating high voltage.

Secondary, according to a circuit of generating drive pulses in a trapezoidal waveform where a constant current circuit, a switching circuit and a timing circuit for controlling timing are combined, a total of the device is magnified and power consumption is increased.

SUMMARY OF THE INVENTION

It is a principal object of the present invention to provide a novel drive pulse generating apparatus capable of adjusting freely drive speed of a drive device using an electromechanical transducer.

It is another object of the present invention to provide a novel drive pulse generating apparatus suitable for driving a drive device using an electromechanical transducer where the drive speed is adjusted by adjusting waveform of drive pulses.

It is another object of the present invention to provide a novel drive pulse generating apparatus suitable for driving a drive device using an electromechanical transducer where the drive speed is adjusted by combining a plurality of drive pulses having different waveforms.

It is another object of the present invention to provide a novel drive pulse generating apparatus capable of freely adjusting waveform of drive pulses.

Other objects of the present invention will be apparent from the detailed description of the invention in reference to the drawings.

BRIEF DESCRIPTION OF THE DRAWINGS

FIGS. 3(a) and 3(b) are diagrams showing the constitution of a drive pulse generating circuit and drive device using a piezoelectric transducer.

FIGS. 4(a), 4(b), 4(c) and 4(d) are timing charts for explaining the operation of the drive pulse generating circuit;

FIGS. 5(a), 5(b) and 5(c) are diagrams for explaining a relationship between the waveform of drive pulses and timing signals (part 1);

FIGS. 6(a), 6(b) and 6(c) are diagrams for explaining a relationship between the waveform of drive pulses and timing signals (part 2);

FIGS. 7(a), 7(b) and 7(c) are diagrams for explaining a relationship between the waveform of drive pulses and timing signals (part 3);

FIGS. 8(a), 8(b) and 8(c) are diagrams for explaining a relationship between the waveform of drive pulses and timing signals (part 4);

FIGS. 10(a), 10(b) and 10(c) are diagrams for explaining formation of a drive pulse with a triangular wave pulse as a basic pulse;

FIGS. 11(a), 11(b) and 11(c) are diagrams for explaining formation of a drive pulse with a trapezoidal wave pulse as a basic pulse;

FIGS. 13(a), 13(b), 13(c), 13(d), 13(e) and 13(f) are timing charts for explaining the operation of a drive pulse generating circuit;

FIGS. 14(a), 14(b), 14(c) and 14(d) are diagrams for explaining a mixed state of trapezoidal wave drive pulses and sine wave drive pulses;

FIGS. 16(a), 16(b) and 16(c) are diagrams for explaining formation of a drive pulse with a triangular wave pulse as a basic pulse;

FIGS. 17(a), 17(b), 17(c) and 17(d) are diagrams for explaining formation of a drive pulse with a trapezoidal wave pulse as a basic pulse;

FIGS. 23(a), 23(b), 23(c) and 23(d) are diagrams for explaining operational timings of the drive pulse generating circuit shown by FIG. 22;

DETAILED DESCRIPTION OF THE PREFERRED EMBODIMENTS

An explanation will be given of a first embodiment of the present invention as follows. An explanation will firstly be given of drive pulses according to the present invention. According to the present invention, sine wave pulses having a predetermined amplitude are generated, and a portion of the waveform is cut in accordance with a desired moving speed thereby generating trapezoidal drive pulses capable of generating displacement in accordance with the moving speed.

Figure 1A:
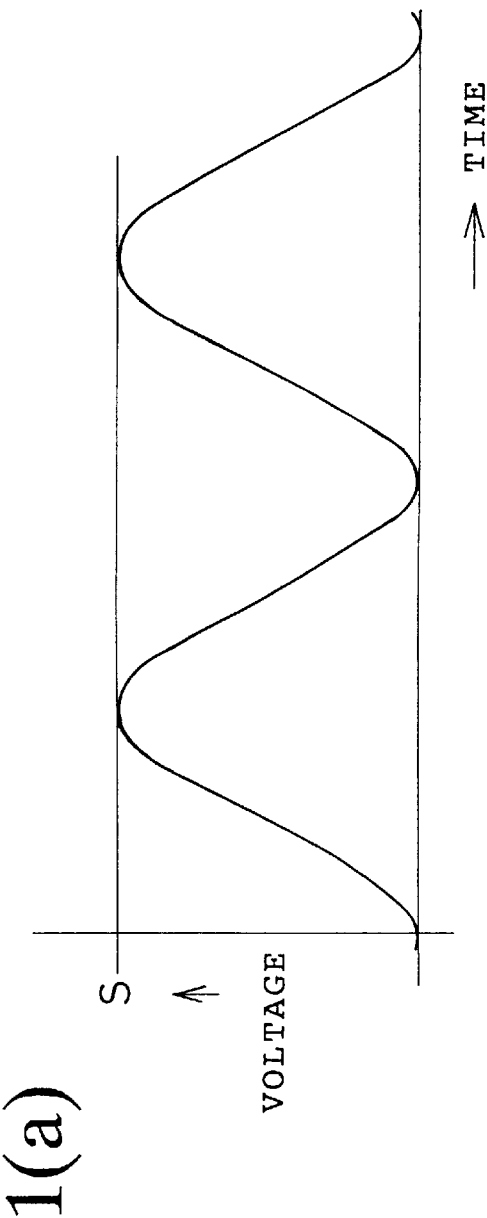
FIG. 1(a) and FIG. 1(b) are diagrams for explaining the waveform of drive pulses according to a first embodiment.

Firstly, an explanation will be given of the waveform of the drive pulse. FIG. 1(a) shows a pulse wave of a sine wave having a predetermined amplitude S (in the following explanation, referred to as sine wave drive pulse) and the pulse is constituted by a gradual rising portion and a gradual falling portion. When the pulse is applied to a piezoelectric element, although vibration is caused in a driven member, the driven member cannot be moved since magnitudes of generated elongation displacement and contraction displacement are equal to each other.

Figure 1B:
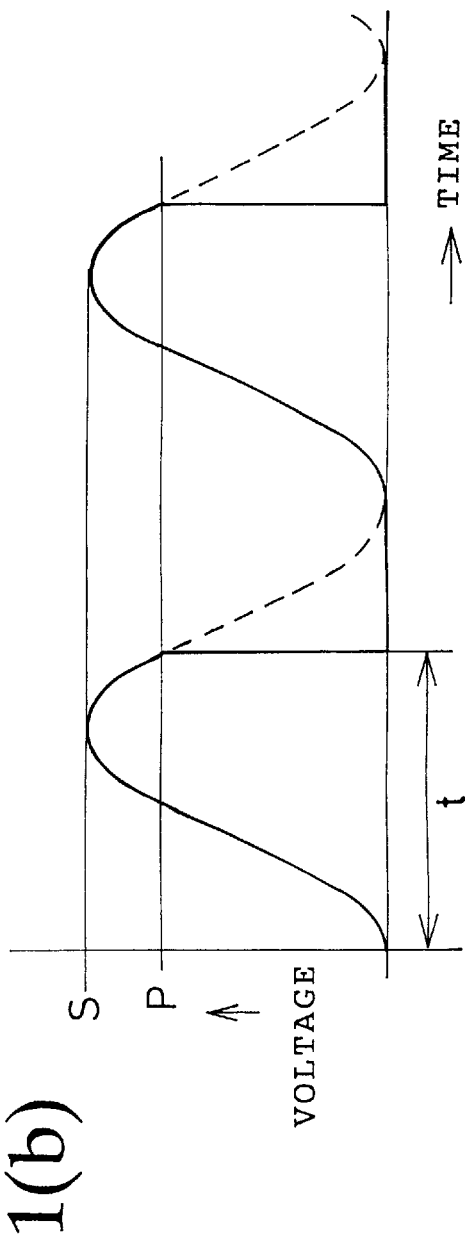

FIG. 1(b) shows a drive pulse where the gradual falling portion of the sine wave drive pulse shown by FIG. 1(a) is interrupted at a height P, that is, at a position of an amplitude P to thereby form a steep falling portion. The pulse is basically a pulse comprising a gradual rising portion and a steep falling portion and therefore, the pulse is the same as the drive pulse having a waveform shown by FIG. 44(a) explained previously as the conventional example.

That is, at the gradual rising portion of the drive pulse shown by FIG. 1(b), gradual elongation displacement is caused in the piezoelectric element by which the drive shaft fixedly coupled to the piezoelectric element and the driven member frictionally coupled to the drive shaft are moved. At the steep falling portion of the drive pulse, abrupt contraction displacement is caused in the piezoelectric element and the drive shaft fixedly coupled to the piezoelectric element is also moved in a direction opposed to the preceding direction, however, the driven member frictionally coupled to the drive shaft stays at the portion by the inertia and is not moved. By continuously applying to the piezoelectric element the drive pulses having the above-described waveform, the driven member is moved in a predetermined direction at a predetermined speed as a whole while repeating very small vibration.

Figure 2:
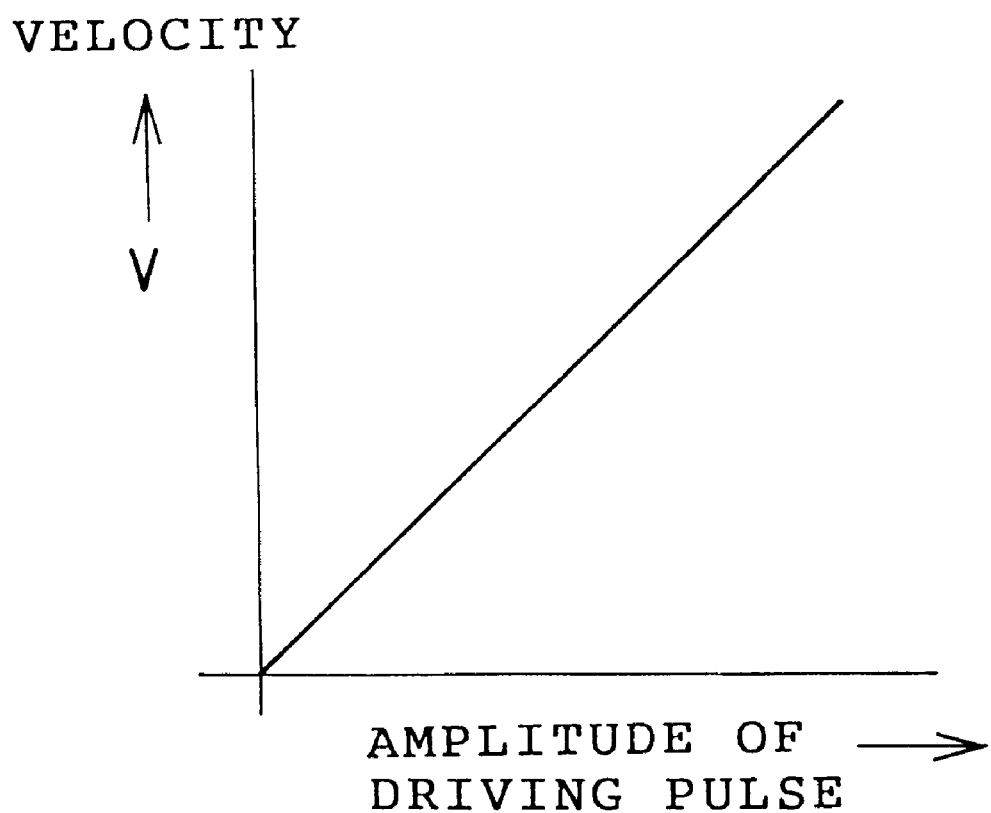
FIG. 2 is a diagram for explaining a relationship between an amplitude and a drive speed at a steep rising portion of a drive pulse.

The height, that is, the amplitude P of the steep rising portion of the drive pulse shown by FIG. 1(b), is changed by changing a time period t from a reference time point. For example, the longer the time period t is, the smaller the amplitude P becomes and the more the drive speed is retarded. FIG. 2 is a diagram for explaining a relationship between the amplitude P and the drive speed V at the steep rising portion of the drive pulse showing that the drive speed V is linearly changed in respect of the magnitude of the amplitude P and the larger the amplitude P is, the faster the drive speed V becomes. Further, in the following explanation, the drive pulse having a waveform shown by FIG. 1(b) is referred to as a trapezoidal wave drive pulse.

According to the above-described trapezoidal wave drive pulse, the maximum amplitude S is constant and sufficiently large and therefore, there causes no dead zone where the drive speed of the driven member frictionally coupled to the driving member remains unchanged when the drive pulses are applied to the piezoelectric element and the drive speed is substantially proportional to the amplitude P of the drive pulses by which the speed characteristic having excellent linearity can be provided.

FIG. 3(a) is a block diagram showing a drive pulse generating circuit 10 and drive device 70. A detailed explanation is omitted because the circuit and the device are a well-known construction.

Drive pulse generating circuit 10 generates drive pulses capable of performing speed control of drive device 70 using a piezoelectric transducer. Drive device 70 is an example applied for moving a lens barrel of an optical system.

In FIG. 3(a), a drive pulse generating circuit 10 is constituted by a microprocessor (CPU) 11, a sine wave drive pulse generator 12, a switching unit 14, a piezoelectric element drive unit 15 and piezoelectric element 16 connected to the piezoelectric element drive unit 15. The sine wave drive pulse generator 12 is a well known generator for generating the sine wave shown by FIG. 1(a).

One end of the piezoelectric element 16 is fixedly adhered to a stationary member 79, and another end of said element 16 is adhered to a drive shaft 71 supported by supporting means (not shown) so as to be freely disposed in the axial direction.

Numeral 72 designates a slider block, and the drive shaft 71 penetrates the slider block 72 in the horizontal direction. An opening portion 72a is formed on an upper half portion of the slider block 72 where the drive shaft 71 penetrates whereby the upper half portion of the drive shaft 71 is exposed.

A pad 73 which is brought into contact with the upper half portion of the drive shaft 71 is inserted into this opening portion 72a, a projection 73a is provided on the upper half portion of the pad 73, the projection 73a of the pad 73 is pressed down by a spring 74, and a downward urging force F is applied on the pad 73 at a portion which is brought into contact with the drive shaft 71. Below the slider block 72, a lens holder 75 is fixed so as to hold a lens L.

By the above described constitution, the slider block 72 including the pad 73 and the drive shaft 71 are frictionally coupled.

When drive pulses having a gradual rising portion and steep falling portion are applied to the piezoelectric element 16, at the gradual rising portion of the drive pulses, the piezoelectric element 16 is displaced to elongate gradually in the thickness direction and the drive shaft 71 is also moved in the axial direction as shown marked "a".

By adjusting the frictional force between the drive shaft 71 and glider block 72 is equal to or lower than the force exerted to the drive shaft 71 by the piezoelectric element 16, slider block 72 is moved in the arrow marked "a" direction frictionally coupled with the drive shaft 71. Then, lens L is moved in the direction shown marked "a".

At the steep falling portion of the drive pulses, the piezoelectric element 16 is displaced so as to contract rapidly in the thickness direction and the drive shaft 71 is moved in the direction opposed to axial direction marked "a".

The slider block 72 frictionally coupled on the drive shaft 71 stays at the position by surpassing the frictional force exerted between the drive shaft 71 and slider block 72 by inertia thereof and accordingly, the lens barrel 75 and lens L remains unmoved.

Figure 3B:
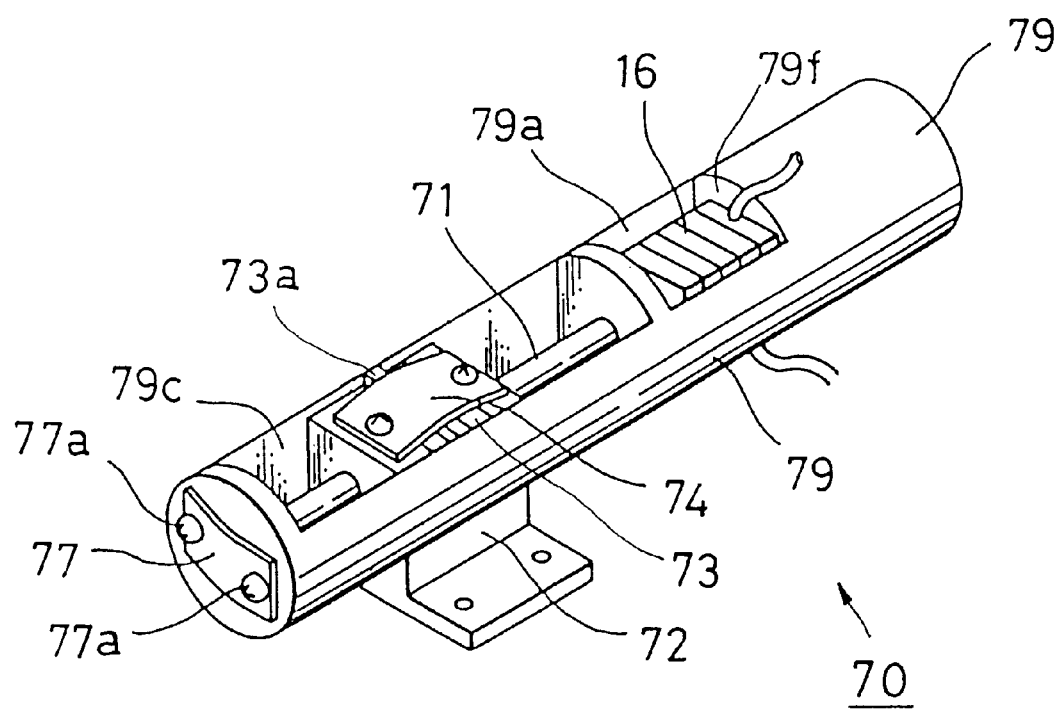

FIG. 3(b) is a perspective view showing a detailed construction of drive device 70. The drive device 70 comprises a stationary member 79, a piezoelectric element 16, a drive shaft 71 and slider block 72.

Stationary member 79 is substantially cylindrical shape and has a hole 79a in which to accommodate the piezoelectric element 16 and hole 79c in which to house the slider block 72.

A partition 79g is formed between the holes 79a and 79c. An end plate 79h is provided to terminate the hole 79c at the end of the stationary member 79.

One end of the piezoelectric element 16 is adhered fixedly to the wall 79f of the hole 79a and other end of element 16 is adhered to an end of the drive shaft 71.

The drive shaft 71 is supported in an axially movable manner by a bearing hole on the portion 79g of the stationary member 79 as well as by a bearing hole on the end plate 79h.

A plate spring 77 is secured with screws 77a to the end plate 79h of the stationary member 79 in such a manner so that the drive shaft 71 which slightly protrudes from the bearing hole is pushed inward in the axial direction.

The slider block 72 is housed within the hole 79c. The right and left hand walls flanking the hole 79c in its longitudinal direction serve as rotation stoppers and guides for allowing the slider block 72 to move axially along the Stationary member 79.

The drive shaft 71 is penetrated in the slider block 72 in the horizontal direction. An opening 72a is formed on the slider block 72 and a pad 73 is inserted into the opening. The pad 73 is urging downwardly by the spring 74 and downward urging force F is applied on the pad 73 at the portion which is brought into contact with the drive shaft 71.

By the above explained constitution, the slider block 72 including the pad 73 and drive shaft 71 are thus frictionally coupled.

FIGS. 4(a), 4(b), 4(c) and 4(d) are timing charts for explaining the operation of the drive pulse generating circuit 10 in which FIG. 4(a) shows an output waveform from the sine wave drive pulse generator 12 and FIG. 4(b) shows a timing signal A outputted from CPU 11. FIG. 4(d) shows an example of a timing signal B for interrupting an output of the sine wave drive pulse and FIG. 4(c) shows an output waveform of a trapezoidal wave drive pulse where a portion of the sine wave drive pulse is interrupted by the timing signal B shown by FIG. 4(d).

Next, an explanation will be given of the operation in reference to FIG. 3(a) and FIGS. 4(a), 4(b), 4(c) and 4(d). An explanation will firstly be given of the case where a driven member is driven in a forward direction. The sine wave drive pulse generator 12 generates drive pulses of a predetermined sine wave (refer to FIG. 4(a)) in synchronism with the timing signal A (refer to FIG. 4(b)) outputted from CPU 11 and outputs the pulse to the switching unit 14. When CPU 11 receives a speed instruction signal C from an outside device, not illustrated, CPU 11 outputs to the switching unit 14 the timing signal B at high "H" level (refer to FIG. 4(d)) during a time period PW following timing in which a time period "t" that is determined in accordance with the drive speed instructed with the rising edge of the timing signal A as a reference time point) has elapsed.

The switching unit 14 interrupts the output of the drive pulse outputted from the sine wave drive pulse generator 12 during the time period (time period PW) where the timing signal B is at "H" level. Thereby, the trapezoidal wave drive pulses are applied to the piezoelectric element 16.

The elapsed time period t (time point t) where the timing signal B changes to "H" level and the duration of time period PW (width of PW) of "H" level differ in accordance with the direction of moving the driven member and the instructed drive speed and when the driven member is driven in the forward direction, the gradual falling portion of the sine wave drive pulse is interrupted and the steep falling portion is formed. Further, when the instructed drive speed is fast, the falling portion is made proximate to the peak of the sine wave drive pulse and when the drive speed is retarded, the falling portion is made remote from the peak of the sine wave drive pulse.

FIGS. 5(a), 5(b) and 5(c) show the case where the instructed drive speed is the fastest in driving the driven member in the forward direction in which FIG. 5(a) shows an outputted trapezoidal wave drive pulse, FIG. 5(b) shows the timing signal A and FIG. 5(c) shows the timing signal B, respectively. In this case, the timing signal B is changed to "H" level at a time point t1 such that the falling portion of the trapezoidal wave drive pulse coincides with the peak of the sine wave drive pulse. In this occasion, the height of the trapezoidal drive pulse is P1. A time point where the timing signal B is changed from "H" level to low "L" level, coincides with a time point where the timing signal A is changed from "L" level to "H" level and a time period of "H" level is PW1.

FIGS. 6(a), 6(b) and 6(c) show the case where the instructed drive speed is slower in driving the driven member in the forward direction in comparison to FIGS. 5(a)–5(c). FIG. 6(a) shows the trapezoidal wave drive pulse, FIG. 6(b) shows the timing signal A and FIG. 6(c) shows the timing signal B, respectively. In this case, the falling portion of the trapezoidal wave drive pulse is retarded from the peak of the sine wave drive pulse and the timing signal B is changed to "H" level at a time point t2. In this occasion, the height of the trapezoidal wave drive pulse is P2. A time point where the timing signal B is changed from "H" level to "L" level, coincides with a time point where the timing signal A is changed from "L" level to "H" level and a time period of "H" level is PW2.

In driving the driven member in the rearward direction (direction opposed to the above-described direction), the gradual rising portion of the sine wave drive pulse is interrupted to form a steep rising portion, when the instructed drive speed is fast, the rising portion is made proximate to the peak of the sine wave drive pulse and when the drive speed is slow, the rising portion is made remote from the peak of the sine wave drive pulse.

FIGS. 7(a), 7(b) and 7(c) show the case where the instructed drive speed is a little slow in driving the driven member in the rearward direction in which FIG. 7(a) shows the trapezoidal drive pulse, FIG. 7(b) shows the timing signal A and FIG. 7(c) shows the timing signal B, respectively. In this case, the timing signal B is changed to "H" level from a time point where the sine wave drive pulse is at null level and the timing signal B is changed to "L" level at a time point t4 to thereby form the rising portion. In this occasion, the height of the trapezoidal drive pulse is P4. A time point where the timing signal B is changed from "L" level to "H" level, coincides with a time point where the timing signal A is changed from "L" level to "H" level and a time period of "H" level is PW4.

FIGS. 8(a), 8(b) and 8(c) show the case where the instructed drive speed is the fastest in driving the driven member in the rearward direction in which FIG. 8(a) shows the trapezoidal drive pulse, FIG. 8(b) shows the timing signal A and FIG. 8(c) shows the timing signal B, respectively. In this case, the timing signal B is changed to "H" level from a time point where the sine wave drive pulse is at null level and the timing signal B is changed to "L" level at a time point t5 such that the rising portion coincides with the peak of the sine wave drive pulse by which the rising portion is formed. In this occasion, the height of the trapezoidal drive pulse is P5. A time point where the timing signal B is changed from "L" level to "H" level, coincides with a time point where the timing signal A is changed from "L" level to "H" level and a time period PW of "H" level is PW5.

Next, an explanation will be given of a relationship between the time period PW where the timing signal B in correspondence with the instructed drive speed V is at "H" level and the height P of the trapezoidal drive pulse.

Figure 9A:
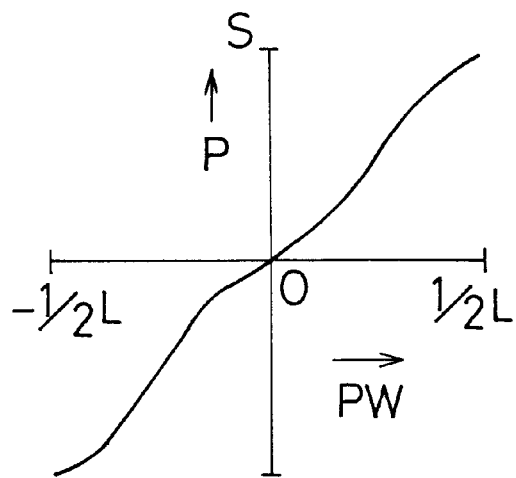
FIGS. 9(a), 9(b), 9(c) and 9(d) are diagrams for explaining a relationship among an H level period PW of a timing signal, a height P of a trapezoidal drive pulse and a drive speed V.

FIG. 9(a) is a diagram showing a relationship between the time period PW where the timing signal B is at "H" level and the height P of the trapezoidal drive pulse in which when the time period PW is changed in a range of ½ of the wavelength L (=½ L) of the sine wave drive pulse through −½ of the wavelength (=−½ L), the height P of the trapezoidal drive pulse is changed as shown by FIG. 9(a). The height P of the trapezoidal drive pulse in the time period PW of 0 through ½ L designates the falling height and the height P of the trapezoidal drive pulse in the time period PW of 0 through −½ L designates the rising height.

Figure 9B:
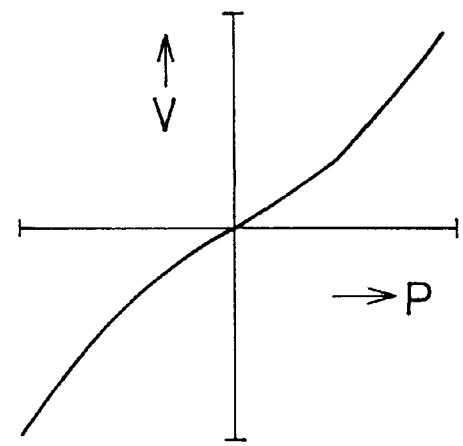

FIG. 9(b) is a diagram showing a relationship between the height P of the trapezoidal drive pulse and the drive speed V, showing that when the height P of the drive pulse increases, the drive speed V becomes faster substantially proportionally.

Figure 9C:
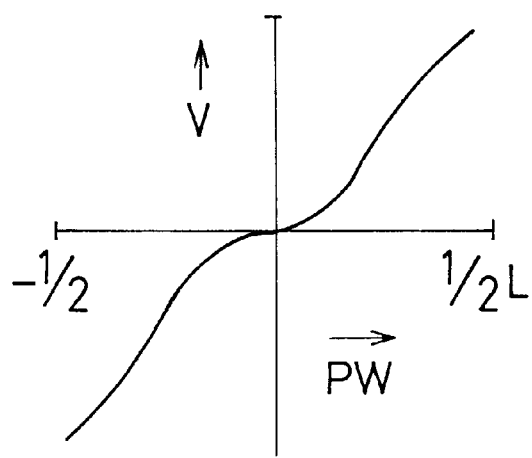

FIG. 9(c) is a diagram showing a relationship between the time period PW where the timing signal B is at "H" level and the drive speed V, which is formed based on the relationship between the time period PW where the timing signal B is at "H" level and the height P of the trapezoidal pulse shown by FIG. 9(a) and the relationship between the height P of the trapezoidal drive pulse and the drive speed V shown by FIG. 9(b).

Figure 9D:
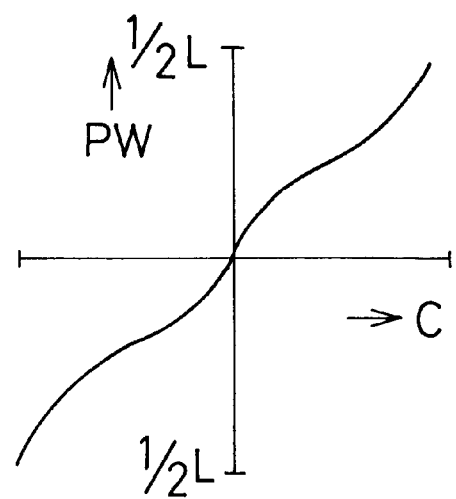

FIG. 9(d) is a diagram showing a relationship between the speed instruction signal C and the time period PW where the timing signal B is at "H" level in which a characteristic in correspondence with an inverse function in respect of FIG. 9(c) is set to improve the linearity of the relationship between the time period PW where the timing signal B is at "H" level and the drive speed V shown by FIG. 9(c). By storing the relationship between the speed instruction signal C and the time period PW shown by FIG. 9(d) in a memory of CPU as a look-up table and by instructing the speed instruction signal C in accordance with a desired drive speed, the time period PW in correspondence therewith where the timing signal B is at "H" level can be calculated. In this way, by setting the speed instruction signal C and the time period PW where the timing signal B is at "H" level such that a proportional relationship is established, the trapezoidal wave drive pulse having excellent linear response in respect of the instructed speed where the drive speed is accompanied by inconsiderable ripples can be generated.

With respect to the switching of the drive direction of the driven member, other than the above-described method of changing the waveform of the trapezoidal drive pulse, the switching can also be achieved by outputting a switch signal D reverting electrodes of the piezoelectric element to which the drive pulses are applied, from CPU 11 to the piezoelectric drive unit 15 (refer to FIG. 3(a)) based on information indicating forward movement or rearward movement included in the speed instruction signal C by which the drive pulses in the reverse direction are applied to the piezoelectric element.

In this way, the trapezoidal wave drive pulse is formed in a waveform in correspondence with the speed instruction signal C and the maximum amplitude is maintained to a predetermined amplitude and accordingly, no dead zone is caused even at a low drive speed.

Further, when the drive speed is set to null, the time period PW where the timing signal B is at "H" level is nullified and therefore, the drive pulse of sine wave is outputted. Although the drive pulse of sine wave causes elongation and contraction displacements in the piezoelectric element, the driven member is not driven since the speeds and the amplitudes in the elongation direction and the contraction direction are equal to each other. Accordingly, when the drive speed is set to null, the drive pulse of sine wave may be applied to the piezoelectric element or this state also can be achieved by stopping to apply the drive pulse.

According to the drive pulse generating circuit explained above, the drive pulse of sine wave is adopted as the basic pulse for generating the trapezoidal wave drive pulse. However, the basic pulse is not limited to the drive pulse of sine wave but the basic pulse may be a pulse where the rising portion and the falling portion are symmetrical with each other and a pulse of a waveform capable of providing a trapezoidal wave drive pulse having different angles of inclination of the rising portion and the falling portion by interrupting a portion thereof. For example, the basic pulse may be a triangular wave pulse where the angles of inclination of the rising portion and the falling portion are equal to each other or a trapezoidal wave pulse formed by truncating the top portion of the triangular wave pulse. The triangular wave and the trapezoidal wave are constituted by harmonics at odd number orders. An explanation will be given thereof as follows.

FIG. 10(a), 10(b) and 10(c) explain formation of a drive pulse with a triangular wave pulse as a basic pulse and a triangular wave pulse of an isosceles triangle of FIG. 10(a) is generated by the timing signal A shown by FIG. 10(b). Further, a trapezoidal wave drive pulse having a waveform shown by bold lines of FIG. 10(a) can be generated by interrupting a portion or a total of the falling portion of the triangular wave pulse at a time point t by the timing signal B instructing interruption shown by FIG. 10(b).

By changing the width of the time period PW where the timing signal B is at "H" level in correspondence with the instructed speed, the trapezoidal wave drive pulse in correspondence with the instructed drive speed can be generated while maintaining the amplitude P of the drive pulse at a predetermined amplitude (maximum amplitude of triangular wave pulse).

Further, FIGS. 11(a), 11(b), 11(c) and 11(d) explain formation of a drive pulse with a trapezoidal wave pulse as a basic pulse in which a trapezoidal wave pulse is generated by a timing signal A1 shown by FIG. 11(b).

The timing signal A1 is generated based on the timing signal A shown by FIG. 11(c) and accordingly, a signal A1 has a period the same as a period of the timing signal A. Further, by interrupting a portion or a total of the falling portion of the trapezoidal wave pulse by the timing signal B instructing interruption shown by FIG. 11(d), a trapezoidal wave drive pulse having a waveform shown by bold lines in FIG. 11(a) can be generated.

Also in this case, by changing the width of the time period PW where the timing signal B is at "H" level in correspondence with the instructed speed, a trapezoidal wave drive pulse in correspondence with the instructed speed can be generated while maintaining the amplitude of the drive pulse at a predetermined amplitude (maximum amplitude of trapezoidal wave pulse).

Further, by interrupting a portion or a total of the rising portion of the triangular wave pulse or the trapezoidal wave pulse, a drive pulse having an opposite drive direction can be generated similar to the above-described case of generating the drive pulse with the sine wave pulse as the basic pulse.

Next, an explanation will be given of a second embodiment of the present invention.

According to the second embodiment, drive pulses are formed by combining a single or a plurality of respectives of two kinds of pulses of a drive pulse having a waveform capable of moving a driven member and a drive pulse having a waveform incapable of moving the driven member in accordance with a desired moving speed. Drive pulses combining two kinds of pulses are applied to an electromechanical transducer, for example, a piezoelectric element by which the drive speed is controlled, in which the drive speed is not controlled by thinning partially a series of drive pulses in the conventional case of controlling the drive speed. Thereby, various drawbacks caused by thinning the drive pulses can be resolved.

Figure 12A:
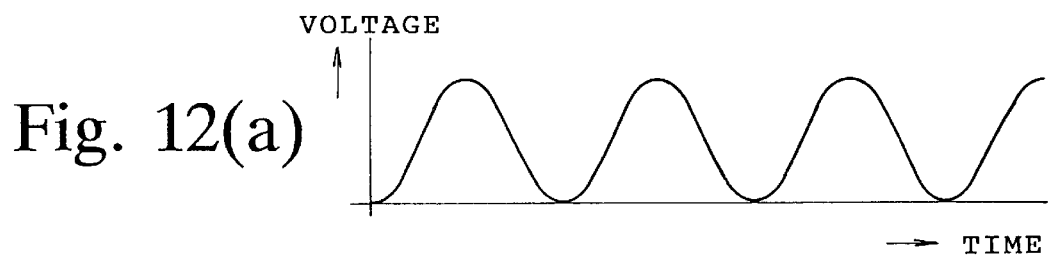
FIGS. 12(a), 12(b), 12(c), 12(d) and 12(e) are diagrams for explaining the waveform of drive pulses according to a second embodiment.

Firstly, an explanation will be given of a waveform of a drive pulse. FIG. 12(a) shows a sine wave pulse constituted by a gradual rising portion and a gradual falling portion. When the pulse is applied to a piezoelectric element, although vibration is caused in a driven member, the driven member cannot be moved since the magnitudes of generated elongation displacement and contraction displacement are equal to each other. The drive pulse of the waveform shown by FIG. 12(a) is used in holding the driven member at a stationary state. In the following explanation, this is referred to as a sine wave drive pulse.

Figure 12B:
Figure 44A:
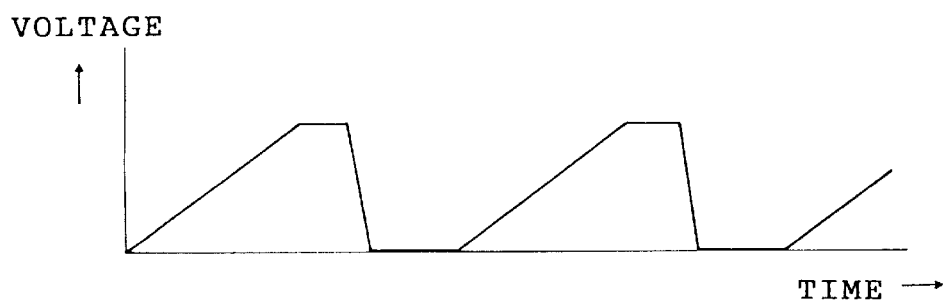
FIGS. 44(a) and 44(b) are diagrams for explaining the waveforms of drive pulses used in the conventional drive device.

FIG. 12(b) shows a drive pulse formed by substituting a steep falling portion for the gradual falling portion of the sine wave drive pulse shown by FIG. 12(a), the pulse is a pulse comprising the gradual rising portion and the steep falling portion and therefore, the pulse is basically the same as the drive pulse of the waveform shown by FIG. 44(a) explained previously as the conventional example.

Figure 12C:

Further, FIG. 12(c) shows a drive pulse substituting a steep falling portion for a portion of the gradual falling portion of the drive pulse shown by FIG. 12(a), the pulse is provided with the gradual rising portion and the partially steep falling portion which is similar to the drive pulse of the waveform shown by FIG. 12(b), however, the drive speed of the driven member is retarded by an amount of a shorter time period of the steep falling portion.

Figure 12D:
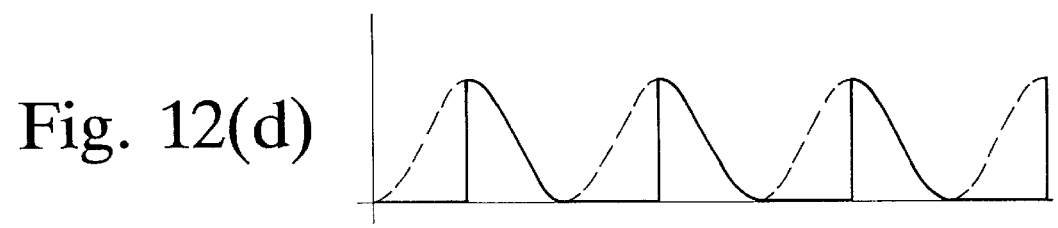
Figure 44B:
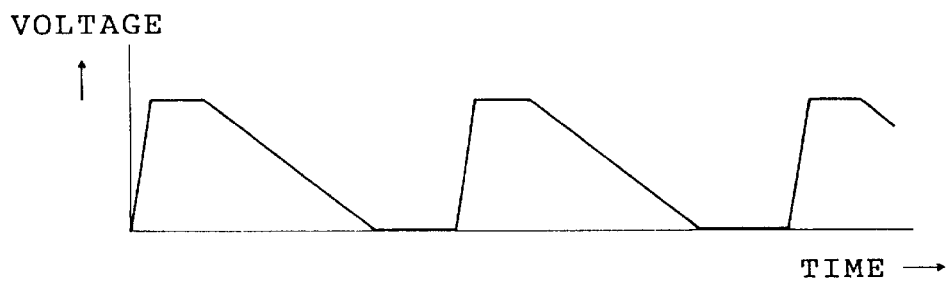
Figure 45:
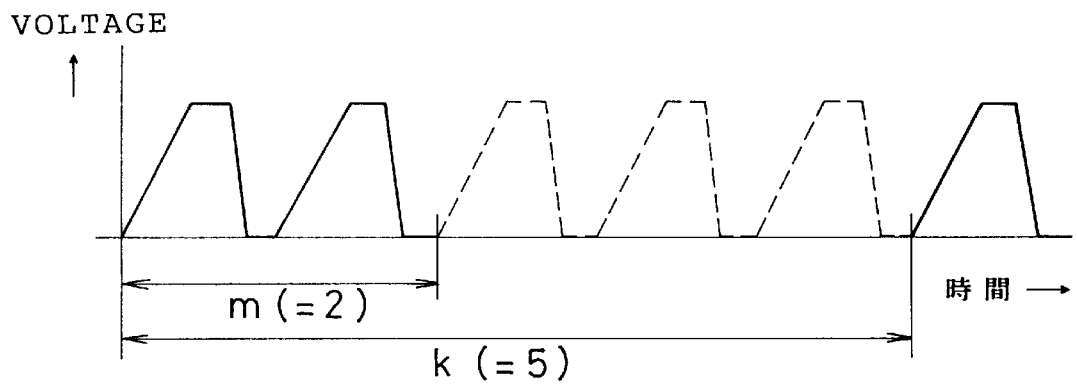
FIG. 45 is a diagram showing an example where a series of drive pulses are divided in groups each comprising a plurality of pulses with portions of pulses are removed.
Figure 46:
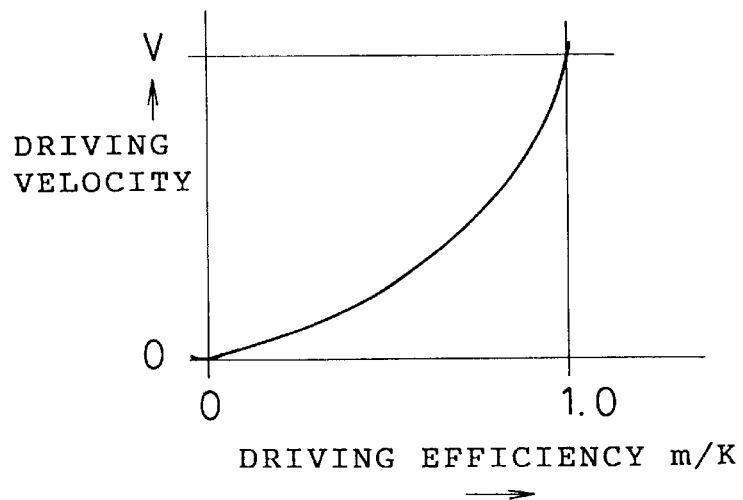
FIG. 46 is a diagram showing an example of a relationship between drive efficiency and drive speed.
Figure 47:
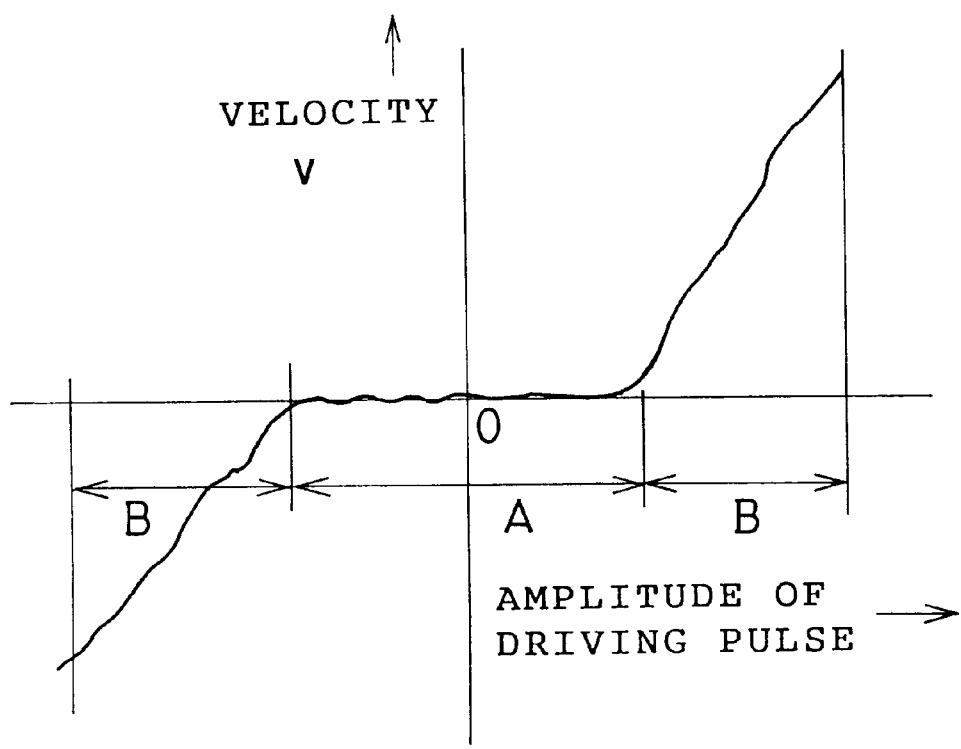
FIG. 47 is a diagram showing a relationship between drive pulse amplitude and drive speed according to the conventional drive device.

FIG. 12(d) shows a drive pulse substituting a steep rising portion for the gradual rising portion of the sine wave drive pulse shown by FIG. 12(a), the pulse is a pulse comprising the steep rising portion and the gradual falling portion and accordingly, the pulse is basically the same as the drive pulse of the waveform shown by FIG. 44(b) explained previously as the conventional example.

Figure 12E:
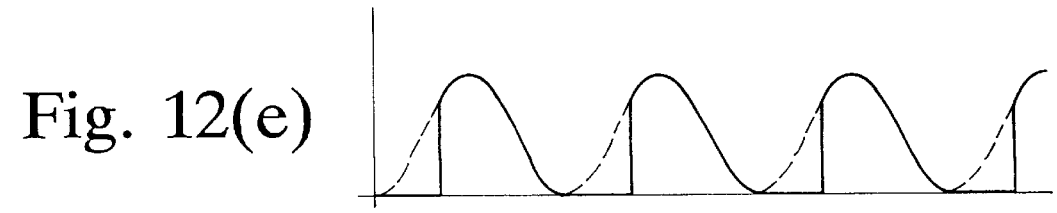

Further, FIG. 12(e) shows a drive pulse substituting a steep rising portion for a portion of the gradual rising portion of the drive pulse shown by FIG. 12(d), the pulse is provided with the partially steep rising portion and the gradual falling portion which is similar to the drive pulse of the waveform shown by FIG. 12(d), however, the drive speed of the driven member is retarded by an amount of a shorter time period of the steep rising portion.

In the following explanation, the drive pulses of the waveforms shown by FIGS. 12(b), 12(c), 12(d) and 12(e) are generally referred to as trapezoidal wave drive pulses.

Further, according to the trapezoidal wave drive pulses shown by FIGS. 12(b), 12(c), 12(d) and 12(e), the steep rising portions or the steep falling portions are formed with the sine wave drive pulse shown by FIG. 12(a) as an input and therefore, the trapezoidal wave drive pulses can be obtained by making OFF an output of the sine wave drive pulse or making ON the output at predetermined timings.

The driven member can be driven at a desired drive speed in the forward direction by pertinently combining the sine wave drive pulse shown by FIG. 12(a) and the trapezoidal wave drive pulses shown by FIG. 12(b) and FIG. 12(c) explained above. Further, the driven member can be driven at a desired drive speed in the rearward direction (direction opposed to the previous direction) by pertinently combining the sine wave drive pulse shown by FIG. 12(a) and the trapezoidal drive pulses shown by FIG. 12(d) and FIG. 12(e).

A drive pulse generating circuit in this case capable of performing speed control applicable to a drive device using a piezoelectric element is the same as the constitution explained in the first embodiment in reference to FIG. 3, and therefore, FIG. 3 is referred and an explanation thereof will be omitted.

FIGS. 13(a), 13(b), 13(c), 13(d), 13(e) and 13(f) are timing charts for explaining the operation of the drive pulse generating circuit 10 in which FIG. 13(a) shows a waveform outputted from the sine wave drive pulse generator 12 and FIG. 13(b) shows the timing signal A outputted from CPU 11. FIG. 13(d) shows an example of the timing signal B interrupting the output of the sine wave drive pulse and FIG. 13(c) shows an output waveform where portion of the sine wave drive pulse is interrupted by the timing signal B shown by FIG. 13(d).

Further, FIG. 13(f) shows another example of the timing signal B interrupting the output of the sine wave drive pulse and FIG. 13(e) shows a waveform where portion of the sine wave drive pulse is interrupted by the timing signal B shown by FIG. 13(f).

Next, an explanation will be given of the operation in reference to FIG. 3 and FIGS. 13(a), 13(b), 13(c), 1(d), 13(e) and 13(f). First, an explanation will be given of the case of driving the driven member in the forward direction. The sine waveform drive pulse generator 12 generates a predetermined sine waveform drive pulse (refer to FIG. 13(a)) in synchronism with the timing signal A (refer to FIG. 13(b)) outputted from CPU 11 and outputs the pulse to the switching unit 14. Upon receiving the speed instruction signal C from an outside device, not illustrated, CPU 11 outputs the timing signal B (refer to FIG. 13(d)) instructing interruption to the switching unit 14 at timings in accordance with instructed speed and interrupts the output of the drive pulse outputted from the sine waveform drive pulse generator 12 during a time period t1. Thereby, as shown by FIG. 13(c), a drive pulse mixed with the sine waveform drive pulse and the trapezoidal wave drive pulse is inputted to the piezoelectric element 16 through the piezoelectric element drive unit 15.

In driving the driven member in the rearward direction, upon receiving the speed instruction signal from an output device, not illustrated, CPU 11 outputs the timing signal B (refer to FIG. 13(f)) instructing interruption to the switching unit 14 and interrupts the output of the drive pulse outputted from the sine waveform drive pulse generator 12 during a time period t2. Thereby, as shown by FIG. 13(e), a drive pulse mixed with the sine waveform drive pulse and the trapezoidal wave drive pulse is applied to the piezoelectric element 16.

An explanation will be given of the drive speed and a ratio of mixing the trapezoidal wave drive pulse and the sine wave drive pulse. Assume that the control of the drive speed is performed with k of drive pulses as one unit and the one unit is constituted by a total of k (k=m+n) of m of the trapezoidal wave drive pulses and n of the sine wave drive pulses.

FIGS. 14(a) and 14(c) show series of drive pulses in the case of this example and in this case, the maximum drive speed is obtained when the one unit of drive pulses are constituted by k of the trapezoidal drive pulses (m=k, n=0) and the drive speed is nullified when the one unit of drive pulses are constituted by 0 of the trapezoidal drive pulses (m=9, n=k) and in that case the drive speed can be represented by the maximum drive speed V×(m/k). Here, the number k represents numbers of drive pulses (m+n) and (m/k) represent drive efficiency. Further, the time period of the one unit of drive pulses comprising k of drive pulses is referred to as control period.

For example, when the drive speed Vt is intended to be 40% of the maximum drive speed V, in the case where the number of drive pulses included in 1 control period is set to k=5, if the number of the trapezoidal drive pulses is 2 (m=2) and the number of the sine wave drive pulses is 3 (n=3), $$\text{drive speed } Vt = V(m/k)$$
$$= V(2/5)$$

whereby 40% of the maximum drive speed V can be obtained as the drive speed Vt.

FIGS. 14(a) and 14(c) show series of drive pulses in the case of this example in which in FIG. 14(a), in respect of the number of the drive pulses in one unit of k=5, the initial two drive pulses are constituted by the trapezoidal wave drive pulses (m=2) and the three drive pulses in succession thereto are constituted by the sine wave drive pulses (n=3). The timing signal B for instructing interruption is as shown by FIG. 14(b).

Further, in FIG. 14(c), in the case of the number of drive pulses included in one control period of k=5, a first and a third drive pulses are constituted by the trapezoidal wave drive pulses (m=2) and a second, a fourth and a fifth drive pulses are constituted by the sine wave drive pulses (n=3). The timing signal B for instructing interruption in this case is as shown by FIG. 14(d).

According to the mixed pattern of FIG. 14(c), nonuniformity of the drive speed is reduced compared with the mixed pattern of FIG. 14(a) and therefore, the mixed pattern of FIG. 14(c) is more preferable. The larger the number of drive pulses included in one control period is, the more the changes can be set to the mixed pattern of the trapezoidal wave drive pulse and the sine wave drive pulse and therefore, the nonuniformity of the drive speed can be reduced and the speed can be set more finely.

Figure 15A:
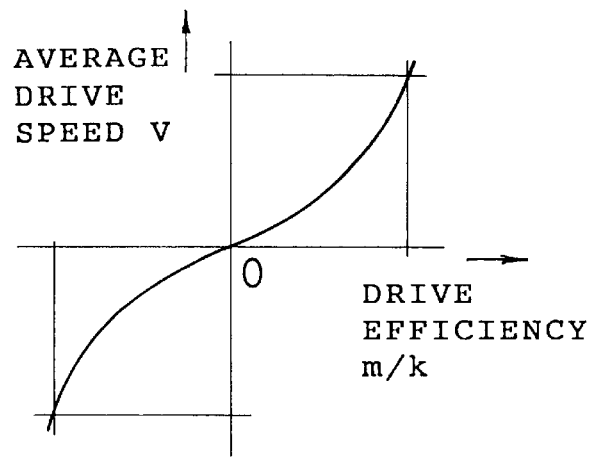
FIGS. 15(a), 15(b) and 15(c) are diagrams for explaining a relationship between a drive efficiency and an average drive speed, a relationship between a speed instruction signal and the drive efficiency and a relationship between the speed instruction signal and the average drive speed.
Figure 15B:
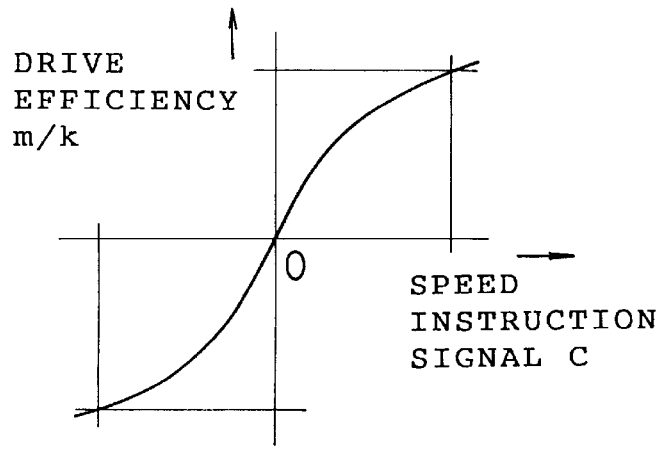
Figure 15C:
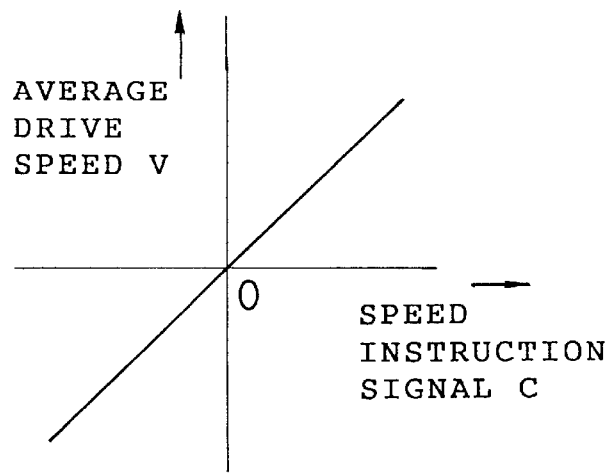

FIG. 15(a) shows a relationship between the drive efficiency (m/k) and the average drive speed V in the control period k where both are substantially in a proportional relationship and the higher the drive efficiency (m/k) is, the faster the average drive speed V becomes. Accordingly, by setting the drive efficiency (m/k) in respect of the value of the speed instruction signal C as shown by FIG. 15(b) and incorporating the relationship in the program of the control circuit, the average drive speed V in proportion to the speed instruction signal C can be obtained as shown by FIG. 15(c).

As has been explained in reference to FIGS. 13(a), 13(b), 13(c), 13(d), 13(e) and 13(f), the switching of the drive direction of the driven member can be achieved by changing timings of outputting the timing signal B for instructing interruption based on information indicating forward movement or rearward movement included in the speed instruction signal C. That is, in driving the driven member in the rearward direction, CPU 11 outputs the timing signal B instructing interruption at timings shown by FIG. 13(f) based on the speed instruction signal C and makes the switching unit 14 generate the trapezoidal wave drive pulse shown by FIG. 13(e). According to the drive pulse shown by FIG. 13(e), inclinations of the rising portion and the falling portion are reverse to those of the drive pulse shown by FIG. 13(c) driving the driven member in the forward direction by which the driven member can be driven in the rearward direction.

Other than the above-described operation, the switching of the drive direction of the driven member can also be achieved by outputting the switch signal D reversing electrodes of the piezoelectric element applying the drive pulse, from CPU 11 to the piezoelectric drive unit 15 (refer to FIG. 3) based on information indicating forward movement or rearward movement included in the speed instruction signal C by which the drive pulse is applied to the piezoelectric element in the reverse direction.

In this way, the drive pulse (sine wave drive pulse or trapezoidal wave drive pulse) in synchronism with the timing signal A is always applied to the piezoelectric element and a portion thereof, that is, only the trapezoidal wave drive pulse in correspondence with the speed instruction signal C contributes to driving the driven member and accordingly, the driven member can be driven at a desired drive speed and further, various drawbacks caused by thinning do not occur since the drive pulse is not thinned to obtain the desired drive speed.

According to the embodiment explained above, the sine wave drive pulse is adopted as the basic pulse for generating the drive pulse for forwardly and rearwardly moving the driven member and as a pulse for setting the driven member to a stationary state. However, the basic pulse is not limited to the sine wave drive pulse but the basic pulse may be a pulse capable of setting the driven member apparently to a stationary state and a pulse having a waveform capable of providing a trapezoidal wave drive pulse having different angles of inclination at the rising portion and the falling portion by interrupting a portion thereof. For example, the pulse may be a triangular wave pulse having equal angles of inclination of a rising portion and a falling portion or a trapezoidal wave pulse formed by truncating the top portion of a triangular wave pulse. The triangular wave and the trapezoidal wave are constituted by harmonics at odd number orders of the sine wave. An explanation will be given thereof as follows.

FIGS. 16(a), 16(b) and 16(c) explain formation of a drive pulse with a triangular pulse as a basic pulse in which a triangular pulse shown by an isosceles triangle in FIG. 16(a) is generated by the timing signal A having a period of t shown by FIG. 16(b). Further, a drive pulse having a waveform shown by bold lines in FIG. 16(a) can be provided by interrupting a portion of a rising portion or a falling portion of the triangular wave pulse by the timing signal B instructing interruption shown by FIG. 16(c).

Further, FIGS. 17(a), 17(b), 17(c) and 17(d) explain formation of a drive pulse with a trapezoidal wave pulse as a basic pulse in which the trapezoidal wave pulse is generated by a timing signal A1 shown by FIG. 17(b). The timing signal A1 is generated based on the timing signal A having the period of t and therefore, the signal A1 has the same period as that of the timing signal A. Further, a drive pulse having a waveform shown by bold lines of FIG. 17(a) can be provided by interrupting a rising portion or a falling portion of the trapezoidal wave pulse by the timing signal B instructing of interruption shown by FIG. 17(d).

Next, an explanation will be given of a third embodiment of the present invention. According to the third embodiment, a sine wave drive pulse and a trapezoidal wave drive pulse are separately generated and the two drive pulses are combined based on the speed instructing signal C.

Figure 18:
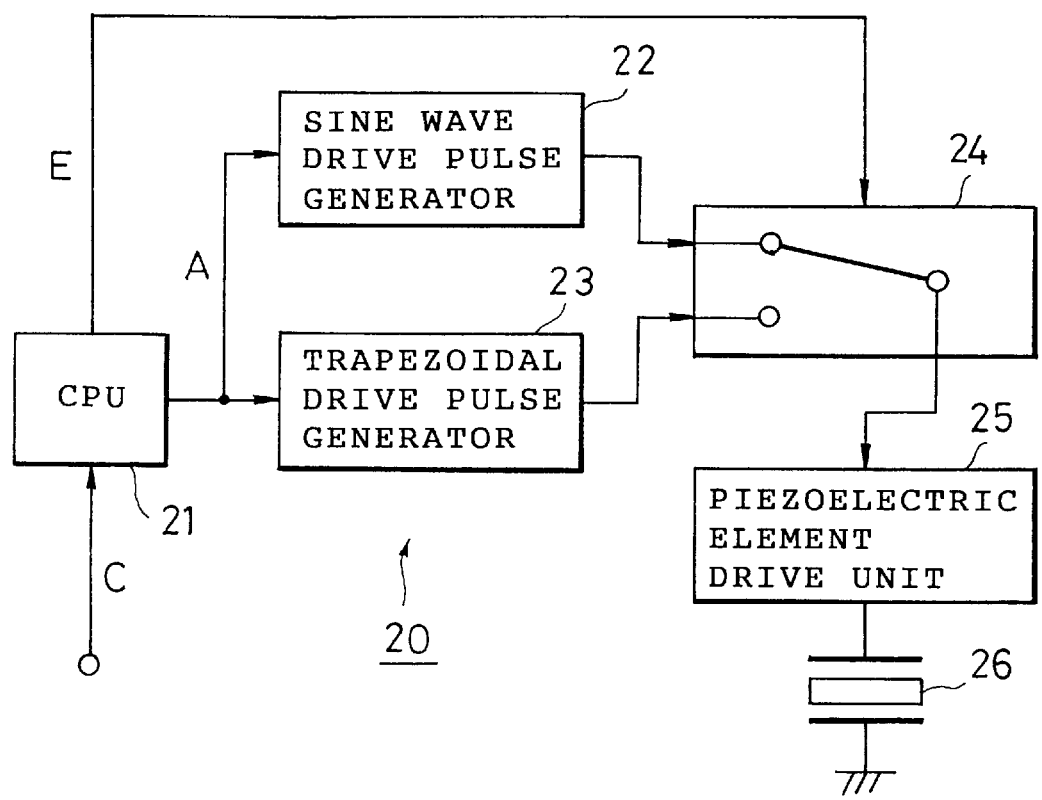
FIG. 18 is a block diagram showing the constitution of a drive pulse generating circuit according to a third embodiment.

FIG. 18 is a block diagram showing the constitution of a drive pulse generating circuit applied to a drive device using a piezoelectric element according to the third embodiment. The drive pulse generating circuit 20 is constituted by a microprocessor (CPU) 21, a sine wave drive pulse generator 22, a trapezoidal drive pulse generator 23, a switching unit 24, a piezoelectric element drive unit 25 and a piezoelectric element 26 connected to the piezoelectric element drive unit 25. The sine wave drive pulse generator 22 may be a well-known waveform generator.

Figure 19:
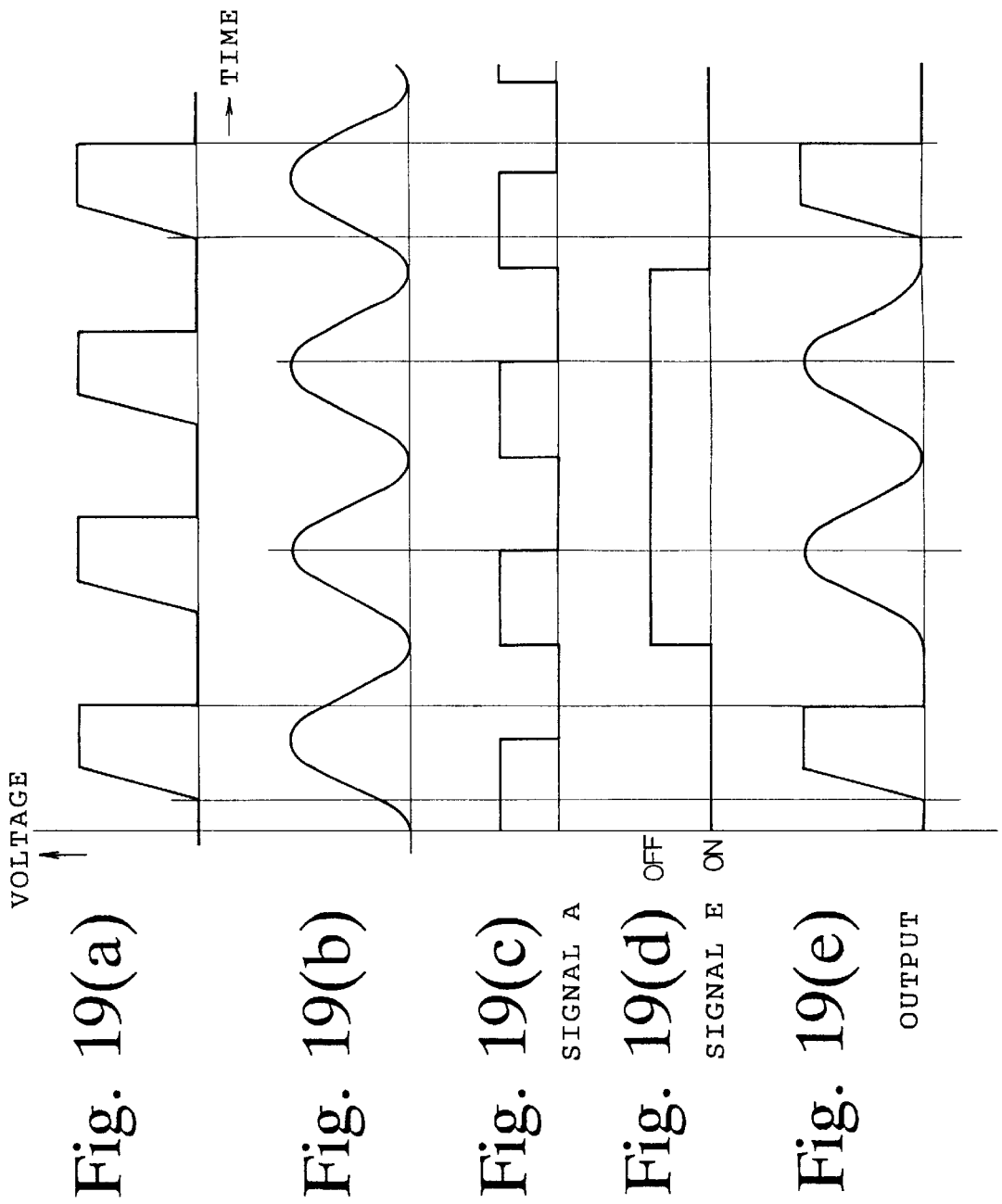
FIGS. 19(a), 19(b), 19(c), 19(d) and 19(e) are timing charts for explaining the operation of the drive pulse generating circuit.

FIGS. 19(a), 19(b), 19(c), 19(d) and 19(e) are timing charts for explaining the operation of the drive pulse generating circuit 20 in which FIG. 19(a) shows a waveform outputted from the trapezoidal wave drive pulse generator 23 and FIG. 19(b) shows a waveform outputted from the sine wave form drive pulse generator 22. FIG. 19(c) shows the timing signal A outputted from CPU 21 and FIG. 19(d) shows a switch signal E outputted from CPU 21. Further, FIG. 19(e) shows a waveform of the outputted trapezoidal wave drive pulse.

Next, an explanation will be given of operation in reference to FIG. 18 and FIGS. 19(a), 19(b), 19(c), 19(d) and 19(e). In this case, an explanation will be given of the case of driving the driven member in the forward direction. The sine wave drive pulse generator 22 generates the predetermined sine waveform drive pulse shown by FIG. 19(b) in synchronism with the timing signal A shown by FIG. 19(c) that is outputted from CPU 21 and outputs the pulse to the switching unit 24. Further, the trapezoidal wave drive pulse generator 23 generates the predetermined trapezoidal wave drive pulse shown by FIG. 19(a) in synchronism with the timing signal A shown by FIG. 19(c) that is outputted from CPU 21 and outputs the pulse to the switching unit 24.

Upon receiving the speed instruction signal C from an outside device, CPU 21 outputs the switch signal E to the switching unit 24 such that the trapezoidal wave drive pulse and the sine wave drive pulse are alternatingly applied to the piezoelectric element 26 at a ratio in accordance with the speed in order to obtain the instructed speed, outputs the sine wave drive pulse to the piezoelectric element drive unit 25 when the switch signal E is OFF and outputs the trapezoidal wave drive pulse to the piezoelectric element drive unit 25 when the switch signal E is ON. Thereby, a drive pulse where the sine wave drive pulse and the trapezoidal wave drive pulse are mixed in accordance with the instructed drive speed as shown by FIG. 19(e) is applied to the piezoelectric element 26.

Next, an explanation will be given of the constitution of a drive pulse generating circuit.

Figure 20:
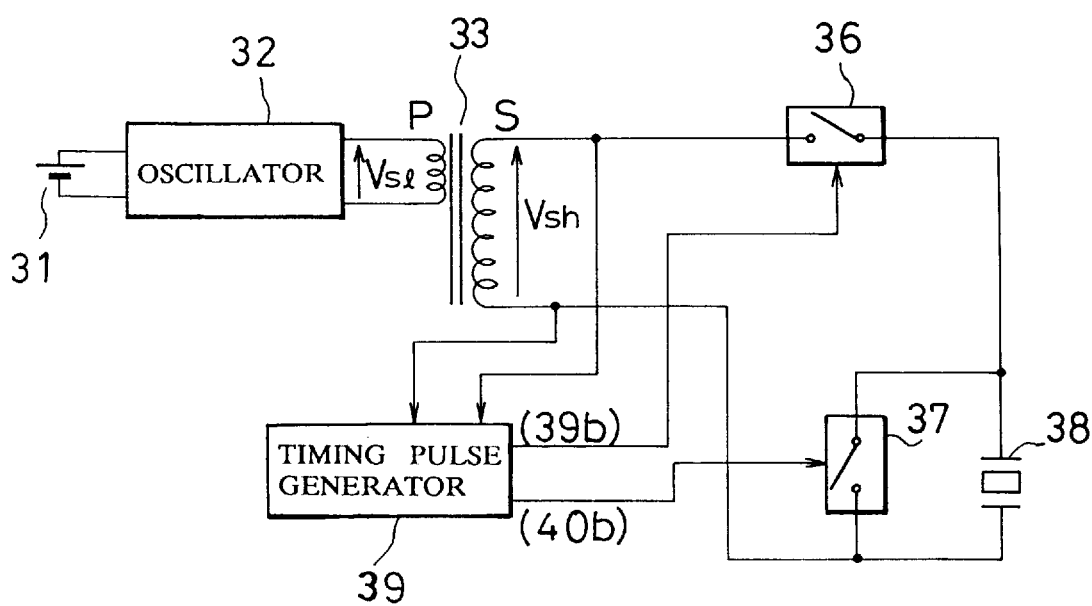
FIG. 20 shows a drive pulse generating circuit according to a fourth embodiment of the present invention.

FIG. 20 is a diagram showing a drive pulse generating circuit according to a fourth embodiment of the present invention and FIGS. 21(a), 21(b), 21(c), 21(d), 21(e), 21(f), 21(g) and 21(h) are diagrams for explaining the operational timings of the drive pulse generating circuit shown by FIG. 20.

Figure 21:
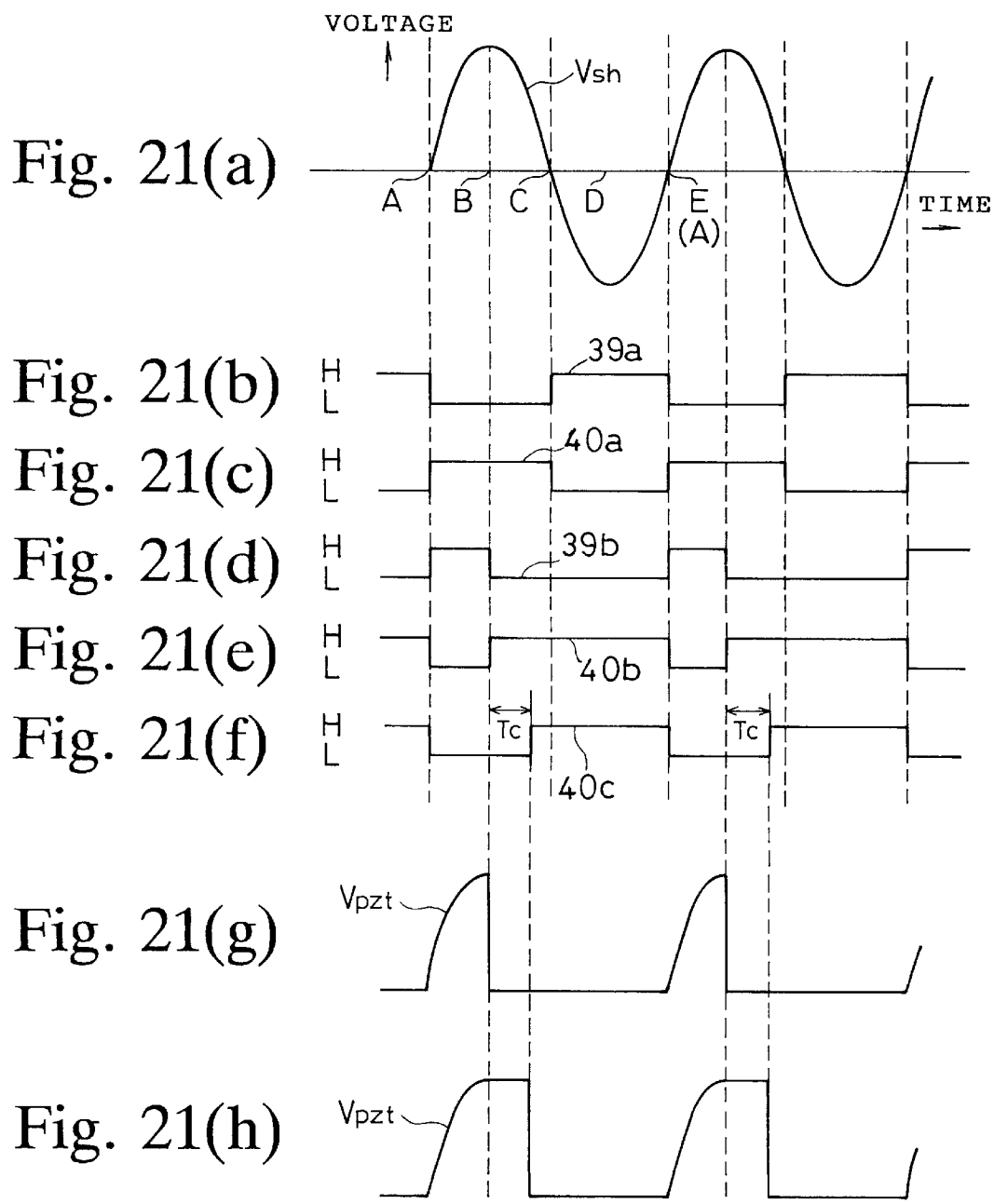
FIGS. 21(a), 21(b), 21(c), 21(d), 21(e), 21(f), 21(g) and 21(h) are diagrams for explaining operational timings of the drive pulse generating circuit shown by FIG. 20.

In FIG. 20, numeral 32 designates an oscillator for generating a waveform of a sine wave to which power is supplied from a low voltage power source 31 such as a battery or the like. Numeral 33 designates a booster transformer in which when an output voltage Vsl is inputted to the primary side of the booster transformer 33, a sine wave voltage Vsh boosted to a voltage level necessary as a drive pulse as shown by FIG. 21(a) is outputted from the secondary side of the booster transformer 33. Numerals 36 and 37 designate switching circuits which are controlled to ON/OFF by a timing pulse outputted from the timing pulse generator 39. Incidentally, numeral 38 designates a piezoelectric element.

The secondary side of the booster transformer 33 is connected to the input side of the timing pulse generator 39, control timings (time points of zero cross of A, C, E and like) shown by FIG. 21(a) of the timing pulses are prescribed by the inputted sine wave voltage Vsh and timing pulses 39a and 40a shown by FIGS. 21(b) and 21(c) are generated. Further, timing pulses 39b and 40b controlling the switching circuits 36 and 37 shown by FIGS. 21(d) and 21(e) are outputted from the timing pulse generator 39 based on the above-described timing pulses 39a and 40a. The control of a time point B of the timing pulses 39b and 40b is performed based on a timing delayed from the time point A of zero cross by ¼ period of the sine wave voltage Vsh.

Incidentally, a timing pulse 40c shown by FIG. 21(f) relates to a fifth embodiment explained later and an explanation thereof will be omitted.

Next, an explanation will be given of the operation of a drive pulse generating circuit in reference to FIGS. 21(a), 21(b), 21(c), 21(d), 21(e), 21(f), 21(g) and 21(h). When the sine waveform voltage Vsh outputted from the secondary side of the booster transformer 3 is changed from negative to positive at the time point A (time point A of zero cross), "H" of the timing pulse 39b and "L" of the timing pulse 40b are outputted from the timing pulse generator 39 and therefore, the switching circuit 36 is made ON and the switching circuit 37 is made OFF. As a result, the piezoelectric element 38 is applied with the output voltage Vsh at the secondary side of the booster transformer 33, as shown by FIG. 21(g), an applied voltage Vpzt of the piezoelectric element 38 is elevated by a waveform similar to the waveform of the voltage Vsh and the element is charged to the peak voltage Vsh.

When the time point B is reached, "L" of the timing pulse 39b is outputted from the timing pulse generator 39 by which the switching circuit 36 is made OFF, at the same time, "H" of the timing pulse 40b is outputted from the timing pulse generator 39 and the switching circuit 37 is made ON. As a result, the charging of the piezoelectric element 38 is interrupted and electric charge is discharged rapidly via the switching circuit 37. Discharge resistance is constituted by a total of an internal impedance of the piezoelectric element 38 and an ON resistance of the switching circuit 37. The applied voltage Vpzt of the piezoelectric element 38 is lowered from the peak voltage Vsh to null (refer to FIG. 21(g)).

When the time point C (time point C of zero cross) is reached, although the voltage Vsh is changed from positive to negative, the timing pulse outputted from the timing pulse generator 39 remains unchanged at the time point and accordingly, the applied voltage Vpzt of the piezoelectric element 38 is maintained at null (refer to FIG. 21(g)).

Also at the time point D, the timing pulse outputted from the timing pulse generator 39 remains unchanged and accordingly, the applied voltage Vpzt of the piezoelectric element 38 is maintained at null (refer to FIG. 21(g)). Further, when the time point E is reached, a state the same as that of the time point A is produced and the same operation as that at the time point A is started.

As explained above, according to the drive pulse generating circuit of the fourth embodiment, the drive pulse Vpzt having a substantially trapezoidal shape shown by FIG. 21(g) can be generated.

Next, an explanation will be given of a fifth embodiment. According to the fifth embodiment, the timing of outputting "H" of the timing pulse 40b outputted from the timing pulse generator 39 of the second embodiment is retarded by a time period of Tc and "H" of the timing pulse 40c is outputted at a time point retarded from the time point B by the time period Tc, as shown by FIG. 21(f). When the switching circuit 37 is controlled by the timing pulse 40c, the timing pulse 40c is maintained at OFF even at the time point B and is made ON at the time point retarded by the time period of Tc and therefore, the applied voltage Vpzt of the piezoelectric element 38 is maintained up to the time point retarded from the time point B by the time period Tc and thereafter, electric charge of the piezoelectric element 38 is rapidly discharged via the switching circuit 37.

Thereby, according to the drive pulse generating circuit of the fifth embodiment, the width of the drive pulse is made wider than the drive pulse Vpzt having a substantially trapezoidal shape shown by FIG. 21(g) described previously in the fourth embodiment and the drive pulse Vpzt having a substantially trapezoidal shape shown by FIG. 21(h) can be generated. The width of the trapezoidal pulse can be achieved by adjusting the delay time Tc for outputting the timing pulse 40c.

Next, an explanation will be given of a sixth embodiment as follows. According to the sixth embodiment, as shown by a circuit of FIG. 22, a direct current power source 41 for outputting a voltage Vos is inserted to the secondary side of the booster transformer 33 and the output voltage Vsh is offset from the ground potential by the voltage Vos. The other circuit elements are the same as those of the fourth embodiment and therefore, the same notations are attached to the same portions and an explanation thereof will be omitted.

FIGS. 23(a), 23(b), 23(c) and 23(d) are diagrams for explaining operational timings of the drive pulse generating circuit of the sixth embodiment. An explanation will be given of the operation of the sixth embodiment in reference to FIGS. 23(a), 23(b), 23(c) and 23(d) as follows. The sine waveform voltage Vsh outputted from the secondary side of the booster transformer 33 is offset from the ground potential by the voltage Vos as shown by FIG. 23(a).

When the output voltage Vsh from the secondary side of the booster transformer 33 is changed from negative to positive at the time point A (time point A of zero cross), as shown by FIGS. 23(b) and 23(c), "H" of a timing pulse 42 and "L" of a timing pulse 43 are outputted from the timing pulse generator 39. Thereby, the switching circuit 36 is made ON and the switching circuit 37 is made OFF. As a result, the output voltage Vsh on the secondary side of the booster transformer 33 is applied to the piezoelectric element 38, as shown by FIG. 23(a), the applied voltage Vpzt of the piezoelectric element 38 is elevated by a waveform similar to the waveform of the voltage Vsh and the element is charged and the peak voltage reaches Vsh.

When the time point B is reached, as shown by FIGS. 23(b) and 23(c), "L" of the timing pulse 42 and "H" of the timing pulse 43 are outputted from the timing pulse generator 39. Thereby, the switching circuit 36 is made OFF and the switching circuit 37 is made ON. As a result, the charging of the piezoelectric element 38 is interrupted and electric charge is rapidly discharged via the switching circuit 37. Discharge resistance is constituted by a total of the internal impedance of the piezoelectric element 38 and the ON resistance of the switching circuit 37. The applied voltage Vpzt of the piezoelectric element 38 is lowered from the peak voltage Vsh to null (refer to FIG. 23(a)).

When the time point C (time point C of zero cross) is reached, although the voltage Vsh is changed from positive to negative, at the time point, the timing pulse outputted from the timing pulse generator 39 remains unchanged and therefore, the applied voltage Vpzt of the piezoelectric element 38 is maintained at null (refer to FIG. 23(a)).

Also at the time point D, the timing pulse outputted from the timing pulse generator 39 remains unchanged and therefore, the applied voltage Vpzt of the piezoelectric element 38 is maintained at null (refer to FIG. 23(a)). Further, when the time point E is reached, a state the same as that at the time point A is produced and the operation the same as that at the time point A is started.

As described above, according to the drive pulse generating circuit of the sixth embodiment, the drive pulse Vpzt having a substantially trapezoidal shape as shown by FIG. 23(a) can be generated.

Also in the sixth embodiment, as explained previously in the fifth embodiment, when the output timing of the timing pulse 42 outputted from the timing pulse generator 39 is retarded by the time period Tc and the timing pulse 43c is outputted, even at the time point B, the timing pulse 43c is maintained at "L" and becomes "H" at a time point retarded from the time point B by the time period Tc and accordingly, the output voltage Vpzt of the piezoelectric element 38 is maintained up to the time point retarded from the time point B by the time period Tc and thereafter, electric charge of the piezoelectric element 38 is rapidly discharged via the switching circuit 37.

In this way, the drive pulse Vpzt having a substantially trapezoidal shape as in a waveform shown by dotted lines can be generated in FIG. 23(a). The width of the trapezoid can be achieved by adjusting the delay time period Tc for outputting the timing pulse 43c.

Figure 22:
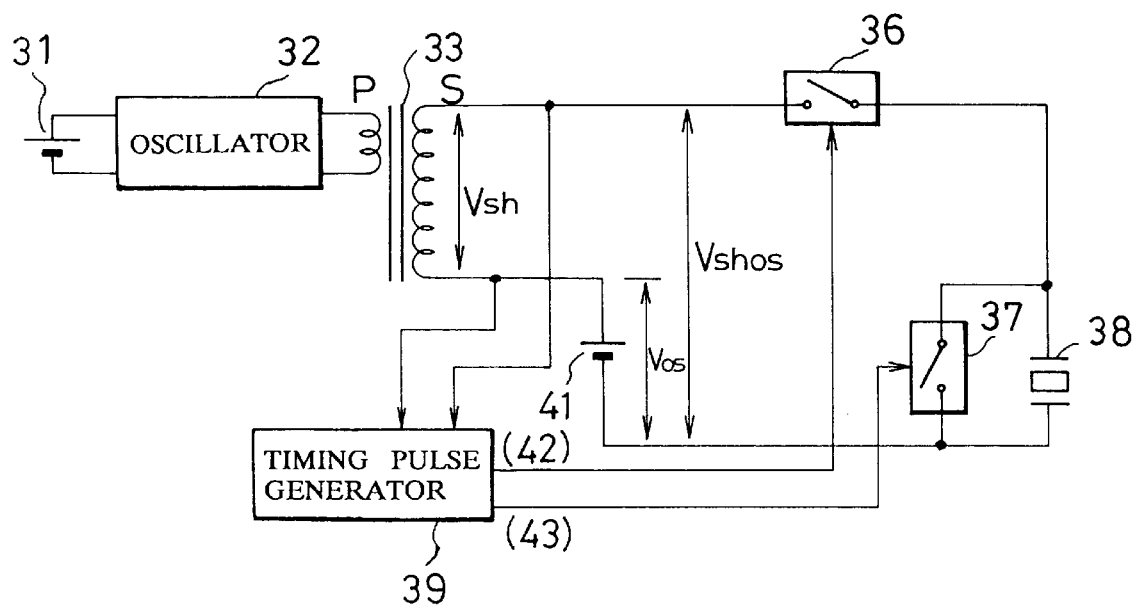
FIG. 22 is a drive pulse generating circuit according to a sixth embodiment.
Figures 24A, 24B, 24C:
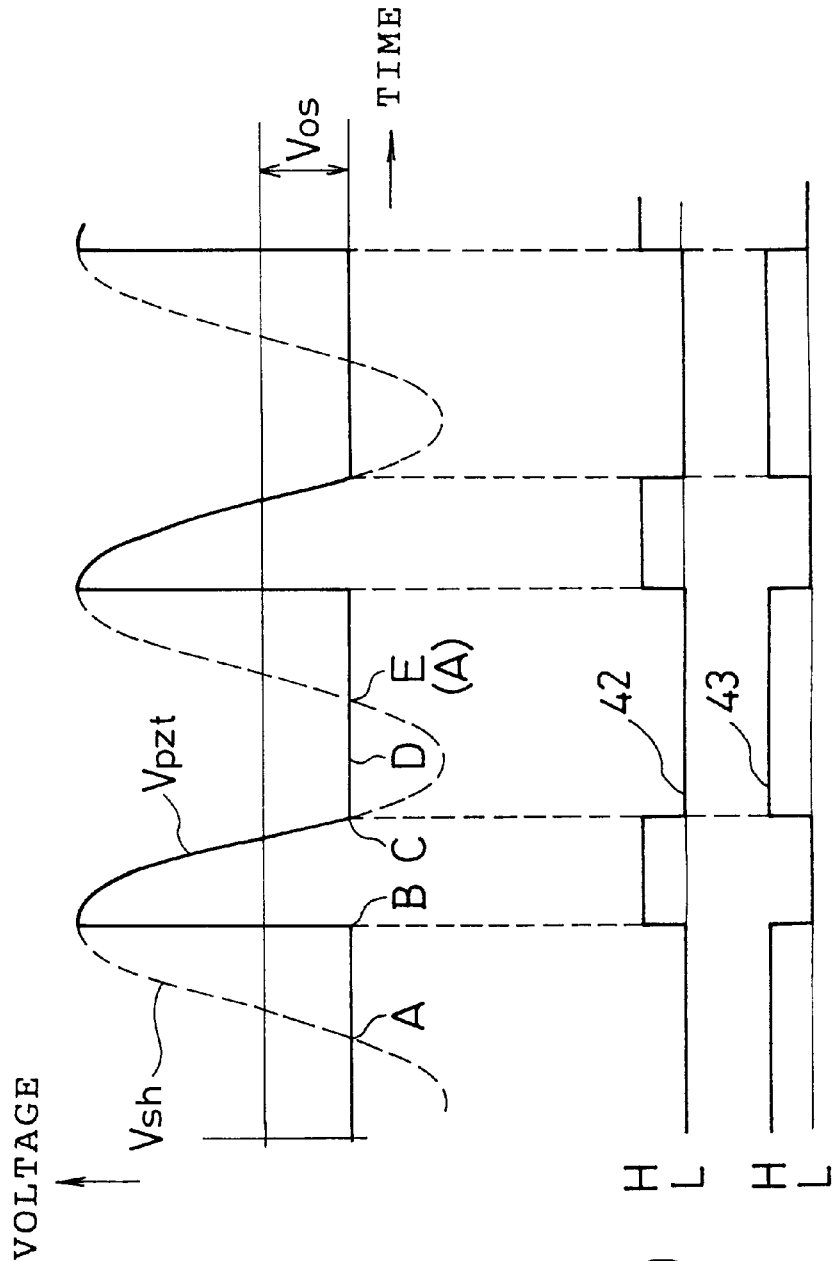
FIGS. 24(a), 24(b) and 24(c) are diagrams for explaining a drive pulse waveform when a timing of generating a timing pulse of the drive pulse generating circuit shown by FIG. 22 is changed.

FIGS. 24(a), 24(b) and 24(c) show the case in which in the drive pulse generating circuit shown by FIG. 22, timings of generating the timing pulses 42 and 43 (or 43c) are changed, as shown by FIGS. 24(b) and 24(c), the timing pulse 42 is changed to "H" and the timing pulse 43 is changed to "L" at the time point B and the timing pulse 42 is changed to "L" and the timing pulse 43 is changed to "H" at the time point C. Thereby, the shape of the trapezoid of the drive pulse Vpzt can be reversed in the left and right direction as shown by FIG. 24(a), rapid charge and moderate discharge can be performed to the piezoelectric element 38 and therefore, the drive mechanism can be driven in a direction reverse to that of the case described above.

Figure 25:
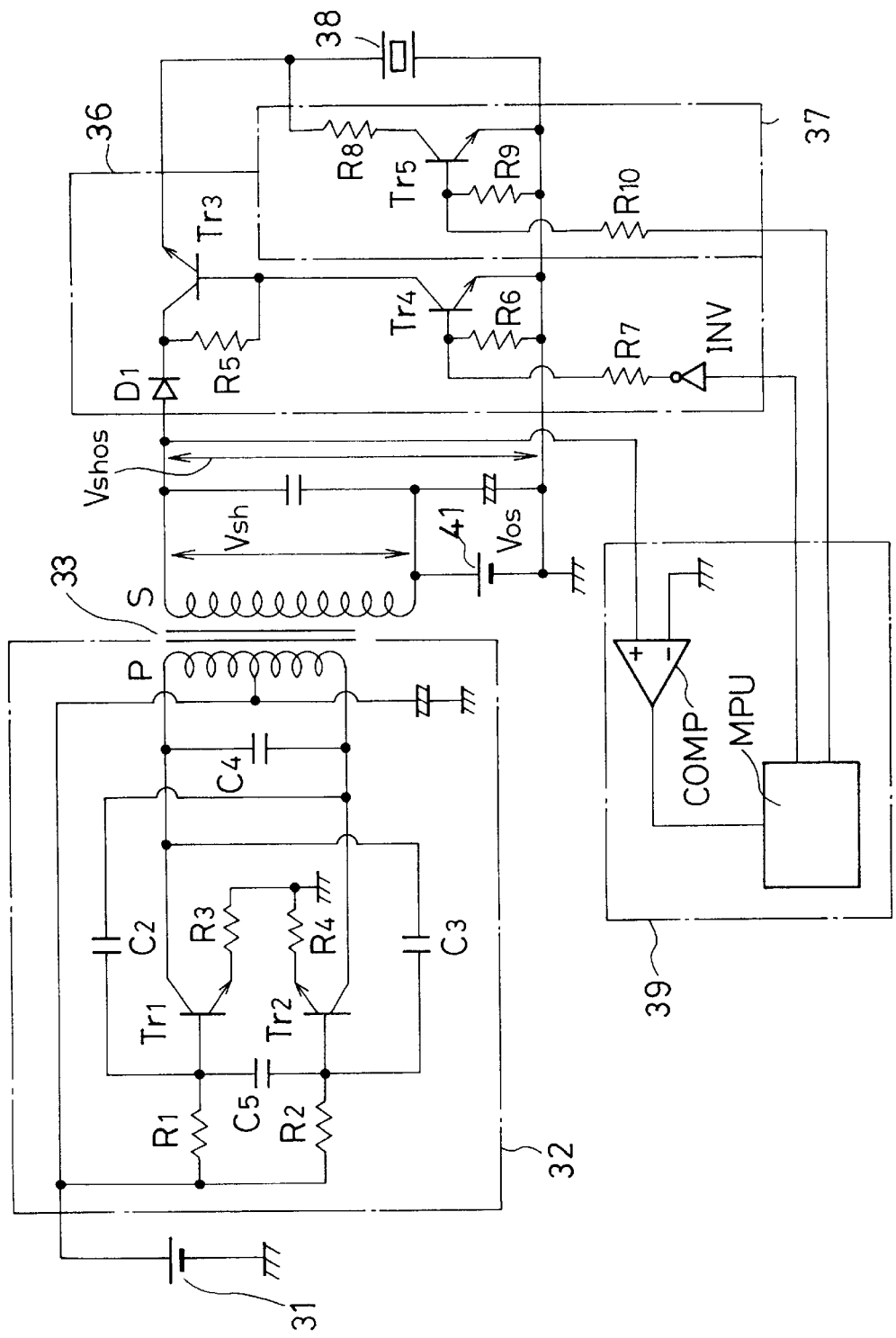
FIG. 25 is a circuit diagram specifically showing the constitution of the drive pulse generating circuit shown by FIG. 22.

FIG. 25 shows an example of circuits specifically showing the constitution of the oscillating circuit 32, the switching circuit 36, the switching circuit 37 and the timing pulse generator 39 in blocks according to the drive pulse generating circuit of the sixth embodiment shown by FIG. 22.

The oscillating circuit 32 for generating the waveform of sine wave is constituted by transistors Tr1 and Tr2, resistors R1, R2, R3 and R4, condensers C2, C3, C4 and C5 and the transformer 33, and the circuit is a push pull sine wave oscillating circuit of a collector synchronizing type operating by C class operation. The transformer 33 is an oscillating coil having a center tap and is provided with the constitution also serving as the booster transformer by providing the secondary wiring. Numeral 31 designates the power source of oscillating circuit 32 which is a low voltage power source. The direct current power source 41 for outputting the voltage Vos is inserted to the secondary wiring side of the transformer 33 by which the output voltage Vsh is offset from the ground potential by the voltage Vos. Output voltage of the transformer 33 constitutes a voltage Vshos formed by superposing the voltage Vos to the Vsh.

The switching circuit 36 is constituted by a diode D1, transistors Tr3 and Tr4, an inverter logic INV and resistors R5, R6 and R7 and the switching circuit 37 is constituted by a transistor Tr5 and the resistors R8, R9 and R10. The resistor R8 is a resistor for setting discharge characteristic in discharging electric charge of the piezoelectric element 38.

The diode D1 is a diode for protecting the transistors Tr3, Tr4 and Tr5 for preventing deterioration in function or destruction caused by applying reverse voltage to emitters of the respective transistors in a time period where the output voltage Vshos from the transformer 33 is negative.

The timing pulse generator 39 is constituted by a comparator COMP and a microprocessor MPU. The output voltage Vshos of the transformer 33 is inputted into a waveform shaping circuit comprising the comparator COMP, becomes a rectangular wave for detecting the zero cross point of the voltage Vshos and is inputted into the microprocessor MPU. The microprocessor MPU outputs the timing pulses 42 and 43 (or 43c, see FIG. 23(d)) by a built-in program. The switching circuits 36 and 37 perform predetermined switching operation by receiving the timing pulses 42 and 43 (or 43c) and generate the drive pulse Vpzt shown by FIG. 23(a).

When the timing pulse 42 and the timing pulse 43 are set to mutually reverse phases as shown by the explanatory diagrams of the operational timings of the drive pulse generating circuit shown by FIGS. 23(a), 23(b), 23(c) and 23(d), the function of the transistor Tr4 of the switching circuit 36 shown by FIG. 25 can be included in the transistor Tr5 of the switching circuit 37 and the circuit can be driven only by the timing pulse 43.

Figure 26:
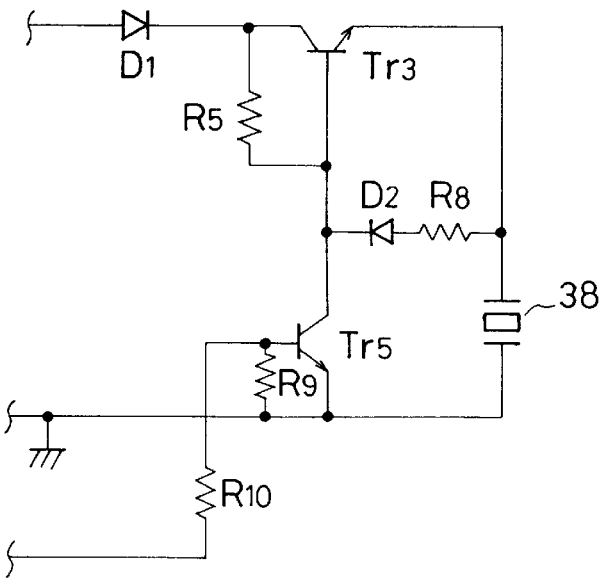
FIG. 26 is a diagram of a circuit substituted for a switching circuit in the drive pulse generating circuit shown by FIG. 25.

That is, FIG. 26 shows a circuit substituting for the switching circuits 36 and 37 shown by FIG. 25. As shown by FIG. 26, the transistor Tr4 is removed, the collector of Tr5 is connected to the base of Tr3 and the timing pulse 43 is outputted to Tr5. Thereby, discharge of the piezoelectric element 38 and the operation of changing the transistor Tr3 from ON to OFF can simultaneously be performed.

Thereby, the constitution of generating the timing pulse 42, the transistor Tr4, the inverter logic INV and the resistors R6 and R7 can be dispensed with.

Figure 27:
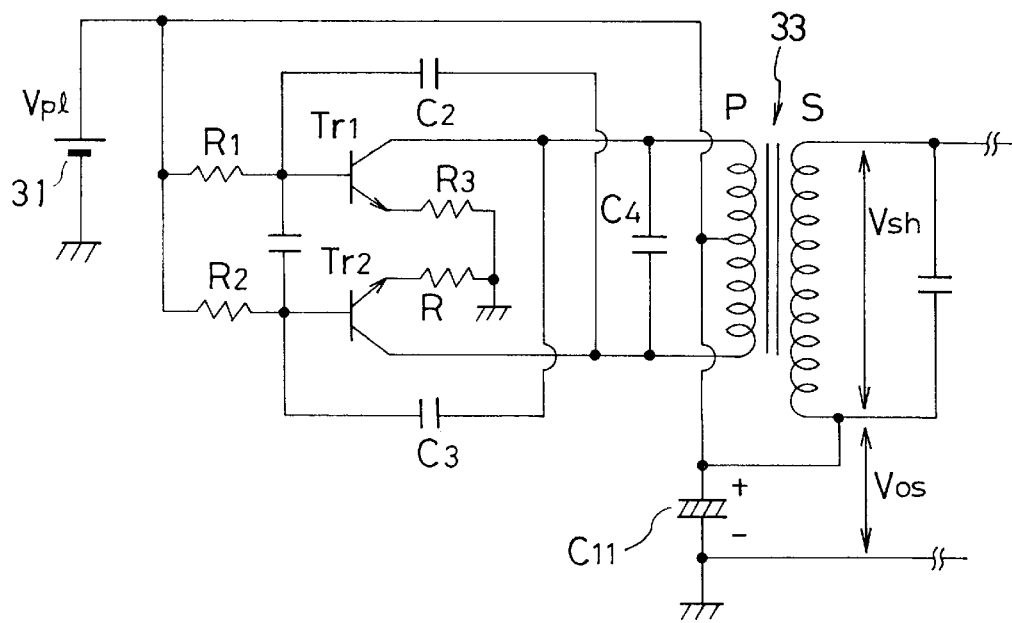
FIG. 27 is a diagram of a first circuit substituted for a direct current power source in the drive pulse generating circuit shown by FIG. 25.

FIG. 27 shows a first circuit substituting for the direct current power source in the drive pulse generating circuit according to the sixth embodiment shown by FIG. 25 in which the direct current power source of the voltage Vos inserted to the side of the secondary wiring of the transformer 33 is omitted and the direct current power source is obtained from the power source Vp on the primary wiring side of the transformer 33. A condenser C11 is inserted between the terminal on the primary wiring side and the ground and the terminal of the secondary wiring is connected to the condenser. Thereby, the output voltage Vsh on the secondary wiring side of the transformer 33 can be offset from the ground potential by the voltage Vos=Vp and the direct current power source 41 shown by FIG. 22 can be omitted.

Figure 28:
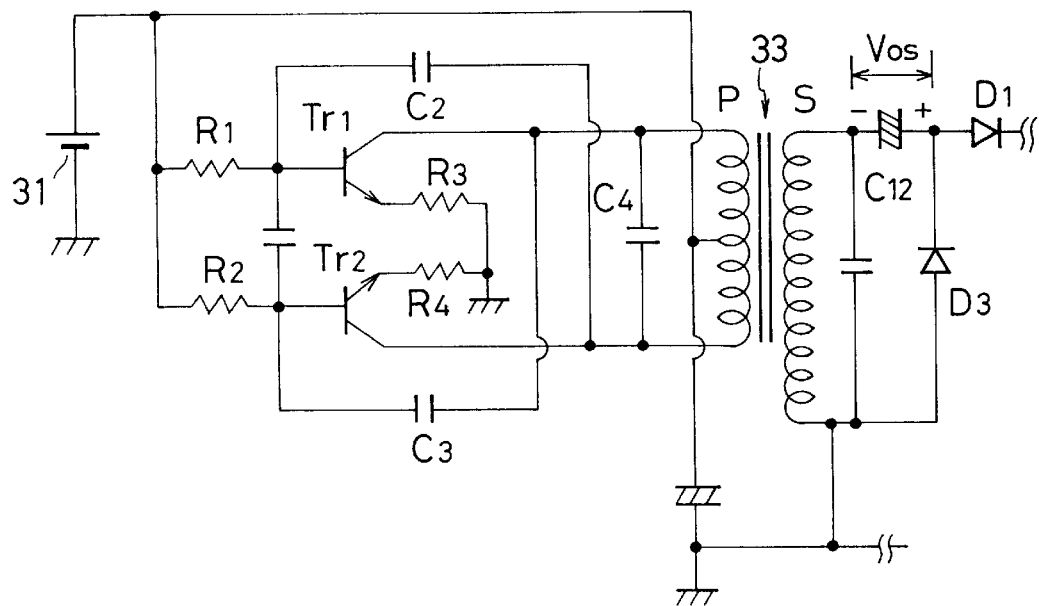
FIG. 28 is a diagram of a second circuit substituted for the DC current power source in the drive pulse generating circuit shown by FIG. 25.

FIG. 28 shows a second circuit substituting for the direct current power source in the drive pulse generating circuit according to the sixth embodiment shown by FIG. 25, in which the direct current power source of the voltage Vos inserted to the secondary wiring side of the transformer 33 is omitted, current is rectified by a diode D3 during a time period where the sine wave alternating current voltage Vsh induced on the secondary wiring side of the transformer 33 is negative and is charged to a condenser C12 and the voltage generated at the terminal of the condenser C12 is substituted for the direct current power source of the voltage Vos. Thereby, the output voltage Vsh on the secondary wiring side of the transformer 33 can be offset from the ground potential and the direct current power source 41 shown by FIG. 25 can be omitted.

FIG. 29 and FIGS. 30(a), 30(b), 30(c), 30(d), 30(e) and 30(f) show other means of generating timing pulses illustrating a circuit in which the circuit shown by FIG. 26 is substituted for the switching circuits 36 and 37 of the drive pulse generating circuit according to the sixth embodiment shown by FIG. 25 and further, substitute means for generating timing pulses are added and FIGS. 30(a), 30(b), 30(c), 30(d), 30(e) and 30(f) are diagrams for explaining the operational timings. An explanation will be given as follows in reference to FIG. 29 and FIGS. 30(a), 30(b), 30(c), 30(d), 30(e) and 30(f).

Figure 29:
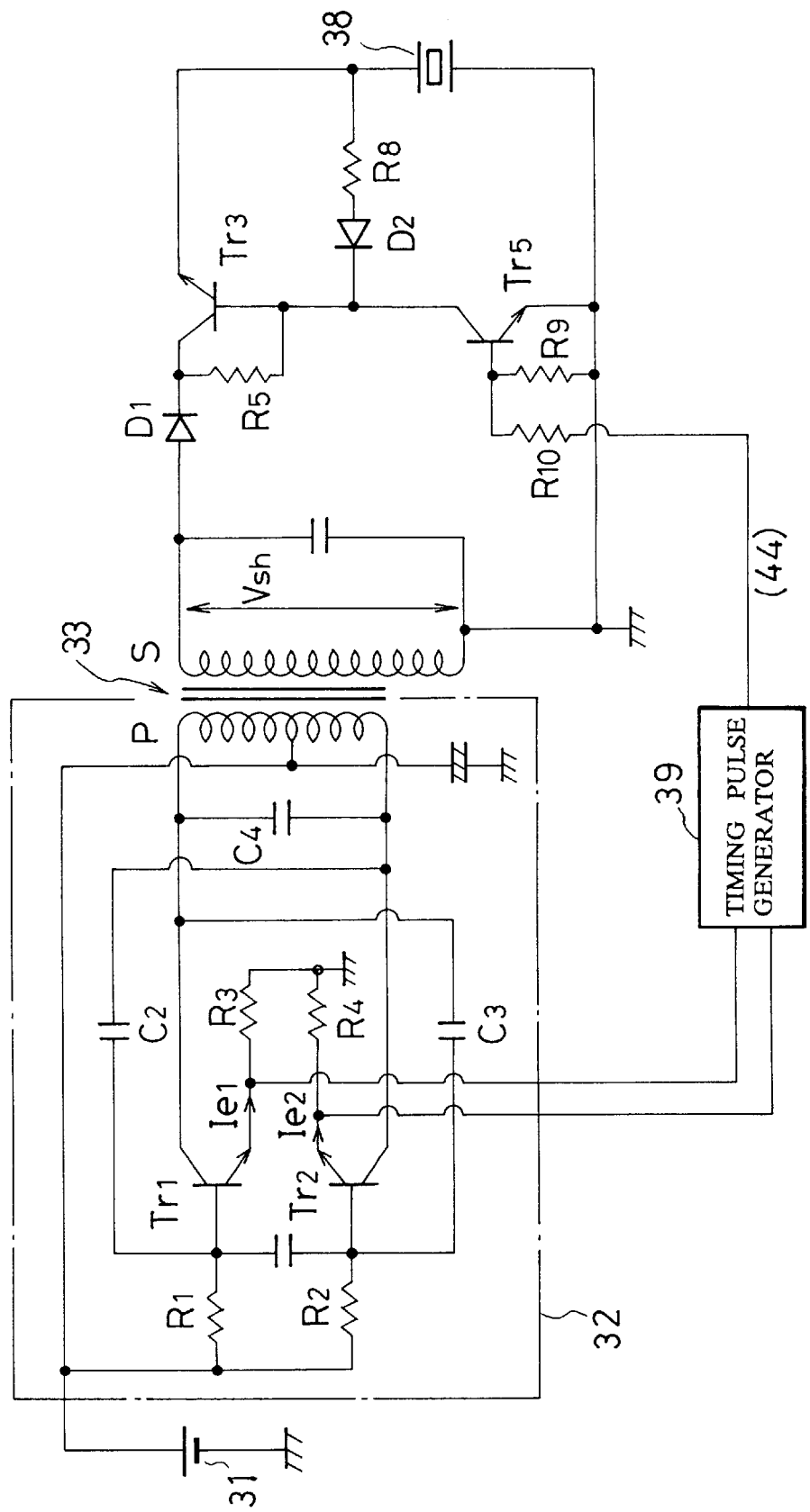
FIG. 29 is a circuit diagram showing another example of a timing pulse circuit.

According to the oscillating circuit 32 for generating a sine waveform of FIG. 29, the transistors Tr1 and Tr2 are constituted to operate by C class operation. Therefore, when the polarities of the transistors Tr1 and Tr2 are as illustrated, emitter currents Ie1 and Ie2 flow as intermittent currents in respect of the voltage Vsh at timings shown by FIGS. 30(b) and 30(d) and pulse-like voltages Ve1 and Ve2 are generated at both ends of the respective emitter resistors R3 and R4.

Figure 30:
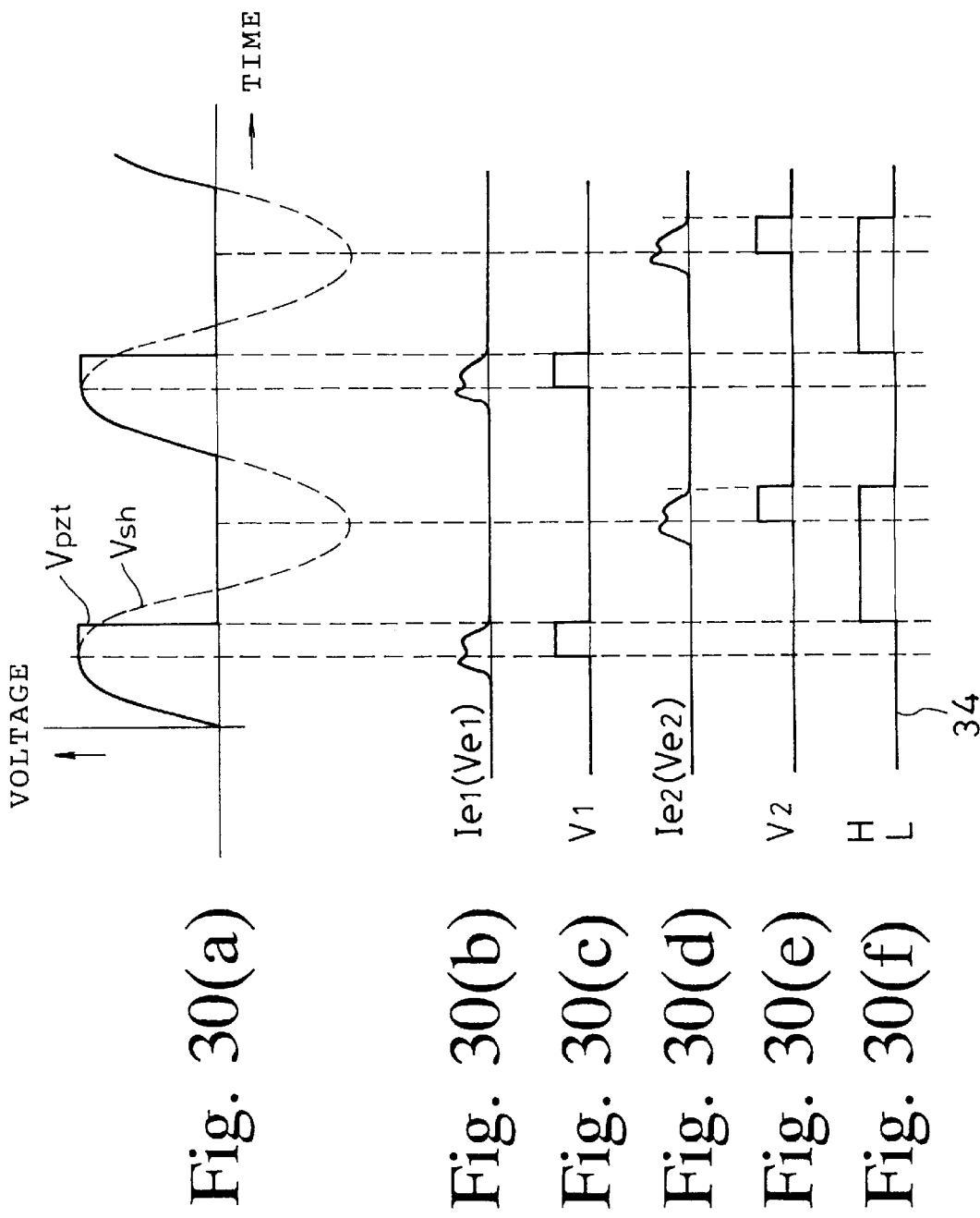
FIGS. 30(a), 30(b), 30(c), 30(d), 30(e) and 30(f) are diagrams for explaining operational timings of the timing pulse circuit shown by FIG. 29.

Then, the waveforms of the pulse-like voltages Ve1 and Ve2 are shaped at the timing pulse generator 39 by which pulse voltages V1 and V2 as shown by FIGS. 30(c) and 30(e) are provided based on which a timing pulse 44 shown by FIG. 30(f) is generated. Thereby, the constitution of the timing pulse generator 39 can be constituted by a simple waveform shaping circuit without using the microprocessor MPU.

Figure 31:
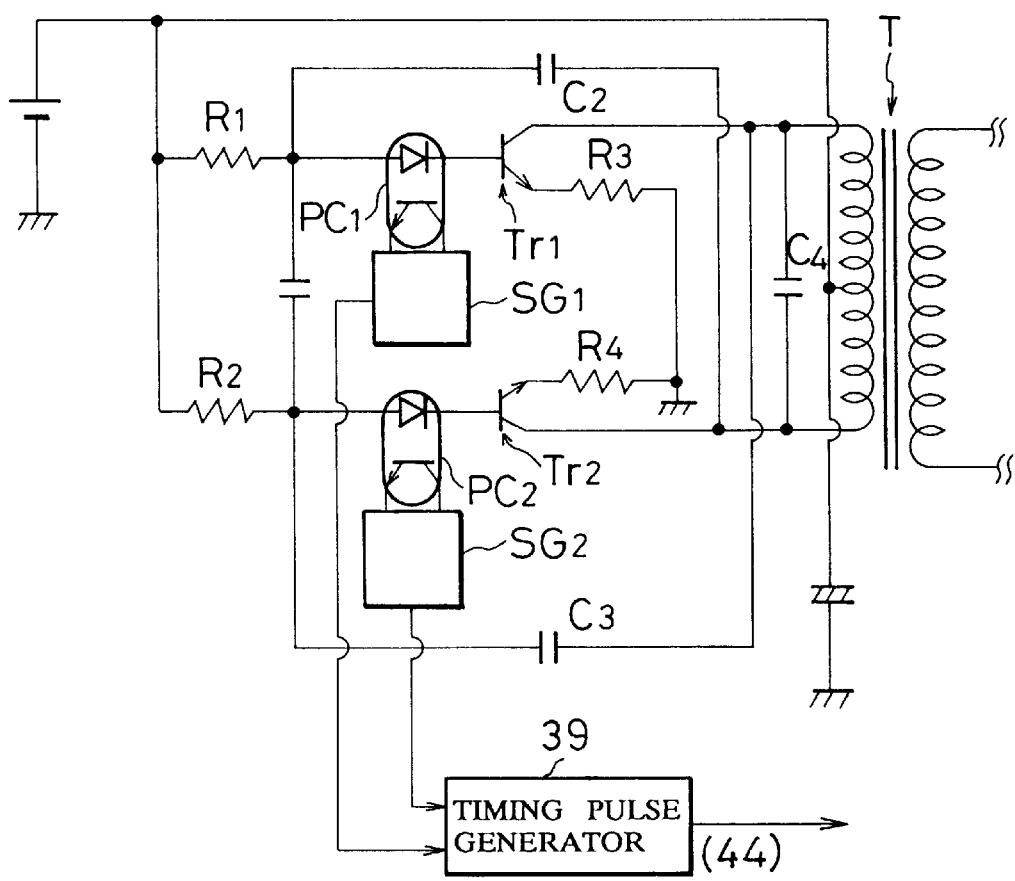
FIG. 31 is a circuit diagram showing another example of a timing pulse circuit.

FIG. 31 shows a modified example of the timing pulse generator 39 shown by FIG. 29 in which the timing pulse is provided by using intermittent base currents Ib1 and Ib2 flowing at the bases of the transistors Tr1 and Tr2. Photocouplers PC1 and PC2 are inserted to the base circuits of the respective transistors Tr1 and Tr2, the waveforms of the detected intermittent base currents Ib1 and Ib2 are shaped by signal processing circuits SG1 and SG2 and inputted to the timing pulse generator 39 from which the timing pulse 44 is generated. Thereby, the constitution of the timing pulse generator 39 can be simplified.

Figure 32:
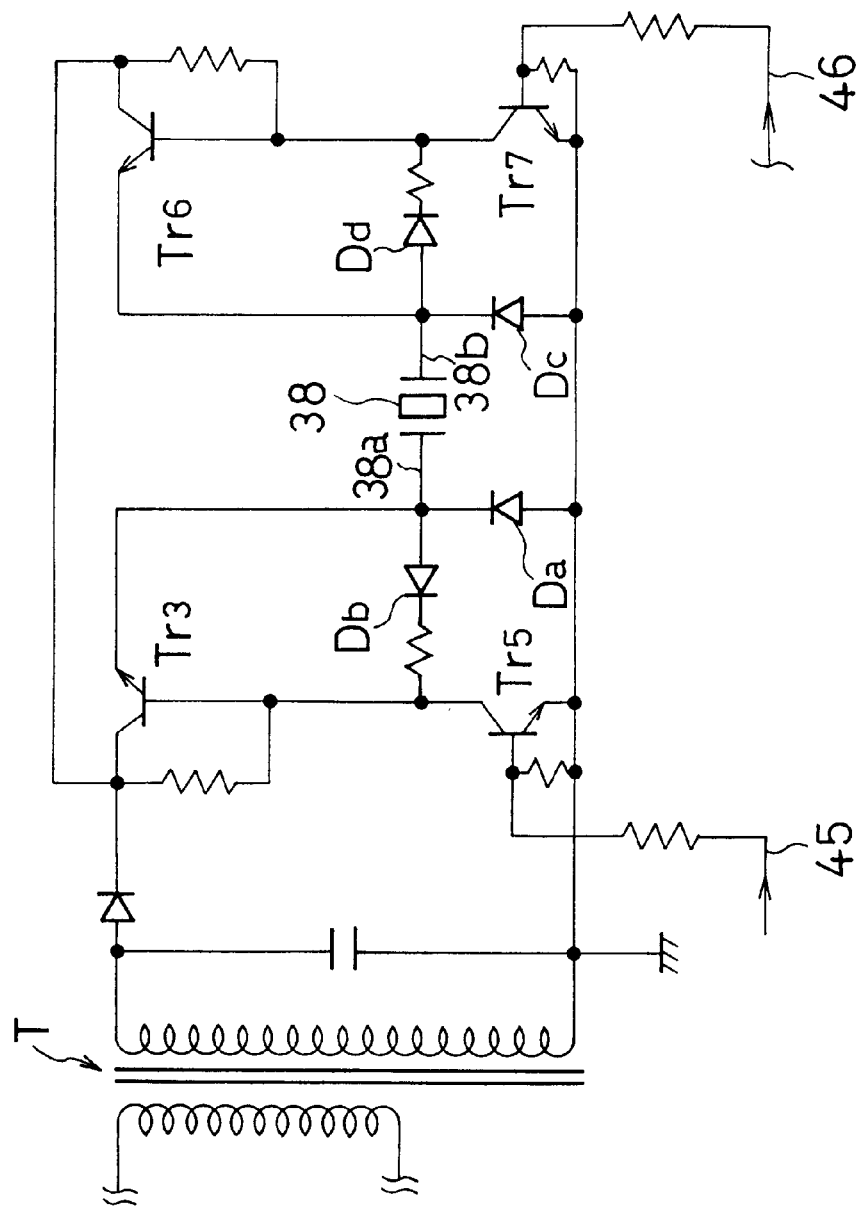
FIG. 32 is a diagram of a polarity switch driving circuit for driving to switch the polarity of a piezoelectric element.
Figures 33A, 33B, 33C:
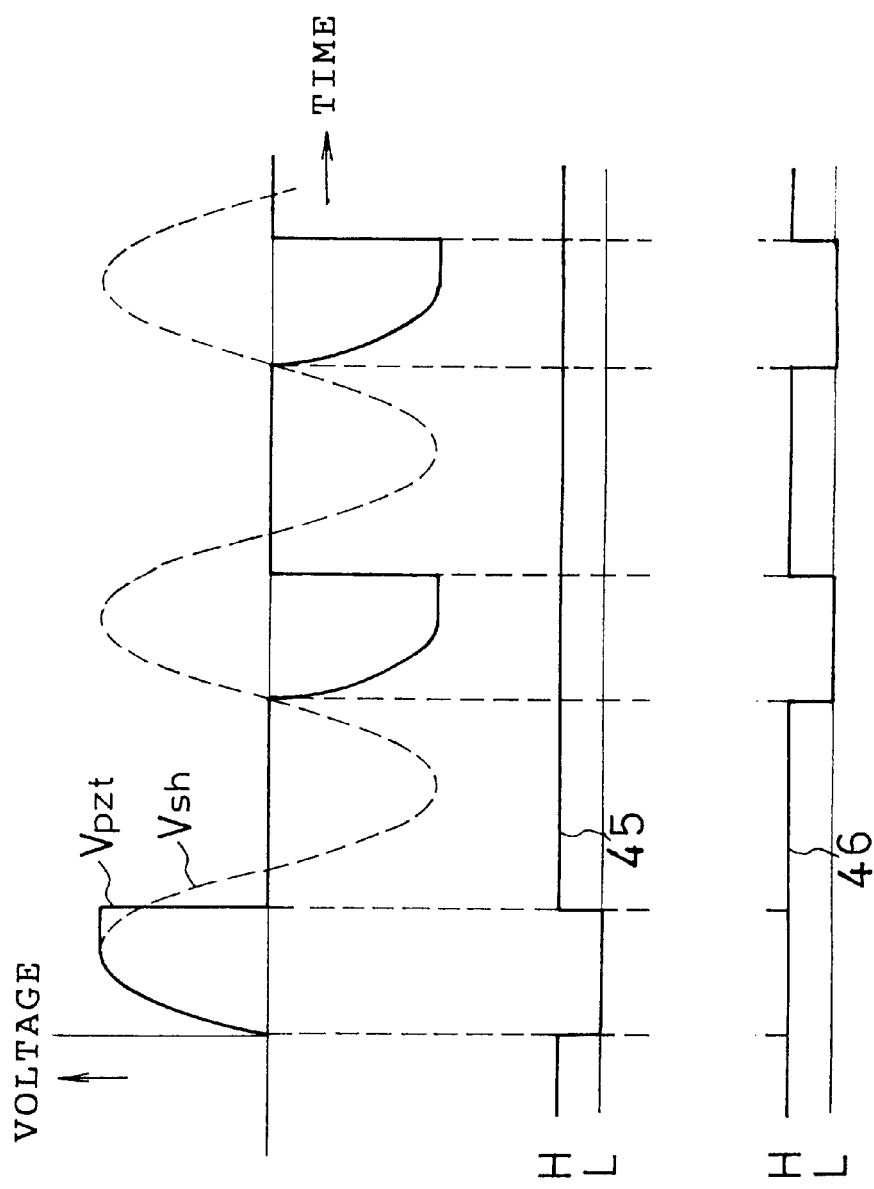
FIGS. 33(a), 33(b) and 33(c) are diagrams for explaining operational timings of the polarity switch driving circuit shown by FIG. 32.

FIG. 32 and FIGS. 33(a), 33(b) and 33(c) show the constitution and operation in which switching of elongation and contraction directions of a piezoelectric element can be achieved by switching the polarity of the piezoelectric element and the piezoelectric element can be driven in the positive direction and the negative direction by using the drive pulse of the same waveform where FIG. 32 shows a polarity switching drive circuit of the piezoelectric element and FIGS. 33(a), 33(b) and 33(c) are diagrams explaining the operational timings.

An explanation will be given of the polarity switching drive circuit and the operation in reference to FIG. 32 and FIGS. 33(a), 33(b) and 33(c) as follows. As shown by FIGS. 33(b) and 33(c), a timing pulse 45 is applied to the transistor Tr5 and a timing pulse 46 is applied to a transistor Tr7. For example, when the transistor Tr7 is maintained in an ON state by setting the timing pulse 46 at "H", a terminal 38b of the piezoelectric element 38 is grounded via diodes Dc and Dd. In this state, when the timing pulse 45 is changed to "L", the drive pulse Vpzt shown by FIG. 33(a) is applied to a terminal 38a of the piezoelectric element 38 and elongation and contraction (slow elongation and rapid contraction) in the positive direction is generated at the piezoelectric element.

Next, when the state of the timing pulse is reversed and the transistor Tr5 is maintained in an ON state by changing the timing pulse 45 to "H", the terminal 38a of the piezoelectric element 38 is grounded via diodes Da, Db. When the timing pulse 46 is changed to "L" under the state, the drive pulse Vpzt is applied to the terminal 38b of the piezoelectric element 38 and elongation and contraction (rapid elongation and slow contraction) in the negative direction is generated at the piezoelectric element.

Next, an explanation will be given of seventh and eighth embodiments of drive pulse generating circuits.

According to the embodiments explained below, high voltage is generated by utilizing a counter electromotive force generated across both ends of a coil by the inductance L of the coil and a piezoelectric element functioning as a condenser by which a substantially trapezoidal pulse can be generated only by switching circuits and a control circuit therefor without using a constant current circuit or the like.

Figure 34:
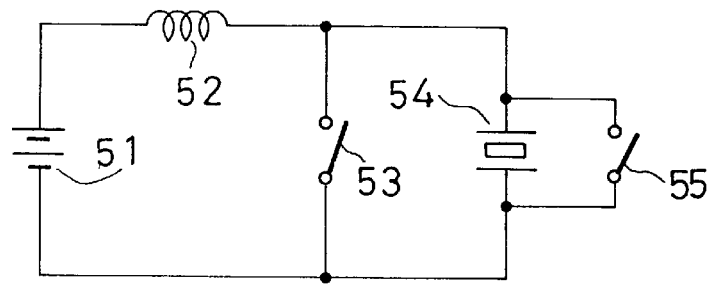
FIG. 34 is a diagram for explaining a basic circuit of a pulse generating circuit according to a seventh embodiment.

First, an explanation will be given of a basic oscillating circuit in reference to FIG. 34. When a coil 52 having the inductance L and a switch 53 are connected in series to a low voltage power source 51 as shown by FIG. 34, and the switch is made ON and OFF, counter electromotive force generated across the both ends of the coil 52 by the inductance L of the coil 52 when the switch 53 is made OFF, is applied to a piezoelectric element 54 and electric charge caused by a very small voltage ΔV is accumulated between electrodes in the piezoelectric element 54. This is because a piezoelectric element functions as a condenser.

When chopping operation making ON and OFF the switch 53 at a predetermined period T is continuously repeated, the very small voltage ΔV caused by the counter electromotive force generated across the both ends of the coil 52 is accumulated at the piezoelectric element 54 and the element is charged and voltage V across the electrodes of the piezoelectric element 54 is increased. When the voltage V across the electrodes of the piezoelectric element 54 reaches a predetermined peak voltage Vp, the ON/OFF operation of the switch 53 is stopped and the electrodes of the piezoelectric element 54 are shortcircuited and discharged by making ON a switch 55 after elapse of a predetermined time period, then, the voltage V applied to the piezoelectric element 54 is rapidly lowered from the peak voltage Vp to null. By repeating the charge/discharge operation at elapse of every predetermined time period, a pulse having a substantially trapezoidal shape can be generated.

Figure 35:
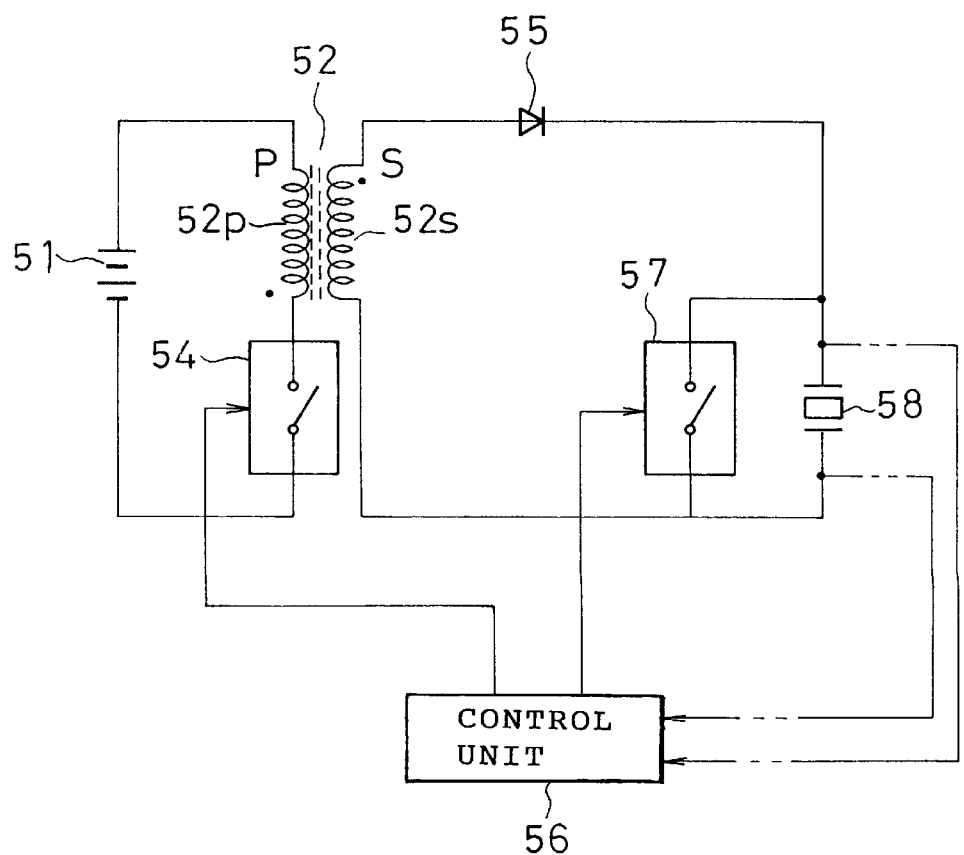
FIG. 35 is a diagram of the pulse generating circuit according to the seventh embodiment.
Figure 36:
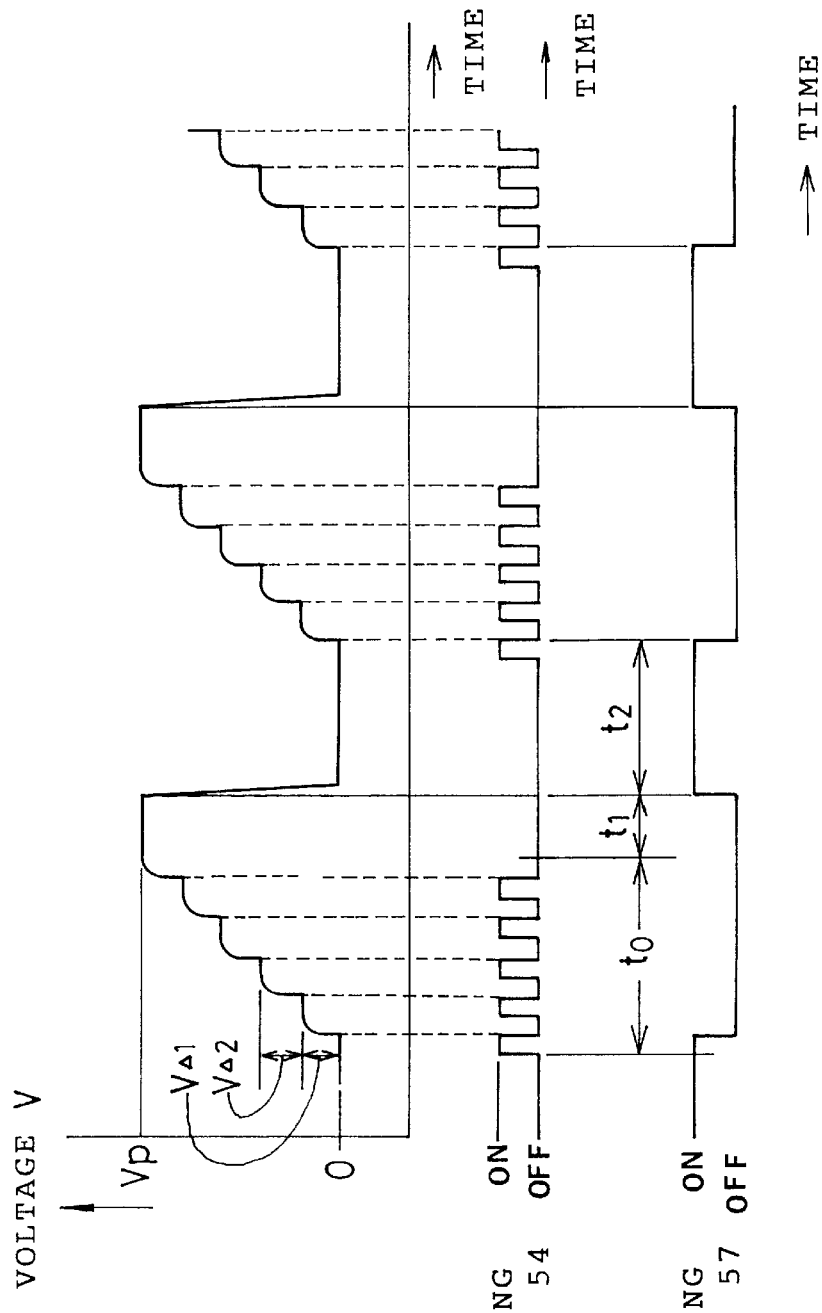
FIGS. 36(a), 36(b) and 36(c) are diagrams for explaining an output pulse waveform and operational timings of the pulse generating circuit of FIG. 35.

FIG. 35 shows the constitution of a pulse generating circuit for generating a pulse having a trapezoidal waveform, FIG. 36(a) shows the waveform of an outputted pulse and FIGS. 36(b) and 36(c) are diagrams showing the operational timings of the switching circuit.

As shown by FIG. 35, according to the pulse generating circuit, a primary wiring 52p of the transformer 52 and a switching circuit 54 are connected in series to the low voltage power source 51. A piezoelectric element 58 is connected in series to a secondary wiring 52s of the transformer 52 and a switching circuit 57 is connected in parallel to the both electrode ends of the piezoelectric element 58. The switching circuits 54 and 57 are constituted by semiconductor switching elements and control led to ON or OFF by the operational timings shown by FIGS. 36(b) and 36(c) by a control unit 56 constituted by a microcomputer.

When the switching circuit 54 is made ON, current flows in the primary wiring 52p of the transformer 52 and energy is accumulated in the primary wiring 52p. At this moment, an induction voltage induced at the secondary wiring 52s of the transformer 52 is generated in a direction of applying reverse bias to a diode 55 and accordingly, the induction voltage induced at the secondary wiring 52s is interrupted by the diode 55 and is not applied to the piezoelectric element 58.

When the switching circuit 54 is made OFF, the counter electromotive force caused by the inductance of the primary wiring 52p of the transformer 52 generates induction voltage at the secondary wiring 52s. The voltage generated at the secondary wiring 52s is applied to the piezoelectric element 58 via the diode 55 and electric charge having very small voltage ΔV1 is accumulated across electrodes of the piezoelectric element 58. At this moment, the switching circuit 57 is made OFF. The electric charge accumulated at the piezoelectric element 58 is not discharged but preserved since the electric charge applies reverse bias to the diode 55. By increasing the turn ratio between the primary wiring 52p and the secondary wiring 52s of the transformer 52, the voltage induced at the secondary wiring 52p can be increased.

When the above-explained ON/OFF operation (chopping operation) of the switching circuit 54 is repeated for a time period t0, as shown by FIG. 36(a), a voltage ΔV1, a voltage ΔV2 . . . are successively applied to the piezoelectric element 58 and electric charge is accumulated and the voltage V applied to the piezoelectric element 58 is gradually increasing. The voltage V applied to the piezoelectric element 58 is monitored by the control unit 56 and when the voltage V reaches the predetermined peak voltage Vp, the control unit 56 stops the ON/OFF operation (chopping operation) of the switching circuit 54. The electric charge accumulated at the piezoelectric element 58 is preserved without being discharged.

After elapse of a predetermined time period t1, when the control unit 56 shortcircuits and discharges the electrodes of the piezoelectric element 58 by making ON the switching circuit 57, the voltage V applied to the piezoelectric element 58 is rapidly lowered from the peak voltage Vp to null.

Immediately before elapse of a predetermined time period t2, the control unit 56 starts again the ON/OFF operation (chopping operation) of the switching circuit 54. By repeating the above-described charge/discharge operation, the drive pulse having a substantially trapezoidal shape shown by FIG. 36(a) can be generated. The elapse of predetermined time periods t1 and t2 is for generating the pulse having a substantially trapezoidal shape.

The rate of increasing the voltage V applied to the piezoelectric element 58 can be adjusted by changing the duty ratio of ON/OFF of the switching circuit 54 and the longer the period of ON, the larger the rate of increasing the voltage V. Further, in smoothing the rate of changing the voltage V, the change rate can be decreased by shortening the period of ON/OFF of the switching circuit 54 whereby the change rate can be smoothed.

According to the pulse generating circuit, as shown by FIG. 36(a), the pulse having a substantially trapezoidal waveform comprising the slow rising portion and the rapid falling portion is generated and accordingly, in order to achieve the change of the direction of driving the drive device using the piezoelectric element by changing the waveform of the pulse, it is necessary to generate a pulse having a substantially trapezoidal waveform comprising a steep rising portion and a gradual falling portion. For that purpose, the steep rising portion is provided by prolonging the period of ON by adjusting the duty ratio of ON/OFF in the switching circuit 54 and gradual discharge characteristic is provided via resistor in discharging the switching circuit 57 by which a pulse having a substantially trapezoidal shape comprising the steep rising portion and the gradual falling portion can be generated.

The diode 55 shown by FIG. 35 can be replaced by a switching element having a function equivalent thereto.

Further, although the pulse generating circuit shown by FIG. 35 uses the induction voltage induced at the secondary wiring 52s by the counter electromotive force caused by the inductance of the primary wiring 52p of the transformer 52 when the switching circuit 54 is made OFF, in place thereof, induction voltage induced at the secondary wiring 52s caused by current flowing at the primary wiring 52p of the transformer 52 when the switching circuit 54 is made ON, may be used. In this case, the polarity of the induction voltage induced at the secondary wiring 52s is reversed.

Next, an explanation will be given of an eighth embodiment of the present invention. According to the eighth embodiment, a coil is substituted for the transformer 52 of the pulse generating circuit according to the seventh embodiment shown by FIG. 35 and a switching circuit is adopted in place of the diode 55.

Figure 37:
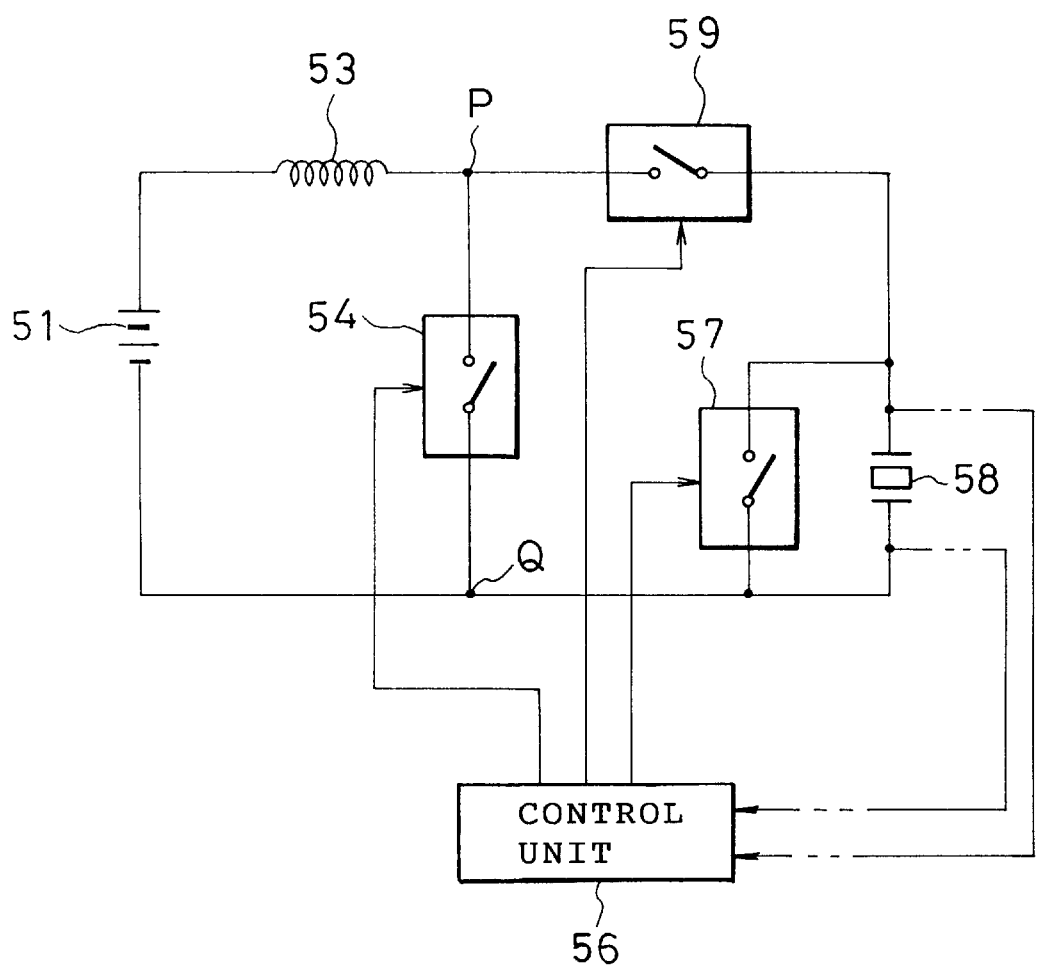
FIG. 37 is a diagram of a pulse generating circuit according to an eighth embodiment.
Figure 38:
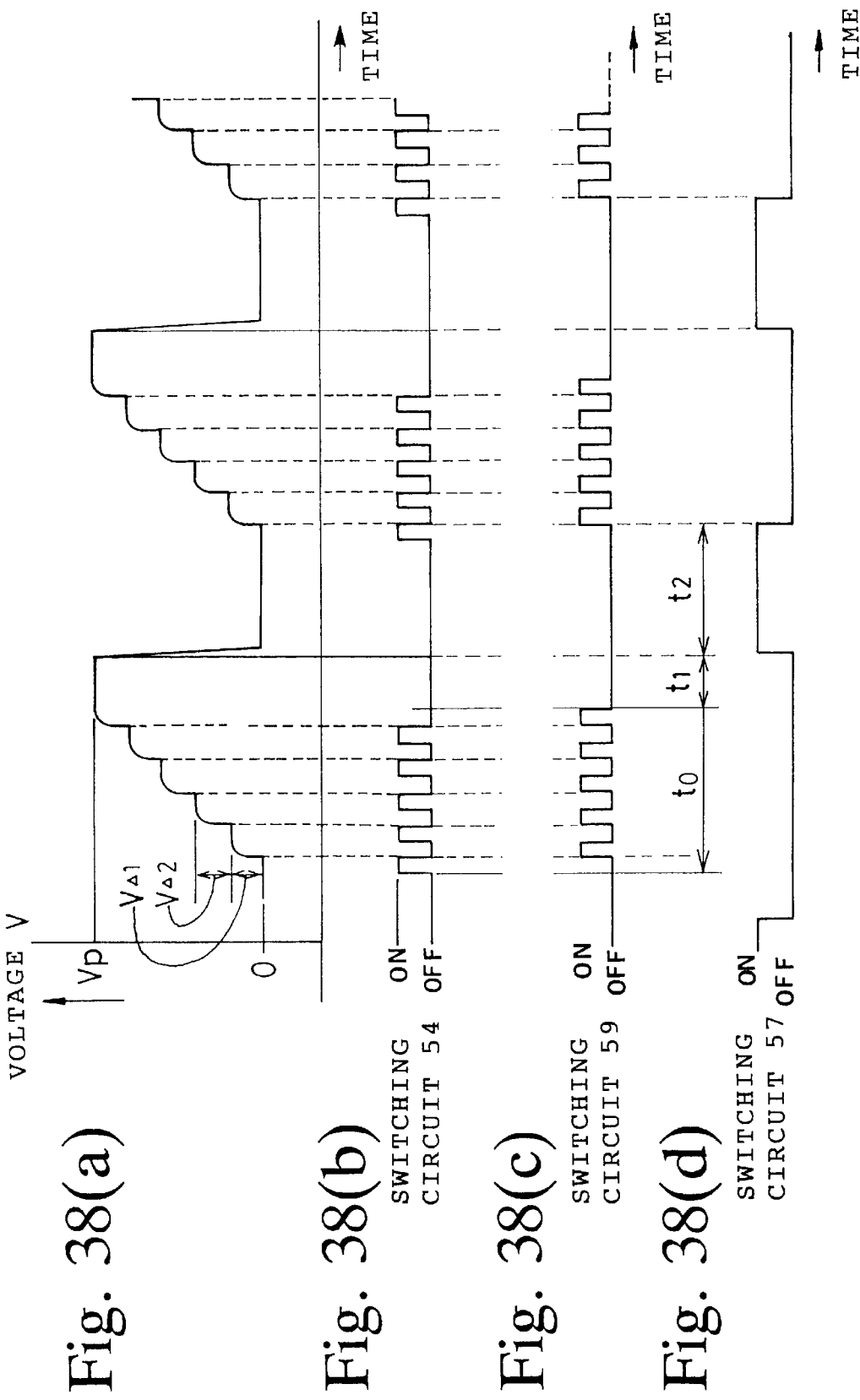
FIGS. 38(a), 38(b), 38(c) and 38(d) are diagrams for explaining an output pulse waveform and operational timings of the pulse generating circuit of FIG. 37.

FIG. 37 shows the constitution of a pulse generating circuit according to the eighth embodiment, FIG. 38(a) is a diagram showing an outputted pulse waveform and FIGS. 38(b), 38(c) and 38(d) are diagrams showing the operational timings of the switching circuit.

According to the pulse generating circuit, a coil 53 and a switching circuit 54 are connected in series to the low voltage power source 51 and a switching circuit 59 and the piezoelectric element 58 are connected in series between a connection point P connecting the coil 53 and the switching circuit 54 and a connection point Q connecting the switching circuit 54 and the negative electrode side of the low voltage power source 51. Further, the switching circuit 57 is connected in parallel to the both electrode ends of the piezoelectric element 58.

The switching circuits 54, 57 and 59 are constituted by switching elements and controlled to ON/OFF at timings shown by FIGS. 38(b), 38(c) and 38(d) by the control unit 56 constituted by a microcomputer.

When the switching circuit 54 performing ON/OFF operation is changed from ON to OFF, current flowing in the coil 53 is interrupted and counter electromotive force is generated at the terminal P of the coil 53 by the inductance. At this moment, the switching circuit 59 performing OFF/ON operation reversely in synchronism with ON/OFF operation of the switching circuit 54, is changed from OFF to ON and therefore, generated counter electromotive force is applied to the piezoelectric element 58 via the switching circuit 59 and electric charge having very small voltage V1 across the electrodes of the piezoelectric element 58 is accumulated. At this occasion, the electric charge is preserved without being discharged since the switching circuit 57 is made OFF.

When the ON/OFF operation (chopping operation) of the switching circuit 54 is repeated by a time period of t0, as shown by FIG. 38(a), voltages ΔV1, ΔV2, . . . are successively applied to the piezoelectric element 58 and electric charge is accumulated and the voltage V applied to the piezoelectric element 58 is gradually increasing. The voltage applied to the piezoelectric element 58 is monitored by the control unit 56 and when the voltage V reaches the predetermined peak voltage Vp, the control unit 56 stops the ON/OFF operation (chopping operation) of the switching circuit 54 and the OFF/ON operation of the switching circuit 59. The electric charge accumulated at the piezoelectric element 58 is preserved without being discharged.

When the control unit 56 shortcircuits and discharges the electrodes of the piezoelectric element 58 by making ON the switching circuit 57 after elapse of a predetermined time period t1, the voltage V applied to the piezoelectric element 58 is rapidly lowered from the peak voltage Vp to null.

Immediately before elapse of a predetermined time period t2, the control unit 56 starts again the ON/OFF operation of the switching circuit 54 and the OFF/ON operation of the switching circuit 59. By repeating the charge/discharge operation, a drive pulse having a substantially trapezoidal shape shown by FIG. 38(a) can be generated.

Figure 39:
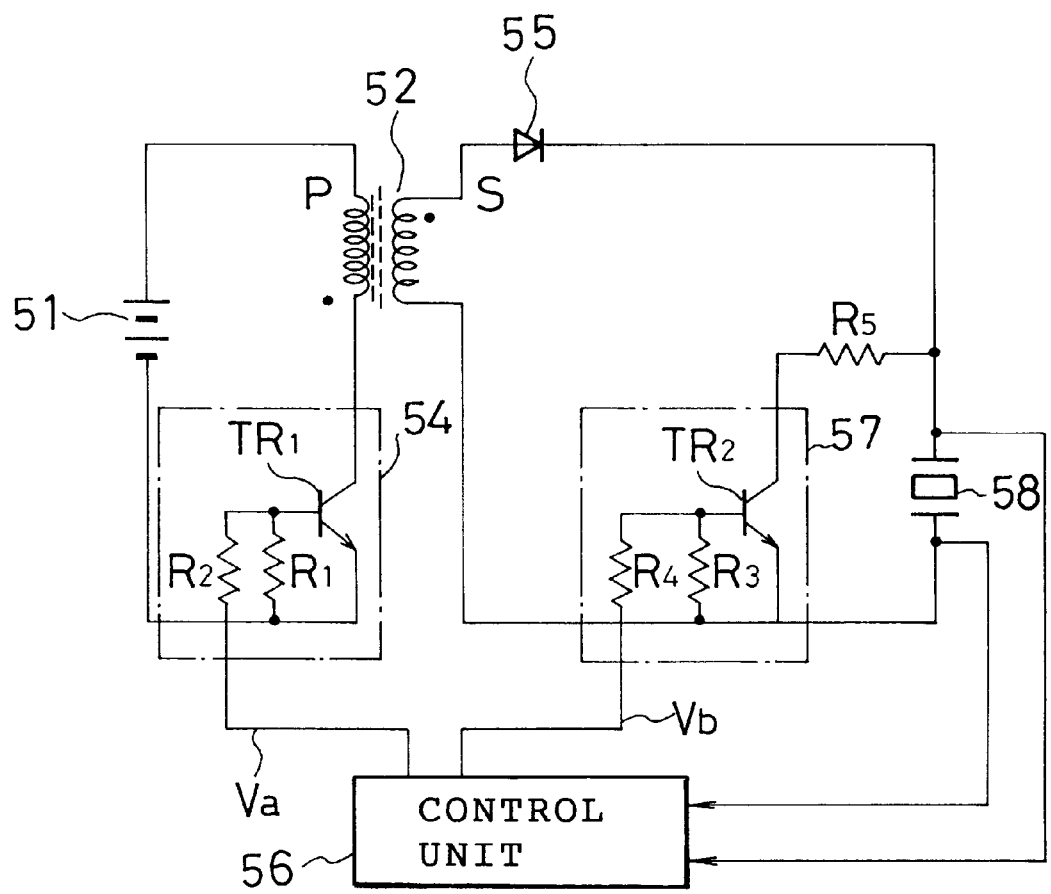
FIG. 39 is a circuit diagram specifically showing the constitution of the pulse generating circuit of FIG. 35.

FIG. 39 specifically shows the switching circuits 54 and 57 in the pulse generating circuit shown by FIG. 35. The switching circuit 54 is constituted by a transistor TR1 and resistors R1 and R2 and the switching circuit 57 is constituted by a transistor TR2 and resistors R3 and R4. A resistor R5 is provided for setting discharge characteristic when electric charge accumulated at the piezoelectric element 58 is discharged. The induction voltage generated at the secondary side of the transformer 52 in a time period where the transistor TR1 is made ON, operates as reverse voltage to the emitter of the transistor TR2 and deterioration of function or destruction of the transistor TR2 is caused and therefore, the diode 55 serves also as a protection diode for protecting the transistor Tr2.

The switching circuit 54 is made ON when a signal Va outputted from the control unit 56 to the base of the transistor TR1 is at "H" and OFF when the signal Va is at "L". The switching circuit 57 is made ON when a signal Vb outputted from the control unit 56 to the base of the transistor TR2 is at "H" and OFF when the signal Vb is at "L". The pulse waveform and the operational timing outputted from the pulse generating circuit is the same as the pulse waveform and the operational timing explained previously in reference to FIG. 36(a) and FIGS. 36(b) and 36(c) and therefore, an explanation thereof will be omitted.

Figure 40:
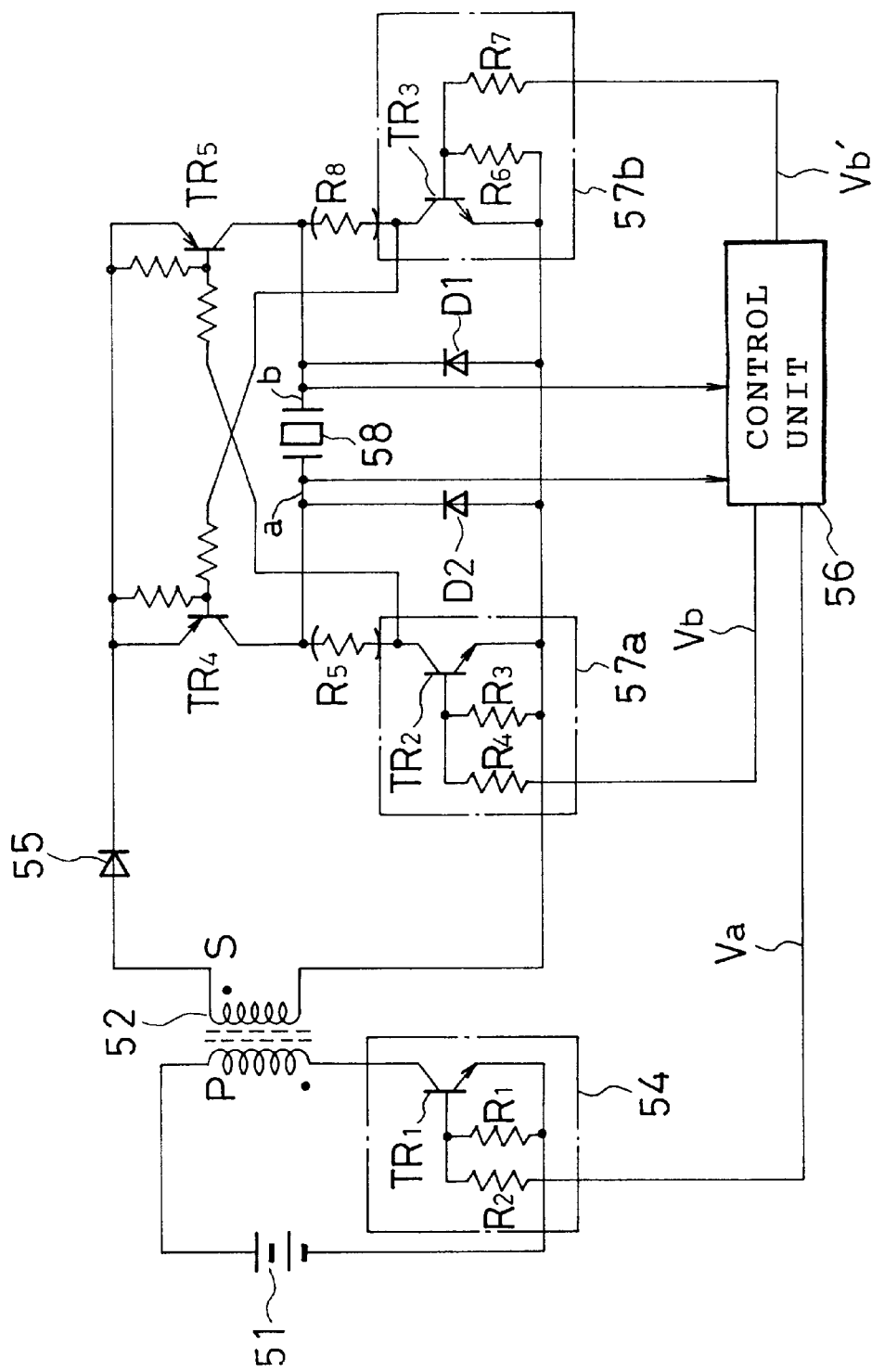
FIG. 40 is a diagram of a pulse generating circuit making reversible the polarity of an output from the pulse generating circuit.

FIG. 40 shows a pulse generating circuit in which in the pulse generating circuit shown by FIG. 39, the polarity of the voltage applied across the electrodes of the piezoelectric element 58 is reversed by which the elongation and contraction characteristic in respect of the applied voltage is reversed whereby the movement direction of the drive device can be reversed and switched.

Normally, the piezoelectric element 58 is polarized and accordingly, the characteristic of applied voltage versus displacement follows a well-known butterfly curve. Accordingly, when the reverse polarity voltage applied to the piezoelectric element 58 is used as a voltage in a range of providing contraction displacement characteristic, the elongation and contraction characteristic can be reversed by reversing the polarity of applied voltage.

Figures 41A, 41B, 41C, 41D:
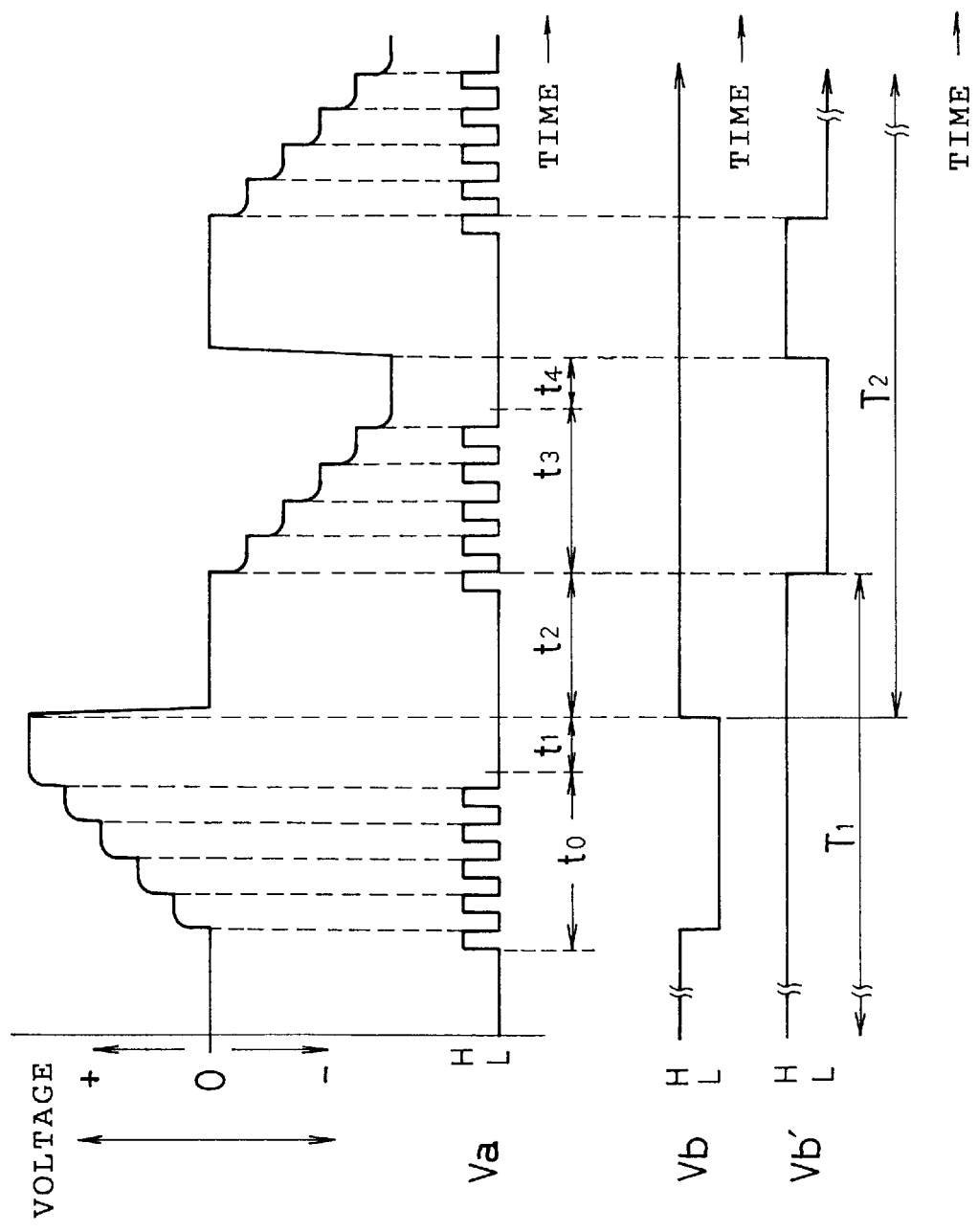
FIGS. 41(a), 41(b), 41(c) and 41(d) are diagrams for explaining an output pulse waveform and operational timings of the pulse generating circuit of FIG. 40.

FIG. 41(a) is a diagram showing a pulse waveform outputted from the pulse generating circuit shown by FIG. 40 and FIGS. 41(b), 41(c) and 41(d) are diagrams showing the operational timings of the switching circuit. According to the pulse generating circuit, the feature where the switching circuit 54 is constituted by the transistor TR1 and the resistors R1 and R2 and the feature where the circuit is made ON when the signal Va outputted from the control unit 56 to the base of the transistor TR1 is at "H" and OFF when the signal Va is at "L", remain unchanged as in the pulse generating circuit shown by FIG. 39.

An electrode "a" of the piezoelectric element 58 is connected to the secondary side of the transformer 52 via the diode 55 and a transistor TR4, and connected to a switching circuit 57a constituted by the transistor TR2 and the resistors R3 and R4. Further, an electrode "b" of the piezoelectric element 58 is connected to the secondary side of the transformer 52 via the diode 55 and a transistor TR5 and connected to a switching circuit 57b constituted by the transistor TR3 and the resistors R6 and R7. Further, diodes D1 and D2 are respectively connected to the electrodes "a" and "b" of the piezoelectric element 58 in the reverse direction. Resistors R5 and R8 are resistors for setting the discharge characteristic of electric charge of the piezoelectric element 58 and may be dispensed with.

According to the above-described constitution, as shown by FIG. 41(d), during a time period T1, "H" of a signal Vb' is initially applied from the control unit 56 to the base of the transistor TR3, the transistors TR3 and TR4 are made ON and the switching circuit 57b is conducted, a voltage is applied to the electrode "a" of the piezoelectric element 58 via the diode 55 and the transistor TR4 and the electrode "b" of the piezoelectric element 58 is grounded via the resistor R8 and the diode D1.

The control unit 56 applies the signal Va to the base of the transistor TR1 of the switching circuit 54 during a time period to, counter electromotive force is generated on the primary side of the transformer 52 by the ON/OFF operation (chopping operation) of the switching circuit 54 and induction voltage is generated at the secondary side.

During time periods t0 and t1, "L" of the signal Vb is applied from the control unit 56 to the base of the transistor TR2 of the switching circuit 57a, the transistors TR2 and TR5 are made OFF and therefore, induction voltage is applied to the electrode "a" of the piezoelectric element 58 via the transistor TR4 and electric charge is accumulated.

After elapse of the time periods t0 and t1, the signal Vb is changed to "H" and the transistors TR2 and TR5 are made ON and therefore, the electrode "a" of the piezoelectric element 58 is grounded via the resistor R5 and the diode D2 and electric charge is rapidly discharged.

Thereby, a pulse having a substantially trapezoidal shape at the plus (+) side of FIG. 41(a) is supplied from the secondary side of the transformer 52 to the electrode "a" of the piezoelectric element 58 and therefore, the driving in the predetermined first direction can be performed.

Next, as shown by FIG. 41(c), during a time period T2, "H" of the signal Vb is applied from the control unit 56 to the base of the transistor TR2 and the transistors TR2 and TR5 are made ON. When the operation enters a time period t3, during the time period t3, the signal Va is applied from the control unit 56 to the base of the transistor TR1 of the switching circuit 54, counter electromotive force is generated at the primary side of the transformer 52 by the ON/OFF operation (chopping operation) of the switching circuit 54 and induction voltage is generated on the secondary side.

"L" of the signal Vb' is applied from the control unit 56 to the base of the transistor TR3, the transistors TR3 and TR4 are made OFF and accordingly, voltage is applied to the electrode "b" of the piezoelectric element 58 via the transistor TR5 and electric charge is accumulated.

When a time period t4 has elapsed, the signal Vb' is changed to "H", the transistors TR3 and TR4 are made ON and electric charge at the electrode "b" of the piezoelectric element 58 is discharged via the resistor R8 and the diode D1.

Thereby, a pulse having a substantially trapezoidal shape on the minus (−) side of FIG. 41(a) is supplied from the secondary side of the transformer 52 to the electrode "b" of the piezoelectric element 58 and therefore, the driving can be performed in a direction opposed to the former direction (second direction).

Although in the above-described circuit, the transistors TR4 and TR5 are controlled to be made ON/OFF respectively by the transistors TR3 and TR2, the control may be performed by the control unit 56.

Figure 42:
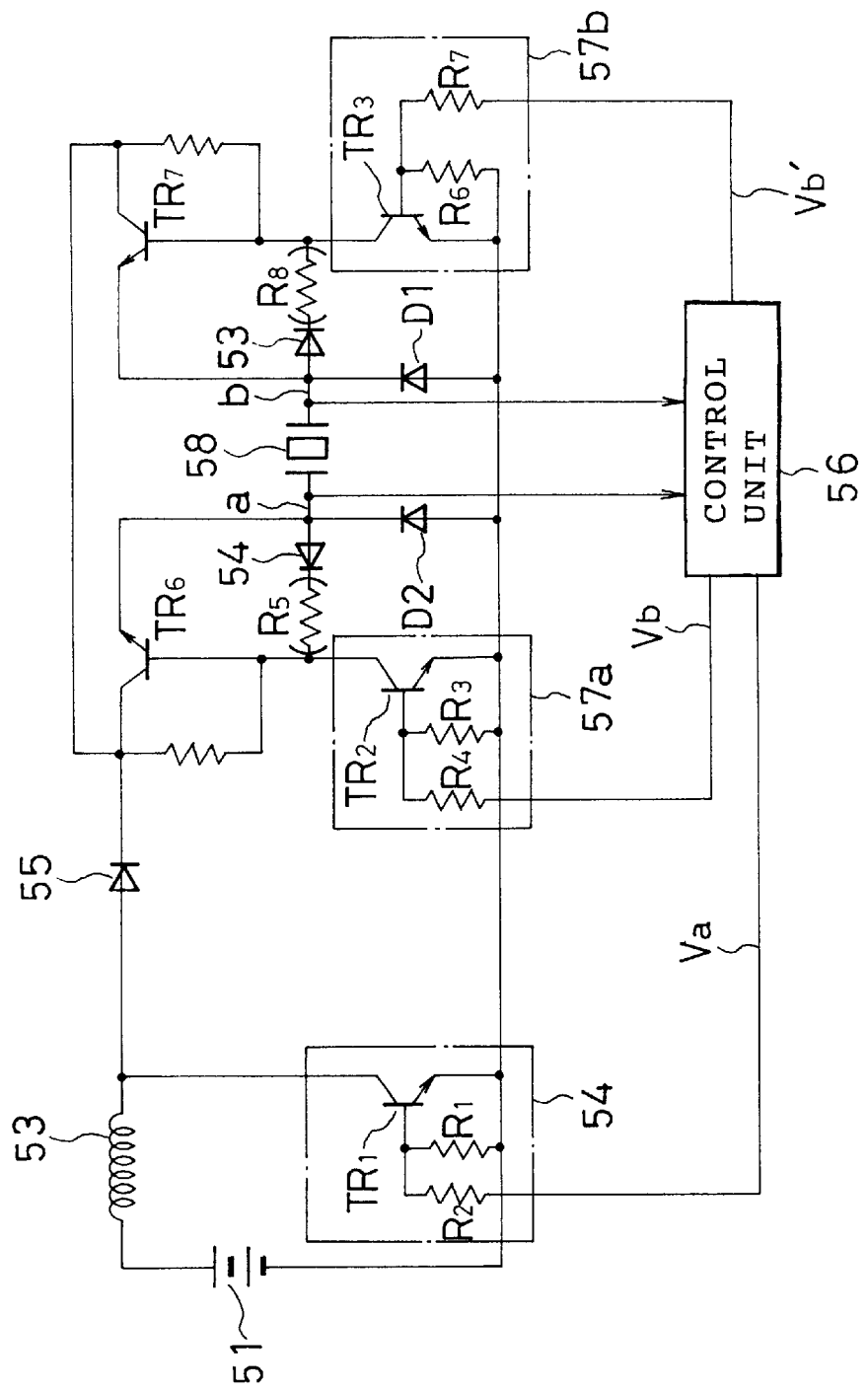
FIG. 42 is a diagram of a pulse generating circuit making reversible the polarity of an output from the pulse generating circuit.
Figure 43:
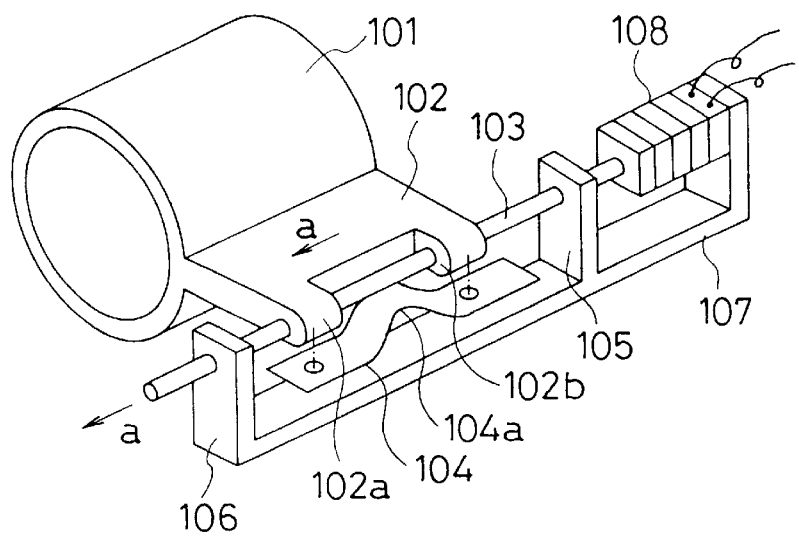
FIG. 43 is a perspective view showing an example of a conventional drive device using a piezoelectric element.

FIG. 42 shows a pulse generating circuit in which in the pulse generating circuit shown by FIG. 39, the transformer 52 is replaced by the coil 53, the polarity of the voltage applied to electrodes of the piezoelectric element 58 is reversed by which the elongation and contraction characteristic in respect of the applied voltage is reversed whereby the movement direction of the drive device can be reversed and switched. A pulse waveform outputted from the pulse generating circuit is the same as the waveform shown by FIG. 41(a) and the operational timings of the switching circuit are the same as the operational timings shown by FIGS. 41(b), 41(c) and 41(d) and accordingly, an explanation will be given as follows in reference to FIG. 41(a) and FIGS. 41(b), 41(c) and 41(d).

According to the pulse generating circuit, the feature where the switching circuit 54 is constituted by the transistor TR1 and the resistors R1 and R2 and the feature where the circuit is made ON when the signal Va outputted from the control unit 56 to the base of the transistor TR1 is at "H" and OFF when the signal Va is at "L", remain unchanged from those of the pulse generating circuit shown by FIG. 39.

The electrode "a" of the piezoelectric element 58 is connected to the coil 53 via the transistor TR6 and the diode 55 and is connected to the switching circuit 57a constituted by the transistor TR2 and the resistors R3 and R4. Further, the electrode "b" of the piezoelectric element 58 is connected to the coil 53 via the transistor TR7 and the diode 55 and connected to the switching circuit 57b constituted by the transistor TR3 and the resistors R6 and R7. In respect of the transistors TR2 and TR6 and the transistors TR3 and TR7, when ones are made ON, the others are made OFF and when ones are made OFF, the others are made ON.

Further, the diodes D2 and D1 are connected respectively to the electrodes "a" and "b" of the piezoelectric element 58 in the reverse direction. The resistors R5 and R8 are resistors for setting the discharge characteristic of electric charge of the piezoelectric element 58 and may be dispensed with. A diode 53 is provided such that the resistor R8 is not influenced by the ON operation of the transistor TR7 and a diode 54 is provided such that the resistor R5 is not influenced by the ON operation of the transistor TR6.

According to the above-described constitution, as shown by FIG. 41(d), during the time period T1, "H" of the signal Vb' is initially applied from the control unit 56 to the base of the transistor TR3, the transistor TR3 is made ON, the transistor TR7 is made OFF, the switching circuit 57b is conducted and electrode "b" of the piezoelectric element 58 is grounded via the resistor R8, the diode 53 and the diode D1.

During the time period t0, the signal Va is applied from the control unit 56 to the base of the transistor TR1 of the switching circuit 54 and counter electromotive force is generated at the coil 53 by the ON/OFF operation (chopping operation) of the switching circuit 54.

During the time periods t0 and t1, "L" of the signal Vb is applied from the control unit 56 to the base of the transistor TR2 of the switching circuit 57a, the transistor TR2 is made OFF, the transistor TR6 is made ON and accordingly, counter electromotive force is applied to the electrode "a" of the piezoelectric element 58 and electric charge is accumulated.

After elapse of the time periods t0 and t1, the signal Vb is changed to "H", the transistor TR2 is made ON, the transistor TR6 is made OFF and therefore, the electrode "a" of the piezoelectric element 58 is grounded via the diode 54, the resistor R5 and the diode D2 and electric charge is rapidly discharged. The transistor TR6 is made OFF and therefore, no unintentional current flows in the coil 53.

In this way, the pulse having a substantially trapezoidal shape on the plus (+) side of FIG. 41(a) is supplied from the secondary side of the transformer 52 to the electrode "a" of the piezoelectric element 58 and accordingly, the driving operation in a predetermined first direction can be performed.

Next, in a time period T2, "H" of the signal Vb' is initially applied to the base of the transistor TR3, the transistor TR3 is made ON and the transistor TR7 is made OFF, the switching circuit 57b is conducted and the electrode "b" of the piezoelectric element 58 is grounded via the resistor R8, the diode 53 and the diode D1. "H" of the signal Vb is applied to the base of the transistor TR2 of the switching circuit 57a, the transistor TR2 is made ON and the transistor TR6 is made OFF.

After the time period t2 has elapsed and the operation enters the time period t3, the signal Va is applied from the control unit 56 to the base of the transistor TR1 of the switching circuit 54 during the time period t3 and counter electromotive force is generated at the coil 53 by the ON/OFF operation (chopping operation) of the switching circuit 54. "L" of the signal Vb' is applied from the control unit 56 to the base of the transistor TR3, the transistor TR3 is made OFF, the transistor TR7 is made ON and therefore, counter electromotive force is applied to the electrode "b" of the piezoelectric element 58 via the transistor TR7 and electric charge is accumulated.

When the time period t4 has elapsed, the signal Vb' is changed to "H", the transistor TR3 is made ON, the transistor TR7 is made OFF and electric charge of the electrode "b" of the piezoelectric element 58 is rapidly discharged via the diode 53, the resistor R8 and the diode D1.

That is, during the time period T1, the pulse having a substantially trapezoidal shape of the plus (+) side of FIG. 41(a) is supplied to the piezoelectric element 58 and therefore, the driving operation in the predetermined first direction can be performed whereas during the time period T2, the pulse having a substantially trapezoidal shape of the minus (-) side of FIG. 41(a) is supplied to the piezoelectric element 58 and therefore, the driving operation in a direction opposed to the former direction (second direction) can be performed.

The above-described pulse generating circuits can naturally be used by pertinently combining circuit elements constituting the circuits in compliance with object.

As described above, an explanation has been given of the embodiments of the present invention. Although an explanation has been given such that the drive pulse generating apparatuses of the embodiments are applied to the drive device using a piezoelectric element as the electromechanical transducer, the drive pulse generating apparatuses of the present invention are applicable to a drive device using a magnetostrictive element as the electromechanical transducer.

Further, although the above-described drive pulse generating apparatuses are naturally applicable to the drive device in which the elongation and contraction displacement in the thickness direction of the piezoelectric element is transmitted to the driving member for driving the driven member frictionally coupled to the driving member which has been explained as the conventional example, the drive pulse generating apparatuses of the present invention are not limited to the drive device having the above-described constitution but the apparatuses are naturally applicable to a drive device of a self-propelled type, for example, a drive device of a self-propelled type in which a moving member having a piezoelectric element is slidably supported on a guide member and reciprocating vibration having different speeds is generated at the moving member by applying a trapezoidal wave drive pulse on the piezoelectric element thereby moving the moving member in a predetermined direction.

According to the drive pulse generating apparatuses of the present invention, the amplitude of the trapezoidal drive pulse applied to the electromechanical transducer is provided with a predetermined amplitude capable of always driving the driven member even when the drive speed is changed and accordingly, there causes no dead zone by which the drive speed of the driven member frictionally coupled to the driving member remains unchanged even when the drive speed is small and the drive speed can be adjusted finely.

According to the drive pulse generating apparatuses of the present invention, the drive speed is not controlled by thinning portions of a series of drive pulses as in the conventional case of controlling the drive speed and accordingly, there causes no various inconvenience resulted from thinning drive pulses, that is, occurrence of large intermittent mechanical vibration at the electromechanical transducer, the drive shaft and the driven member or occurrence of vibrational noise offensive to the ear within a range of audio frequencies. Further, excellent operation and effect is achieved such that a variation in speed is reduced compared with the case where the speed control is performed by thinning drive pulses, and the like.

According to the pulse generating apparatuses of the present invention, high voltage sufficient for driving an electromechanical transducer can be provided even with low voltage power source such as a battery or the like and a booster circuit having a complicated constitution is not needed. Further, a circuit of generating a drive pulse of a trapezoidal waveform suitable for driving an electromechanical transducer can be constituted by a sine wave generating circuit having a simple constitution, a transformer, a switching circuit and a timing circuit for controlling control timings thereof, or by a transformer or a coil, a switching circuit and a control unit for controlling control timings and therefore, a pulse generating apparatus which is small-sized and in which a number of parts is small and power consumption is inconsiderable compared with the conventional pulse generating apparatus can be provided.

What is claimed is:

1. A drive pulse generating apparatus suitable for a drive device generating elongation and contraction displacement by applying a drive pulse to an electromechanical transducer and driving a driven member in accordance with the generated displacement, said drive pulse generating apparatus comprising:

a first timing signal generator for generating a first timing signal designating a previously set predetermined timing;

a pulse generator for generating a series of pulses having a predetermined amplitude in synchronism with said first timing signal;

a second timing signal generator for generating a second timing signal designating a predetermined timing determined based on information of an instructed drive speed of the designated driven member; and a controller, said controller generating a trapezoidal drive pulse for application to the electromechanical transducer by interrupting the series of pulses outputted from said pulse generator for a predetermined period of time based on said second timing signal.

2. A drive pulse generating apparatus according to claim 1, wherein a maximum amplitude of said trapezoidal drive pulse is an amplitude equal to a maximum amplitude of said pulse.

3. A drive pulse generating apparatus according to claim 1, wherein a maximum amplitude of said trapezoidal drive pulse is an amplitude capable of generating a displacement sufficient for driving the driven member.

4. A drive pulse generating apparatus according to claim 1, wherein said series of pulses generated by said pulse generator are pulses comprising harmonics at odd number orders where waveforms of a rising portion and a falling portion A each pulse are symmetrical to each other.

5. A drive pulse generating apparatus according to claim 1, wherein the series of pulses generated by said pulse generator are triangular waveform pulses where waveforms of a rising portion and a falling portion of each pulse are symmetrical to each other.

6. A drive pulse generating apparatus according to claim 1, wherein the series of pulses generated by said pulse generator are trapezoidal waveform pulses where waveforms of a rising portion and a falling portion of each pulse are symmetrical to each other.

7. A drive pulse generating apparatus suitable for a drive device generating elongation and contraction displacement by applying a drive pulse to an electromechanical transducer and driving a driven member in accordance with the generated displacement, said drive pulse generating apparatus comprising:

a timing signal generator for generating a timing signal, said timing signal generator generating said timing signal at a predetermined timing which is determined based on information of an instructed drive speed of the designated driven member;

a pulse generator for generating a series of pulses having a predetermined amplitude; and a controller, said controller generating the drive pulse for application to the electromechanical transducer by interrupting an output of said pulse generator for a predetermined phase range of at least one pulse of the series of pulses based on said timing signal.

8. A drive pulse generating apparatus according to claim 7, wherein the series of pulses generated by said pulse generator are pulses comprising harmonics at odd number orders and where waveforms of a rising portion and a failing portion of each pulse are symmetrical to each other.

9. A drive pulse generating apparatus according to claim 7, wherein the series of pulses generated by said pulse generator are triangular waveform pulses where waveforms of a rising portion and a falling portion of each pulse are symmetrical to each other.

10. A drive pulse generating apparatus according to claim 7, wherein the series of pulses generated by said pulse generator are trapezoidal waveform pulses where waveforms of a rising portion and a falling portion of each pulse are symmetrical to each other.

11. A drive pulse generating apparatus according to claim 7, wherein said controller operates on an output of said pulse generator based on a plurality of groups of pulses defined from said series of pulses, for each of said groups of pulses, said controller interrupts an output of said pulse generator for a predetermined phase range of at least a portion of the pulses within said group.

12. A drive pulse generating apparatus suitable for a drive device generating elongation and contraction displacement by applying a drive pulse to an electromechanical transducer and driving a driven member in accordance with the generated displacement, said drive pulse generating apparatus comprising:

a timing signal generator for generating a timing signal;

a first pulse generator for generating at least a first pulse contributing to driving the driven member in synchronism with said timing signal;

a second pulse generator for generating at least a second pulse not contributing to driving the driven member in synchronism with said timing signal; and a controller, said controller generating the drive pulse for application to the electromechanical transducer by successively selecting to output the first pulse and the second pulse in accordance with a predetermined rate determined by information of an instructed drive speed of the designated driven member.

13. A drive pulse generating apparatus according to claim 12, wherein the at least a first pulse generated by said first pulse generator is a series of pulses where waveforms of a rising portion and a falling portion of each pulse are non-symmetrical to each other.

14. A drive pulse generating apparatus according to claim 12, wherein the at least a second pulse generated by said second pulse generator is a series of pulses comprising harmonics at odd number orders where waveforms of a rising portion and a falling portion of each pulse are symmetrical to each other.

15. A drive pulse generating apparatus according to claim 12, wherein the at least a second pulse generated by said second pulse generator is a series of pulses having a sine waveform.

16. A drive pulse generating apparatus according to claim 12, wherein the at least a second pulse generated by said second pulse generator is a triangular waveform pulse where waveforms of a rising portion and a falling portion of the pulse are symmetrical to each other.

17. A drive pulse generating apparatus according to claim 12, wherein the second pulse generated by said second pulse generator is a trapezoidal waveform pulse where waveforms of a rising portion and a falling portion of the pulse are symmetrical to each other.

18. A drive pulse generating apparatus suitable for a drive device generating elongation and contraction displacement by applying a drive pulse to an electromechanical transducer and driving a driven member in accordance with the generated displacement, said drive pulse generating apparatus comprising:

a timing signal generator for generating a timing signal;

a pulse generator for generating a series of pulses having a predetermined amplitude in synchronism with said timing signal; and a controller, said controller always outputs the pulses outputted from the pulse generator to the electromechanical transducer, said controller interrupting an output in a predetermined phase range of the pulses by a predetermined timing determined based on information of an instructed drive speed of the designated driven member in driving the driven member.

19. A drive pulse generating apparatus comprising:

a sine wave generator for generating a series of sine wave pulses;

a timing pulse generator for generating a timing pulse for designating a desired phase range of said sine wave pulses generated by said sine wave generator; and a switching device for making ON or OFF an output of said sine wave generator to a load, said switching device adapted to switch the output of said sine wave generator for said desired phase range for at least one sine wave pulse of said series of sine wave pulses based on the timing pulse outputted from said timing pulse generator.

20. A drive pulse generating apparatus according to claim 19, further comprising:

a second switching device for discharging electric charge charged to the load when said load is a capacitive load, said second switching device being responsive to the timing pulse designating the desired phase position outputted from said timing pulse generator.

21. A drive pulse generating apparatus according to claim 19, wherein said sine wave generator is adapted to have connected thereto a direct current power source outputting a predetermined voltage so that a sine wave generated by the sine wave generator is offset from a reference potential by a voltage amount of the direct current power source.

22. A pulse generating apparatus suitable for applying to a drive mechanism for generating elongation and contraction displacement by applying a pulse voltage to an electromechanical transducer and driving a mechanism member in accordance with the generated displacement, said pulse generating apparatus comprising:

a sine wave generator for generating a series of sine wave pulses;

a timing pulse generator for generating a timing pulse for designating a desired phase position of a sine wave generated by said sine wave generator;

a first switching device for making ON or OFF an output of said sine wave generator which is outputted to the electromechanical transducer, said switching device switching said output of said sine wave generator at said desired phase position for at least at least one sine wave pulse of said series of sine wave pulses; and a second switching device for discharging an electric charge of said electromechanical transducer;

wherein said first switching device and the second switching device are controlled to operate based on the timing pulse designating the desired phase position outputted from said timing pulse generator.

23. A drive pulse generating apparatus according to claim 22, wherein said switching device includes semiconductor elements.

24. A drive pulse generating apparatus according to claim 22, wherein said sine wave generator includes a high voltage generating circuit, which includes semiconductor elements and a transformer.

25. A drive pulse generating apparatus according to claim 22, wherein the first switching device for making ON or OFF the output of said sine wave to the electromechanical transducer and the second switching device for discharging the electric charge of said electromechanical transducer include means for changing a polarity of a pulse voltage applied to the electromechanical transducer based on the timing pulse designating the desired phase position outputted from said timing pulse generator and applying the pulse voltage to the electromechanical transducer.

26. A drive pulse generating apparatus comprising:

a pulse generating circuit including an inductance element and first switching device which are connected in series with a power source, an electromechanical transducer which is connected between a connection point connecting the inductance element and the first switching device and a connection point connecting the first switching device and the power source and a second switching device which is connected in parallel to the electromechanical transducer; and a controller;

wherein said controller is adapted to control the first switching device so as to perform a chopping operation of intermittently making ON or OFF the first switching device so that counter electromotive force generated at said inductance element is accumulated thereby at said electromechanical transducer, said controller further being adapted to control the second switching device so that discharge of a thus accumulated electric charge is accomplished by making ON the second switching device when the accumulated electric charge reaches a predetermined value.

27. A drive pulse generating apparatus according to claim 26, wherein said inductance element is a coil.

28. A drive pulse generating apparatus according to claim 26, wherein said inductance element is a primary wiring of a transformer.

29. A drive pulse generating apparatus according to claim 26, wherein said capacitance element is a piezoelectric element.

30. A drive pulse generating apparatus according to claim 26, wherein said first switching device and said second switching device include semiconductor elements.

31. A drive pulse generating apparatus according to claim 26, wherein said controller includes a microcomputer for controlling the first switching device so as to perform the chopping operation for intermittently making ON or OFF the first switching device at a predetermined time interval, said controller being adapted to monitor the electric charge accumulated at said electromechanical transducer and, when the electric charge accumulated at electromechanical transducer reaches the predetermined value, said controller being adapted to make ON the second switching device.

32. A drive pulse generating apparatus suitable for a drive mechanism generating elongation and contraction displacement by applying a pulse voltage to an electromechanical transducer and driving a mechanism member in accordance with the generated displacement, said drive pulse generating apparatus comprising:

a pulse generating circuit including an inductive circuit element and first switching device which are connected in series which a power source, a capacitive electromechanical transducer which is connected between a connection point connecting the inductive circuit element and the first switching device and a connection point connecting the first switching device and the power source and a second switching device which is connected in parallel to said capacitive electromechanical transducer; and a controller;

wherein said controller is adapted to control the first switching device so as to perform a chopping operation of intermittently making ON or OFF the first switching device to thereby accumulate a counter electromotive force, which is generated at said inductive circuit element, in said capacitive electromechanical transducer, said controller further being adapted to control the second switching device so that discharge of a thus accumulated electric charge is accomplished by making ON the second switching device when the accumulated electric charge reaches a predetermined value.

33. An appliance comprising:

a drive device for generating elongation and contraction displacement by applying a drive pulse to an electromechanical transducer;

a driven member which is driven in accordance with the generated displacement;

a first pulse generator for generating a first pulse contributing to driving the driven member; and a second pulse generator for generating a second pulse not contributing to driving the driven member; and a selector for selecting at least one of said first and second pulses to be supplied to said electromechanical transducer.

34. An appliance according to claim 33, wherein said selector selects the pulses in accordance with information corresponding to a drive speed of the driven member.

35. An appliance according to claim 33, wherein said first pulse contributes to displace said electromechanical transducer in different velocity along elongation direction and contraction direction, and said second pulse contributes to displace said electromechanical transducer in the same velocity along elongation direction and contraction direction.

36. An appliance according to claim 33, wherein said electromechanical transducer is a linear actuator which drives said driven member linearly.

37. An appliance according to claim 33, wherein said appliance includes an optical system which is driven by the movement of said driven member.

38. An appliance comprising:
a drive device for generating elongation and contraction displacement by applying a drive pulse to an electromechanical transducer;
a driven member which is driven in accordance with the generated displacement;
a pulse generator for generating a first pulse contributing to driving the driven member and for generating a second pulse not contributing to driving the driven member;
a velocity controller which controls a number 'k' of said first pulses applied to said electromechanical transducer within a unit period of time, where 'k' is equal to or larger than 1 and equal to or smaller than maximum number 'S'; and
a controller which, when the number of said first pulses is smaller than 'S', applies said second pulse to said electromechanical transducer during a time where said first pulse is not being applied to said electromechanical transducer.

39. An appliance according to claim 38, wherein the number of said applied second pulse is a difference between 'k' and 'S'.

40. An appliance according to claim 38, wherein said first pulse contributes to displace said electromechanical transducer in different velocity along elongation direction and contraction direction, and said second pulse contributes to displace said electromechanical transducer in the same velocity along elongation direction and contraction direction.

41. An appliance according to claim 38, wherein said electromechanical transducer is a linear actuator which drives said driven member linearly.

42. An appliance according to claim 38, wherein said appliance includes an optical system which is driven by the movement of said driven member.

43. An apparatus comprising:
a drive device for generating elongation and contraction displacement by applying a drive pulse to an electromechanical transducer;
a first pulse generator for generating a first pulse having a waveform adapted to contribute to driving a driven member;
a second pulse generator for generating a second pulse having a waveform adapted to not contribute to driving the driven member;
a controller for controlling an output from each of said first pulse generator and said second pulse generator to said electromechanical transducer so that a total quantity of 'S' pulses are applied to said electromechanical transducer within a unit period of time,
said controller controlling an output of said first pulse generator to said electromechanical transducer so that a number 'k' of first pulses are applied to said electromechanical transducer within said unit period of time, where 'k' is equal to or larger than 1 and equal to or smaller than maximum number 'S' and where 'k' is based on a velocity input,
said controller controlling an output of said second pulse generator to said electromechanical transducer so that a number ('S'–'k') of second pulses are applied to said electromechanical transducer within said unit period of time, said second pulses being applied to said electromechanical transducer during a portion of said unit period of time when said first pulses are not being applied.

44. An apparatus in accordance with claim 43, wherein said first pulse and said second pulse have substantially identical frequencies.

45. An apparatus in accordance with claim wherein, in the case where 'k' is greater than 1, said number 'k' of first pulses are applied consecutively within said unit period of time.

46. An apparatus in accordance with claim 43, wherein, in the case where 'k' is greater than 1, said number 'k' of first pulses are separated by at least one second pulse within said unit period of time.

* * * * *

UNITED STATES PATENT AND TRADEMARK OFFICE
CERTIFICATE OF CORRECTION

PATENT NO. : 6,084,363
DATED : July 4, 2000
INVENTOR(S) : Kenji Mizumoto

It is certified that error appears in the above-identified patent and that said Letters Patent is hereby corrected as shown below:

Title page,
[75] Inventor:, delete "Osaka", and insert -- Osaka-Shi --.

Column 30, claim 1,
Line 16, delete "designated".

Column 30, claim 2,
Lines 3 and 4, delete "said pulse", and insert -- a pulse of said series of pulses from said pulse generator --.

Column 30, claim 4,
Line 5, delete "A each pulse", and insert -- of each pulse of said series of pulses --.

Column 30, claim 5,
Line 4, after "pulse", insert -- of said series of pulses --.

Column 31, claim 6,
Line 4, after "pulse", insert -- of said series of pulses --.

Column 31, claim 7,
Line 11, delete "designated".

Column 31, claim 8,
Line 5, after "pulse", insert -- of said series of pulses --.

Column 31, claim 9,
Line 4, after "pulse", insert -- of said series of pulses --.

Column 31, claim 10,
Line 4, after "pulse", insert -- of said series of pulses --.

Column 31, claim 11,
Line 4, after the first instance of "pulses", insert -- and wherein, --.
Line 7, delete "said", and insert -- the respective --.

Column 31, claim 12,
Line 19, delete "designated".

Column 32, claim 13,
Line 4, after "pulse", insert -- of said series of pulses --.

UNITED STATES PATENT AND TRADEMARK OFFICE
CERTIFICATE OF CORRECTION

PATENT NO. : 6,084,363
DATED : July 4, 2000
INVENTOR(S) : Kenji Mizumoto

It is certified that error appears in the above-identified patent and that said Letters Patent is hereby corrected as shown below:

Column 32, claim 14,
Line 5, after "pulse", insert -- of said series of pulses --.

Column 32, claim 16,
Line 4, after "the", insert -- triangular waveform --.

Column 32, claim 17,
Line 2, after "the", insert -- at least a --.
Line 4, after "the", insert -- trapezoidal waveform --.

Column 32, claim 18,
Line 11, after "controller,", insert -- wherein --.
Line 16, delete "designated".

Column 32, claim 21,
Line 4, after "wave", insert -- pulse --.

Column 33, claim 22,
Line 10, after "wave", insert -- pulse --.
Line 16, delete the first instance of "at least".

Column 33, claim 25,
Line 3, after "wave", insert -- generator --.

Column 33, claim 26,
Line 3, after "and", insert -- a --.
Line 8, after "source", insert -- , --.

Column 34, claim 29,
Line 2, delete "capacitance element", and insert -- electromechanical transducer --.

Column 34, claim 31,
Line 8, after "at", insert -- said --.

Column 34, claim 32,
Line 9, delete "which", and insert -- with --.
Line 14, after "source", insert -- , --.

UNITED STATES PATENT AND TRADEMARK OFFICE
CERTIFICATE OF CORRECTION

PATENT NO. : 6,084,363
DATED : July 4, 2000
INVENTOR(S) : Kenji Mizumoto

It is certified that error appears in the above-identified patent and that said Letters Patent is hereby corrected as shown below:

Column 35, claim 35,
Line 3, delete "velocity", and insert -- velocities --.

Column 35, claim 38,
Line 14, after the second instance of "than", insert -- a --.

Column 35, claim 43,
Line 20, delete "velocity", and insert -- velocities --.

Column 36, claim 43,
Line 24, after "than", insert -- a --.

Column 36, claim 45,
Line 1, after "claim", insert -- 43 --.

Signed and Sealed this

Twenty-seventh Day of November, 2001

*Attest:*

*Attesting Officer*

NICHOLAS P. GODICI
*Acting Director of the United States Patent and Trademark Office*